US012287601B2

(12) United States Patent
Sato et al.

(10) Patent No.: US 12,287,601 B2
(45) Date of Patent: Apr. 29, 2025

(54) CARTRIDGE, PROCESS CARTRIDGE AND ELECTROPHOTOGRAPHIC IMAGE FORMING APPARATUS

(71) Applicant: CANON KABUSHIKI KAISHA, Tokyo (JP)

(72) Inventors: Masaaki Sato, Yokohama (JP); Kazuhiko Kanno, Odawara (JP); Satoshi Nishiya, Machida (JP); Masatoshi Yamashita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/679,707

(22) Filed: May 31, 2024

(65) Prior Publication Data

US 2024/0319663 A1 Sep. 26, 2024

Related U.S. Application Data

(62) Division of application No. 18/110,429, filed on Feb. 16, 2023, now Pat. No. 12,050,432, which is a (Continued)

(30) Foreign Application Priority Data

Dec. 6, 2013 (JP) ................................ 2013-253522

(51) Int. Cl.
*G03G 21/18* (2006.01)
*G03G 21/16* (2006.01)

(52) U.S. Cl.
CPC ..... *G03G 21/1842* (2013.01); *G03G 21/1647* (2013.01); *G03G 21/1821* (2013.01); *G03G 21/1857* (2013.01); *G03G 21/186* (2013.01)

(58) Field of Classification Search
CPC ........... G03G 21/1842; G03G 21/1647; G03G 21/1821; G03G 21/1857; G03G 21/186; G03G 21/1814
See application file for complete search history.

(56) References Cited

U.S. PATENT DOCUMENTS

| | | | |
|---|---|---|---|
| 5,331,373 | A | 7/1994 | Nomura et al. |
| 5,452,056 | A | 9/1995 | Nomura et al. |

(Continued)

FOREIGN PATENT DOCUMENTS

| | | | |
|---|---|---|---|
| AU | 2013275198 | B2 | 12/2013 |
| BR | 112014031215 | A | 4/2021 |

(Continued)

OTHER PUBLICATIONS

Jul. 19, 2024 Office Action in Australian Patent Application No. 2023248180.

(Continued)

*Primary Examiner* — Francis C Gray
(74) *Attorney, Agent, or Firm* — Venable LLP

(57) ABSTRACT

A cartridge includes a developing roller rotatable about a rotational axis thereof and a movable lever. A coupling member is operatively connected to the developing roller, with the coupling member being movable, in response to a movement of the lever, between (a) a first position in which the coupling member is exposed to outside of the cartridge, and (b) a second position. The coupling member is provided at a first end portion on a first side of the cartridge. In a direction of the rotational axis of the developing roller, the first position is farther from a second end portion provided on a second side of the cartridge that is opposite to the first end portion on the first side of the cartridge than the second position is from the second end portion on the second side of the cartridge.

12 Claims, 57 Drawing Sheets

Related U.S. Application Data division of application No. 17/752,042, filed on May 24, 2022, now Pat. No. 11,614,710, which is a division of application No. 17/114,535, filed on Dec. 8, 2020, now Pat. No. 11,385,593, which is a division of application No. 16/890,064, filed on Jun. 2, 2020, now Pat. No. 10,901,365, which is a division of application No. 16/171,786, filed on Oct. 26, 2018, now Pat. No. 10,705,480, which is a division of application No. 15/034,996, filed as application No. PCT/JP2014/082768 on Dec. 4, 2014, now Pat. No. 10,139,777.

(56) References Cited

U.S. PATENT DOCUMENTS

| | | | | |
|---|---|---|---|---|
| 5,528,341 | A | 6/1996 | Shishido et al. | |
| 5,585,889 | A | 12/1996 | Shishido et al. | |
| 5,729,796 | A | 3/1998 | Miura et al. | |
| 5,768,658 | A | 6/1998 | Watanabe et al. | |
| 5,815,644 | A | 9/1998 | Nishiuwatoko et al. | |
| 5,870,654 | A | 2/1999 | Sato et al. | |
| 5,870,655 | A | 2/1999 | Nishiuwatoko et al. | |
| 5,893,006 | A | 4/1999 | Kanno et al. | |
| 5,911,096 | A | 6/1999 | Batori et al. | |
| 5,920,753 | A | 7/1999 | Sasaki et al. | |
| 5,926,666 | A | 7/1999 | Miura et al. | |
| 5,937,240 | A | 8/1999 | Kanno et al. | |
| 5,940,657 | A | 8/1999 | Yokomori et al. | |
| 5,940,658 | A | 8/1999 | Yokoi et al. | |
| 5,950,049 | A | 9/1999 | Yokomori et al. | |
| 5,966,566 | A | 10/1999 | Odagawa et al. | |
| 5,974,288 | A | 10/1999 | Sato | |
| 6,019,449 | A | 2/2000 | Bullock et al. | |
| 6,070,029 | A | 5/2000 | Nishiuwatoko et al. | |
| 6,072,969 | A | 6/2000 | Yokomori et al. | |
| 6,075,957 | A | 6/2000 | Batori et al. | |
| 6,104,894 | A | 8/2000 | Sato et al. | |
| 6,131,007 | A | 10/2000 | Yamaguchi et al. | |
| 6,185,390 | B1 | 2/2001 | Higeta et al. | |
| 6,188,856 | B1 | 2/2001 | Sato | |
| 6,345,164 | B1 | 2/2002 | Yokomori et al. | |
| 6,381,420 | B1 | 4/2002 | Sato et al. | |
| 6,381,430 | B1 | 4/2002 | Yokomori et al. | |
| 6,496,667 | B2 | 12/2002 | Shiratori et al. | |
| 6,516,168 | B2 | 2/2003 | Shiratori et al. | |
| 6,560,422 | B2 | 5/2003 | Kanno et al. | |
| 6,640,066 | B2 | 10/2003 | Sato | |
| 6,681,088 | B2 | 1/2004 | Kanno et al. | |
| 6,714,749 | B2 | 3/2004 | Sato et al. | |
| 6,735,403 | B2 | 5/2004 | Kanno et al. | |
| 6,834,173 | B2 | 12/2004 | Yamaguchi et al. | |
| 6,895,199 | B2 | 5/2005 | Sato et al. | |
| 6,898,399 | B2 | 5/2005 | Morioka et al. | |
| 6,908,184 | B2 | 6/2005 | Shinada et al. | |
| 6,937,832 | B2 | 8/2005 | Sato et al. | |
| 6,937,834 | B2 | 8/2005 | Kanno et al. | |
| 6,947,687 | B2 | 9/2005 | Yamaguchi et al. | |
| 6,961,528 | B2 | 11/2005 | Yamaguchi et al. | |
| 6,980,759 | B2 | 12/2005 | Kanno et al. | |
| 7,058,337 | B2 | 6/2006 | Hashimoto et al. | |
| 7,149,457 | B2 | 12/2006 | Miyabe et al. | |
| 7,155,140 | B2 | 12/2006 | Arimitsu et al. | |
| 7,155,141 | B2 | 12/2006 | Sato et al. | |
| 7,158,736 | B2 | 1/2007 | Sato et al. | |
| 7,184,686 | B2 | 2/2007 | Kanno et al. | |
| 7,200,349 | B2 | 4/2007 | Sato et al. | |
| 7,218,882 | B2 | 5/2007 | Toba et al. | |
| 7,224,925 | B2 | 5/2007 | Sato et al. | |
| 7,283,766 | B2 | 10/2007 | Arimitsu et al. | |
| 7,349,657 | B2 | 3/2008 | Sato et al. | |
| 7,412,193 | B2 | 8/2008 | Sato et al. | |
| 7,463,844 | B2 | 12/2008 | Hashimoto et al. | |
| 7,499,663 | B2 | 3/2009 | Sato et al. | |
| 7,660,550 | B2 | 2/2010 | Mori et al. | |
| 7,689,146 | B2 | 3/2010 | Sato et al. | |
| 7,720,408 | B2 | 5/2010 | Ueno et al. | |
| 7,756,441 | B2 | 7/2010 | Kanno et al. | |
| 7,813,668 | B2 | 10/2010 | Ueno et al. | |
| 7,920,810 | B2 | 4/2011 | Oron et al. | |
| 7,929,881 | B2 | 4/2011 | Yoshino et al. | |
| 7,933,534 | B2 | 4/2011 | Hoshi et al. | |
| 8,059,988 | B2 | 11/2011 | Kanno et al. | |
| 8,090,292 | B2 | 1/2012 | Kanno et al. | |
| 8,285,179 | B2 | 3/2012 | Kimura et al. | |
| 8,155,557 | B2 | 4/2012 | Kanno et al. | |
| 8,170,444 | B2 | 5/2012 | Kanno et al. | |
| 8,170,445 | B2 | 5/2012 | Kanno et al. | |
| 8,385,775 | B2 | 2/2013 | Kanno et al. | |
| 8,396,391 | B2 | 3/2013 | Yamashita | |
| 8,437,661 | B2 | 5/2013 | Kanno et al. | |
| 8,472,839 | B2 | 6/2013 | Kishi | |
| 8,494,410 | B2 | 7/2013 | Kanno et al. | |
| 8,577,252 | B2 | 11/2013 | Anan et al. | |
| 8,639,160 | B2 | 1/2014 | Chadani et al. | |
| 8,682,211 | B2 | 3/2014 | Hoshi et al. | |
| 8,737,887 | B2 | 5/2014 | Cavill et al. | |
| 8,805,237 | B2 | 8/2014 | Kanno et al. | |
| 8,983,335 | B2 | 3/2015 | Yamashita et al. | |
| 9,025,998 | B2 | 5/2015 | Morioka et al. | |
| 9,134,696 | B2 | 9/2015 | Sato et al. | |
| 9,213,267 | B2 | 12/2015 | Hoshi et al. | |
| 9,274,499 | B2 | 3/2016 | Morioka et al. | |
| 9,291,994 | B2 | 3/2016 | Kanno et al. | |
| 9,310,762 | B2 | 4/2016 | Kanno et al. | |
| 9,389,531 | B2 * | 7/2016 | Suzuki ............... | G03G 15/0126 |
| 10,168,665 | B2 | 1/2019 | Miyabe et al. | |
| 11,067,950 | B2 | 7/2021 | Kashiide et al. | |
| 2003/0113131 | A1 | 6/2003 | Watanabe et al. | |
| 2003/0138270 | A1 | 7/2003 | Matsuoka | |
| 2006/0008289 | A1 | 1/2006 | Sato et al. | |
| 2006/0216061 | A1 | 9/2006 | Yamaguchi | |
| 2007/0059038 | A1 | 3/2007 | Shiraki | |
| 2007/0160388 | A1 | 7/2007 | Yoshimura et al. | |
| 2008/0159772 | A1 | 7/2008 | Koishi et al. | |
| 2008/0170880 | A1 | 7/2008 | Hashimoto | |
| 2008/0267666 | A1 | 10/2008 | Shirokoshi et al. | |
| 2009/0003875 | A1 | 1/2009 | Toba et al. | |
| 2009/0317134 | A1 | 12/2009 | Miyabe et al. | |
| 2010/0272470 | A1 | 10/2010 | Tomatsu et al. | |
| 2010/0303503 | A1 | 12/2010 | Woo | |
| 2011/0026843 | A1 | 2/2011 | Lee et al. | |
| 2011/0159970 | A1 | 6/2011 | Okabe | |
| 2011/0217073 | A1 | 9/2011 | He | |
| 2011/0222902 | A1 | 9/2011 | Miyahara | |
| 2011/0222903 | A1 | 9/2011 | Kishi | |
| 2011/0280620 | A1 | 11/2011 | Chadani et al. | |
| 2011/0311272 | A1 | 12/2011 | Nittani et al. | |
| 2012/0163859 | A1 | 6/2012 | Hashimoto et al. | |
| 2012/0201567 | A1 | 8/2012 | Toba et al. | |
| 2012/0269545 | A1 | 10/2012 | Morita et al. | |
| 2012/0321342 | A1 | 12/2012 | Mori | |
| 2013/0149008 | A1 | 6/2013 | Oomoto et al. | |
| 2013/0216264 | A1 | 8/2013 | Shimizu et al. | |
| 2013/0251402 | A1 | 9/2013 | Yamashita et al. | |
| 2014/0072327 | A1 | 3/2014 | Hayashi et al. | |
| 2014/0126929 | A1 * | 5/2014 | Tomatsu ............ | G03G 15/0189<br>399/110 |
| 2015/0093146 | A1 | 4/2015 | Sato et al. | |
| 2015/0227110 | A1 | 8/2015 | Yoshimura et al. | |
| 2015/0277367 | A1 | 10/2015 | Maeshima et al. | |
| 2015/0362859 | A1 | 12/2015 | Sato et al. | |
| 2017/0261927 | A1 | 9/2017 | Sato et al. | |
| 2018/0074454 | A1 | 3/2018 | Uneme et al. | |
| 2019/0227483 | A1 * | 7/2019 | Zhao .................. | G03G 21/1857 |
| 2019/0278219 | A1 | 9/2019 | Ueno et al. | |
| 2020/0117136 | A1 * | 4/2020 | Nishida .............. | G03G 21/1647 |
| 2020/0301352 | A1 * | 9/2020 | Matsumaru ........ | G03G 21/1647 |
| 2020/0301355 | A1 * | 9/2020 | Sato ................... | G03G 21/1842 |

FOREIGN PATENT DOCUMENTS

| | | |
|---|---|---|
| CL | 2008/002401 A | 9/2009 |
| CL | 2010/000577 A | 3/2011 |

(56) References Cited

FOREIGN PATENT DOCUMENTS

| | | | | | |
|---|---|---|---|---|---|
| CN | 1175713 | A | | 3/1998 | |
| CN | 101256382 | A | | 9/2008 | |
| CN | 101609298 | A | | 12/2009 | |
| CN | 101715570 | A | | 5/2010 | |
| CN | 101782738 | A | | 7/2010 | |
| CN | 102057333 | A | | 5/2011 | |
| CN | 102141766 | A | | 8/2011 | |
| CN | 102540842 | A | | 7/2012 | |
| CN | 202710931 | A | | 1/2013 | |
| CN | 202886850 | A | | 4/2013 | |
| CN | 103376708 | A | | 10/2013 | |
| CN | 104919374 | A | | 9/2015 | |
| CN | 107111269 | B | * | 12/2020 | ............ G03G 13/00 |
| DE | 11 2013 002 931 | T5 | | 3/2015 | |
| EP | 1 950 625 | A2 | | 3/2008 | |
| GB | 2518112 | A | | 3/2015 | |
| JP | H05-165366 | A | | 7/1993 | |
| JP | H11-73085 | A | | 3/1999 | |
| JP | 2001-337511 | A | | 12/2001 | |
| JP | 2003-162137 | A | | 6/2003 | |
| JP | 2003-208024 | A | | 7/2003 | |
| JP | 2007-079139 | A | | 3/2007 | |
| JP | 2007-279175 | A | | 10/2007 | |
| JP | 2008-150183 | A | | 7/2008 | |
| JP | 4498407 | B2 | | 7/2010 | |
| JP | 2011-133682 | A | | 7/2011 | |
| JP | 2011-185293 | A | | 9/2011 | |
| JP | 2012-027449 | A | | 2/2012 | |
| JP | 2013-054183 | A | | 3/2013 | |
| JP | 2014-016610 | A | | 1/2014 | |
| KR | 2008-0052324 | A | | 6/2008 | |
| KR | 101536545 | A | | 7/2014 | |
| PT | 2087407 | E | | 9/2013 | |
| RU | 2276412 | C2 | | 5/2006 | |
| RU | 2451961 | C2 | | 5/2012 | |
| RU | 2 488 869 | C1 | | 7/2013 | |
| TW | 201403270 | A | | 1/2014 | |
| WO | 2013/187534 | A1 | | 12/2013 | |

OTHER PUBLICATIONS

Sep. 23, 2024 Office Action in Chinese Patent Application No. 202211315295.2.
Office Action in Taiwanese Patent Application No. 10314359, dated May 13, 2016 (with English translation).
International Search Report and Written Opinion of the International Searching Authority in PCT/JP2014/082768.
Notification of a Preliminary Search Report with Opinion on Patentability in Moroccan Patent Application Nos. 38832 and 38988, issued Oct. 25, 2016 (with English translation).
Notice of Acceptance in Australian Patent Application No. 2014358122, mailed Feb. 28, 2018.
Notice of Allowance in Korean Patent Application No. 10-2016-7018006, mailed Feb. 28, 2018.
May 10, 2018 Office Action in Chilean Patent Application No. 201601374.
Decision on Grant in Russian Patent Application No. 2016126590, mailed Apr. 18, 2018 (with English translation).
Office Action in Korean Patent Application No. 10-2018-7015238, dated Aug. 8, 2018.
Examination Report in Indian Patent Application No. 201647022285, dated Jul. 6, 2018.
Examination Report in Australian Patent Application No. 2014358122, dated Mar. 17, 2017.
Jan. 23, 2019 Notice of Allowance in Korean Patent Application No. 10-2018-7031095.
Feb. 21, 2019 Office Action in German Patent Application No. 11 2014 005 568.9 (with English translation).
Decision on Grant in Russian Patent Application No. 2018126302, mailed Feb. 22, 2019 (with English Translation).
Office Action in Chinese Patent Application No. 201480065715.3, dated Mar. 20, 2019 (with English translation).
Communication in European Patent Application No. 14 824 556.6, dated Apr. 12, 2019.
Aug. 22, 2019 Office Action in Indonesian Patent Application No. P00201603420 (with English translation).
Decision to Grant in Russian Patent Application No. 2019112104, mailed Oct. 7, 2019 (with English translation).
Jan. 28, 2020 Notice of Acceptance in Australian Patent Application No. 2018204296.
Apr. 24, 2020 Decision to Grant in Russian Patent Application No. 2019139670 (with English translation).
Apr. 7, 2020 Office Action in Brazilian Patent Application No. 112016009776-9, (with English translation).
Nov. 6, 2019 Examination Report in U.K. Patent Application No. GB1611633.7.
Nov. 7, 2019 Search Report in United Arab Emirates Patent Application No. UAE/P/0707/2016.
Dec. 20, 2019 Communication in European Patent Application No. 14 824 556.6.
Jan. 19, 2021 Office Action in Japanese Patent Application No. 2019-234047 (with partial English translation).
Sep. 8, 2021 Office Action in Australian Patent Application No. 2020200121.
Aug. 26, 2021 Decision to Grant in Russian Patent Application No. 2021107061 (with English translation).
Jan. 25, 2021 Decision to Grant in Russian Patent Application No. 2020122374 (with English translation).
Feb. 16, 2021 Notice of Allowance in Korean Patent Application No. 10-2020-7037151.
Apr. 28, 2022 Office Action in Chinese Patent Application No. 202010535760.8 (with English translation).
Apr. 21, 2022 Office Action in Chinese Patent Application No. 202010534938.7 (with English translation).
Feb. 17, 2022 Notice of Allowance in Korean Patent Application No. 10-2021-7014512.
May 3, 2022 Office Action in Brazilian Patent Application No. BR112016009776-9 (with English translation).
Sep. 6, 2022 Office Action in Brazilian Patent Application No. 122020013796-7 (with English translation).
Jun. 14, 2023 Philippine Examination Report in Philippine Patent Application No. 1/2016/500923.
Jul. 18, 2023 Notice of Allowance in Australian Patent Application No. 2021221578.
Oct. 19, 2023 Notice of Allowance in Philippian Patent Application No. 1/2016/500923.
May 10, 2024 Office Action in Chinese Patent Application No. 202211315295.2 (with English translation).

* cited by examiner (a)

(b)

(c)

(a)

(b)

CARTRIDGE, PROCESS CARTRIDGE AND ELECTROPHOTOGRAPHIC IMAGE FORMING APPARATUS

FIELD OF THE INVENTION

The present invention relates to an electrophotographic image forming apparatus (image forming apparatus) and a cartridge detachably mountable to a main assembly of the image forming apparatus.

Here, the image forming apparatus forms an image on a recording material using an electrophotographic image forming process. Examples of the image forming apparatus include an electrophotographic copying machine, an electrophotographic printer (laser beam printer, LED or printer, for example), a facsimile machine, a word processor and so on.

The cartridge comprises an electrophotographic photosensitive drum (drum or photosensitive drum) as an image bearing member, and at least one of process means actable on the drum (a developer carrying member (developing roller)), which are unified into a cartridge which is detachably mountable to the image forming apparatus. The cartridge may comprise the drum and the developing roller as a unit, or may comprises the drum, or may comprises the developing roller. A cartridge which comprises the drum is a drum cartridge, and the cartridge which comprises the developing roller is a developing cartridge.

The main assembly of the image forming apparatus is portions of the image forming apparatus other than the cartridge.

BACKGROUND ART

In a conventional image forming apparatus, a drum and process means actable on the drum are unified into a cartridge which is detachably mountable to a main assembly of the apparatus (process cartridge type).

With such a process cartridge type, maintenance operations for the image forming apparatus can be performed in effect by the user without relying on a service person, and therefore, the operationality can be remarkably improved. Therefore, the process cartridge type is widely used in the field of the image forming apparatus.

A process cartridge (Japanese Laid-open Patent Application 2001-337511), for example) and an image forming apparatus (Japanese Laid-open Patent Application 2003-208024, for example) have been proposed, in which a clutch is provided to effect switching to drive the developing roller during an image forming operation and to shut off the drive of the developing roller during a non-image-formation.

SUMMARY OF THE INVENTION

Problem to be Solved by the Invention

In Japanese Laid-open Patent Application 2001-337511, a spring clutch is provided at an end portion of the developing roller to switch the drive.

In addition, in Japanese Laid-open Patent Application 2003-208024, a clutch is provided in the image forming apparatus to switch the drive for the developing roller.

Accordingly, it is a principal object of the present invention to improve the clutch for switching the drive for the developing roller.

Means for Solving the Problem

According to an aspect of the present invention, there is provided a process cartridge detachably mountable to a main assembly of an electrophotographic image forming apparatus, the main assembly including a main assembly side drive transmission member and a main assembly side urging member, said process cartridge comprising (i) a rotatable photosensitive member; (ii) a rotatable developing roller configured to develop a latent image formed on said photosensitive member, said developing roller being capable of contacting to and spacing from said photosensitive member; (iii) an urging force receiving portion configured to receive, from the main assembly side urging member, an urging force for spacing said developing roller from said photosensitive member; (iv) a cartridge side drive transmission member capable of the coupling with the main assembly side drive transmission member and configured to receive, from the main assembly side drive transmission member, a rotational force for rotating said developing roller; and (v) a decoupling member capable of urging said cartridge side drive transmission member by the urging force received by said urging force receiving portion to decouple said cartridge side drive transmission member from the main assembly side drive transmission member.

According to another aspect of the present invention, there is provided a process cartridge for electrophotographic image formation, said process cartridge comprising (i) a rotatable photosensitive member; (ii) a rotatable developing roller configured to develop a latent image formed on said photosensitive member, said developing roller being capable of contacting to and spacing from said photosensitive member; (iii) an urging force receiving portion configured to receive an urging force for spacing said developing roller from said photosensitive member; (iv) a drive input member configured to receive a rotational force for rotating said developing roller; and (v) an urging member capable of moving said drive input member inwardly of said cartridge by the urging force received by said urging force receiving portion.

According to a further aspect of the present invention, there is provided an electrophotographic image forming apparatus capable of image formation on a recording material, said apparatus comprising (i) a main assembly of the electrophotographic image forming apparatus, said main assembly including a main assembly side urging member and a main assembly side drive transmission member; and (ii) a process cartridge detachably mountable to said main assembly, said process cartridge including (ii-i) a rotatable photosensitive member, (ii-ii) a rotatable developing roller configured to develop a latent image formed on said photosensitive member, said developing roller being capable of contacting to and spacing from said photosensitive member, (ii-iii) an urging force receiving portion configured to receive, from said main assembly side urging member, an urging force for spacing said developing roller from said photosensitive member, (ii-iv) a cartridge side drive transmission member, capable of the coupling with said main assembly side drive transmission member, for receiving, from said main assembly side drive transmission member, a rotational force for rotating said developing roller, and (ii-v) a decoupling member capable of urging said cartridge side drive transmission member by the urging force received by said urging force receiving portion to decouple said cartridge side drive transmission member from the main assembly side drive transmission member.

According to a further aspect of the present invention, there is provided a process cartridge detachably mountable to a main assembly of an electrophotographic image forming apparatus, said process cartridge comprising a photosensitive member; a photosensitive member frame rotatably supporting said photosensitive member; a developing roller configured to develop a latent image formed on said photosensitive member; a developing device frame rotatably supporting said developing roller, said developing device frame is connected with said photosensitive member frame such that said developing device frame is rotatable relative to said photosensitive member frame between a contacting position in which said developing roller contacts said photosensitive member and a spacing position in which said developing roller is spaced from said photosensitive member; a cartridge side drive transmission member capable of coupling with a main assembly side drive transmission member provided in said main assembly and configured to receive, from the main assembly side drive transmission member, a rotational force for rotating said developing roller, said cartridge side drive transmission member being rotatable about a rotation axis about which said developing device frame is rotatable relative to said photosensitive member frame; a releasing mechanism for releasing said cartridge side drive transmission member from the main assembly side drive transmission member, with rotation of said developing device frame from the contacting position to the spacing position.

According to a further aspect of the present invention, there is provided a process cartridge for electrophotographic image formation, said process cartridge comprising (i) a rotatable photosensitive member; (ii) a photosensitive member frame rotatably supporting said photosensitive member; (iii) a developing roller configured to develop a latent image formed on said photosensitive member; (iv) a developing device frame rotatably supporting said developing roller, said developing device frame is connected with said photosensitive member frame such that said developing device frame is rotatable relative to said photosensitive member frame between a contacting position in which said developing roller contacts said photosensitive member and a spacing position in which said developing roller is spaced from said photosensitive member; (v) a drive input member for receiving a rotational force for rotating said developing roller, said drive input member being rotatable about a rotation axis about with said developing device frame rotates relative to said photosensitive member frame; and (vi) an urging mechanism capable of moving said drive input member inwardly of said cartridge with the rotation of said developing device frame from the contacting position to the spacing position.

According to a further aspect of the present invention, there is provided an electrophotographic image forming apparatus for forming a image on a recording material, said apparatus comprising (i) a main assembly of the electrophotographic image forming apparatus, said main assembly including a main assembly side drive transmission member for transmitting a rotational force; (ii) a process cartridge detachably mountable to said main assembly, said process cartridge including, (ii-i) a photosensitive member, (ii-ii) a photosensitive member frame rotatably supporting said photosensitive member, (ii-iii), (ii-iv) a developing device frame rotatably supporting said developing roller, said developing device frame is connected with said photosensitive member frame such that said developing device frame is rotatable relative to said photosensitive member frame between a contacting position in which said developing roller contacts said photosensitive member and a spacing position in which said developing roller is spaced from said photosensitive member, (ii-v) a cartridge side drive transmission member capable of coupling with the main assembly side drive transmission member and configured to receive, from the main assembly side drive transmission member, a rotational force for rotating said developing roller, said cartridge side drive transmission member being rotatable about a rotation axis about which said developing device frame is rotatable relative to said photosensitive member frame, and (ii-vi) a releasing mechanism for releasing said cartridge side drive transmission member from the main assembly side drive transmission member, with rotation of said developing device frame from the contacting position to the spacing position.

According to a further aspect of the present invention, there is provided a cartridge detachably mountable to a main assembly of the electrophotographic image forming apparatus, the main assembly including a main assembly side drive transmission member and a main assembly side urging member, said cartridge comprising (i) rotatable developing roller; (ii) a cartridge side drive transmission member capable of the coupling with the main assembly side drive transmission member and configured to receive, from the main assembly side drive transmission member, a rotational force for rotating said developing roller; (iii) an urging force receiving portion configured to receive an urging force from the main assembly side urging member; (v) a decoupling member capable of urging said cartridge side drive transmission member by the urging force received by said urging force receiving portion to decouple said cartridge side drive transmission member from the main assembly side drive transmission member, wherein when said cartridge is seen along a rotational axis of said developing roller, said developing roller is disposed between said cartridge side drive transmission member and said urging force receiving portion.

According to a further aspect of the present invention, there is provided a cartridge for electrophotographic image formation, said cartridge comprising (i) rotatable developing roller; (ii) a drive input member for receiving a rotational force for rotating said developing roller; (iii) an urging force receiving portion capable of receiving an urging force; (iv) an urging member capable of moving said drive input member inwardly of said cartridge by the urging force received by said urging force receiving portion, wherein when said cartridge it is seen along a rotational axis of said developing roller, said developing roller is disposed between said drive input member and said urging force receiving portion.

DESCRIPTION OF THE EMBODIMENTS

Embodiment 1

[General Description of the Electrophotographic Image Forming Apparatus]

A first embodiment of the present invention will be described referring to the accompanying drawing.

The example of the image forming apparatuses of the following embodiments is a full-color image forming apparatus to which four process cartridges are detachably mountable.

The number of the process cartridges mountable to the image forming apparatus is not limited to this example. It is properly selected as desired.

For example, in the case of a monochromatic image forming apparatus, the number of the process cartridges mounted to the image forming apparatus is one. The examples of the image forming apparatuses of the following embodiments are printers.

[General Arrangement of the Image Forming Apparatus]

Figure 2:
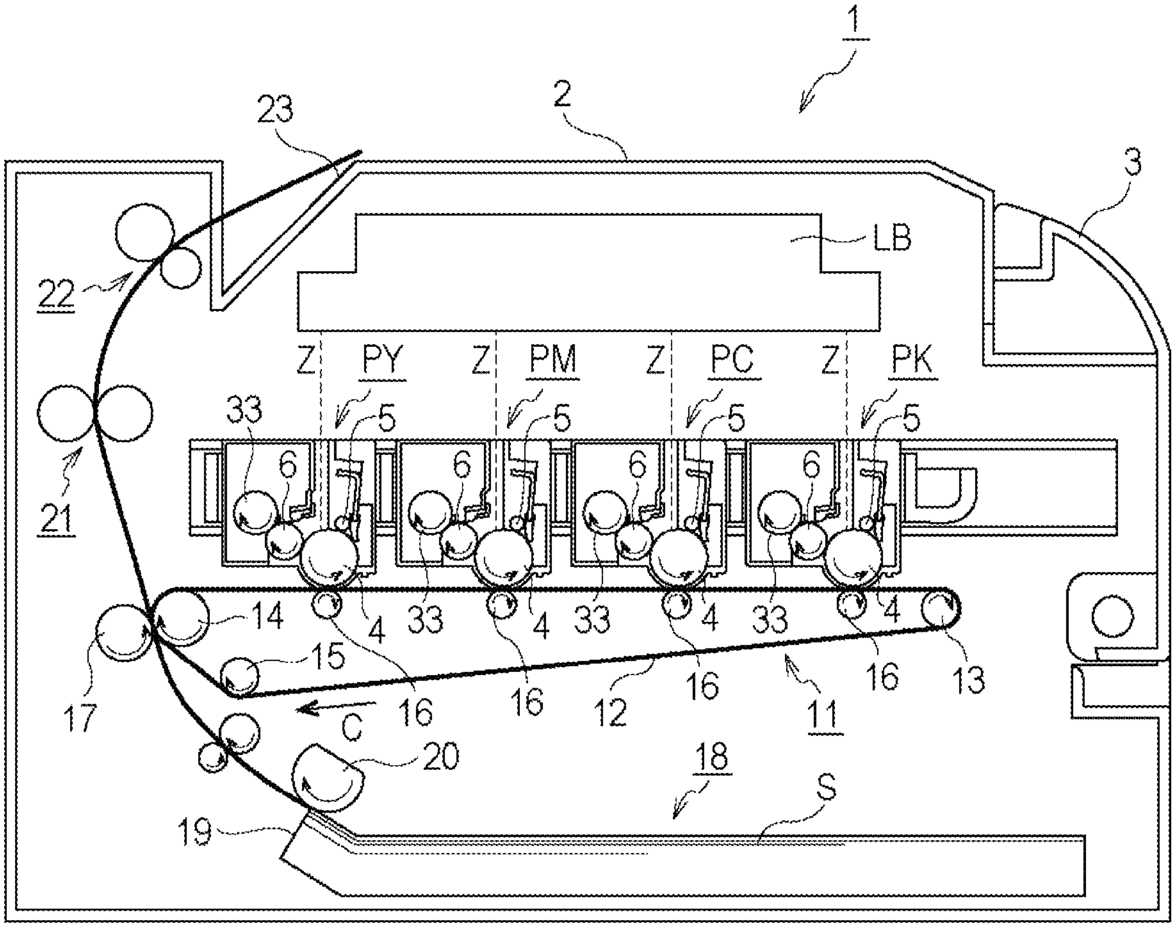
FIG. 2 is a sectional view of an image forming apparatus according to the first embodiment.
Figure 3:
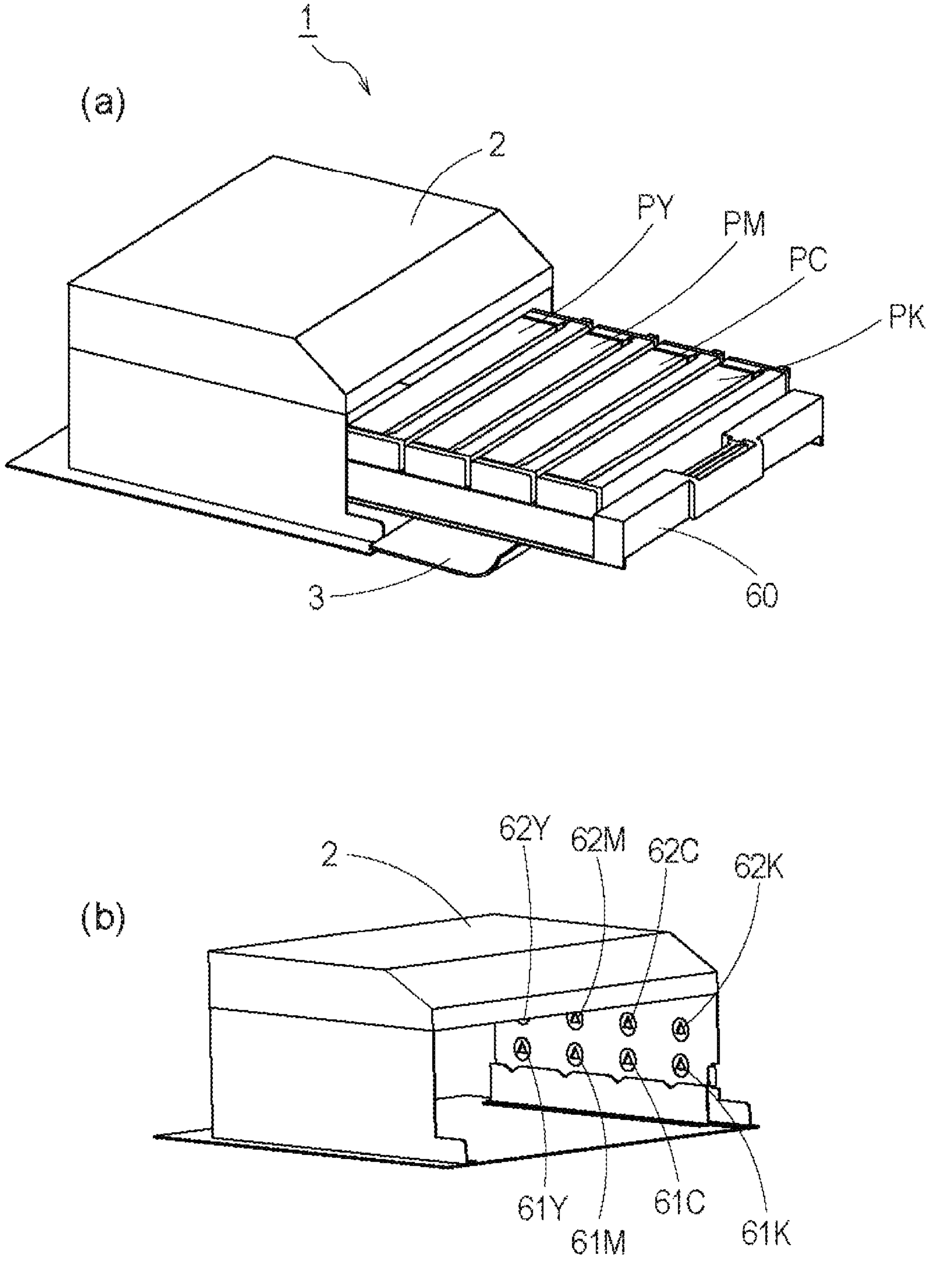
FIG. 3 is a perspective view of the image forming apparatus according to the first embodiment.
Figure 4:
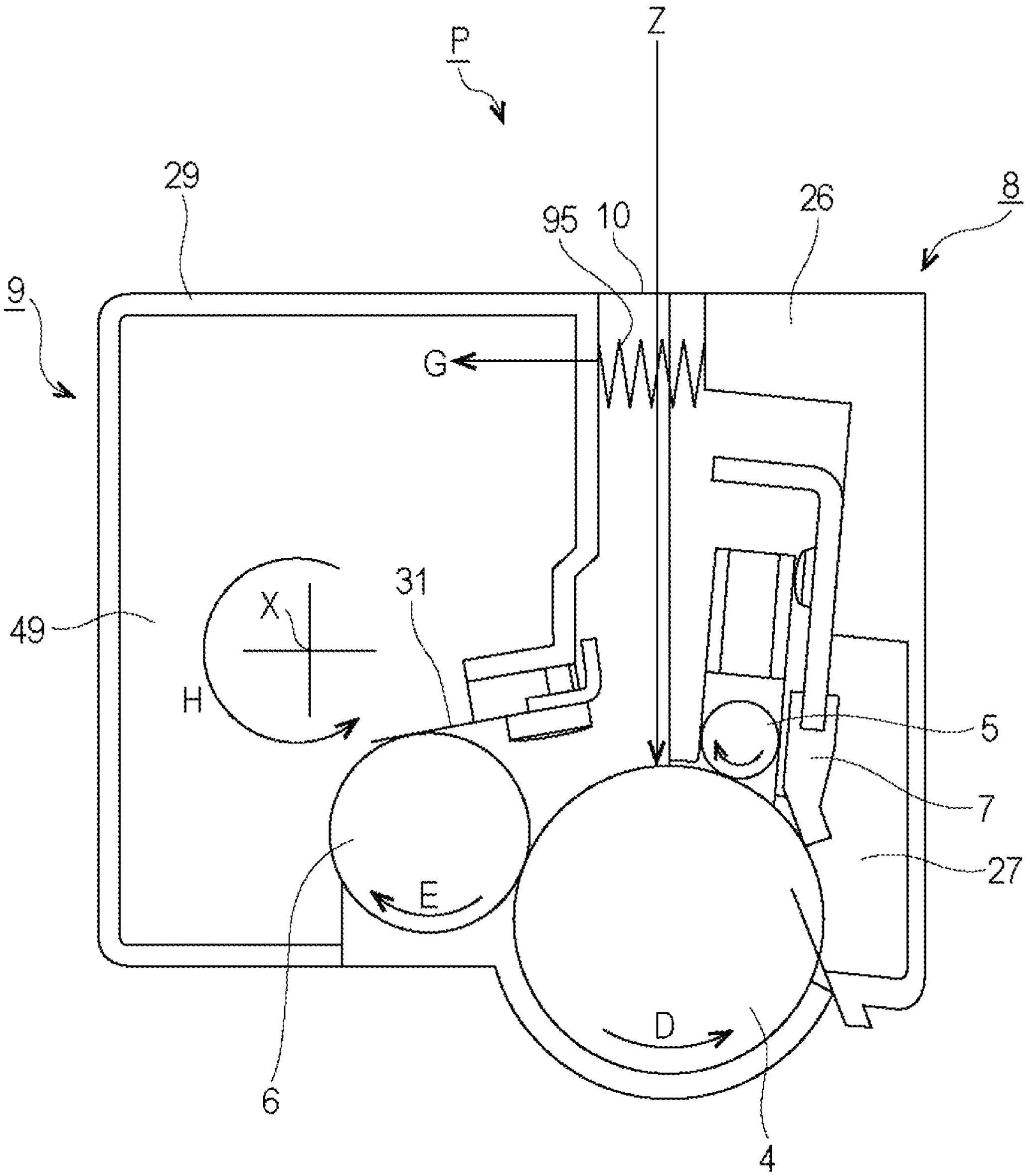
FIG. 4 is a sectional view of the process cartridge according to the first embodiment.
Figure 5:
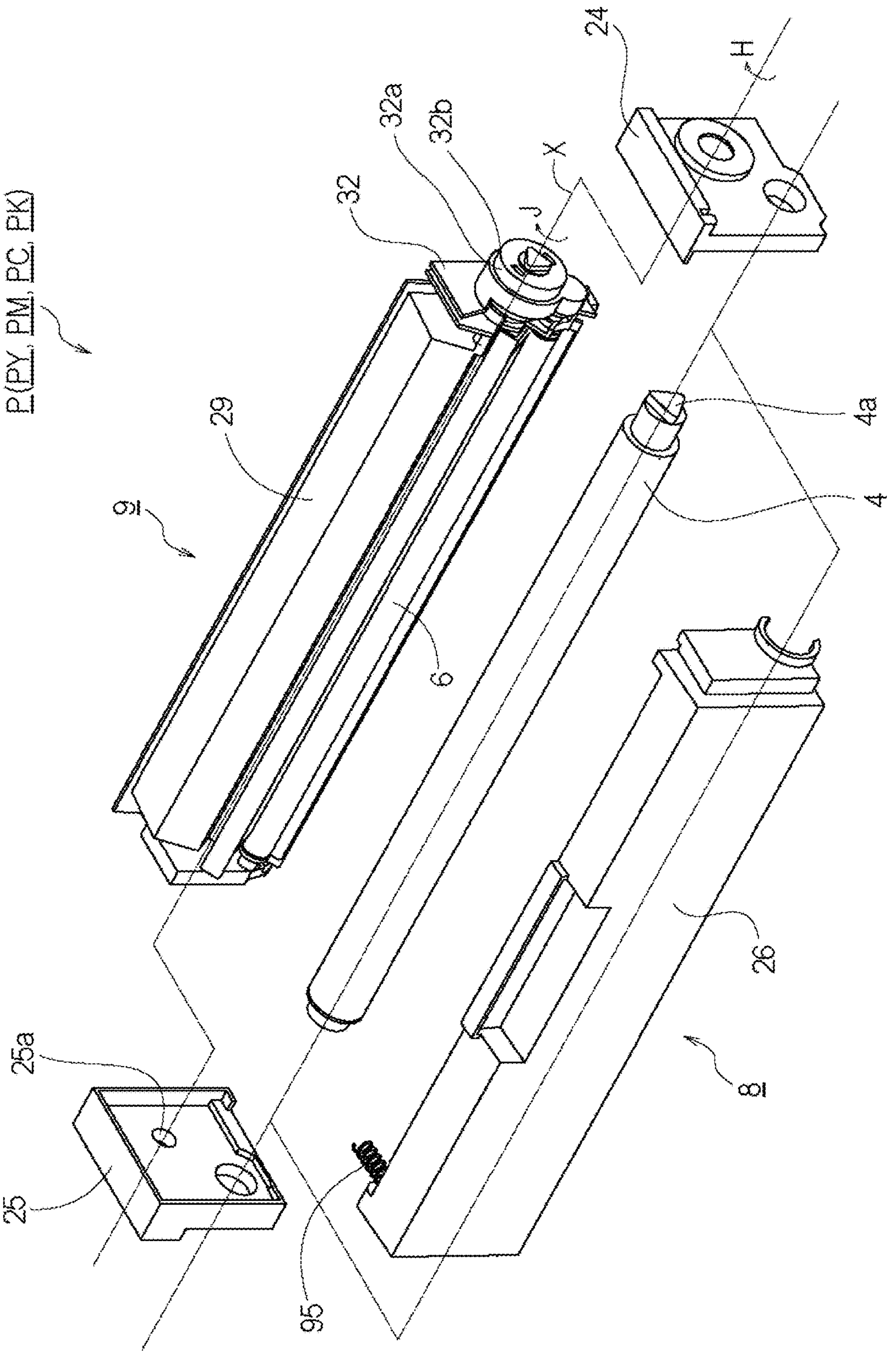
FIG. 5 is an exploded perspective view of the process cartridge according to the first embodiment.
Figure 6:
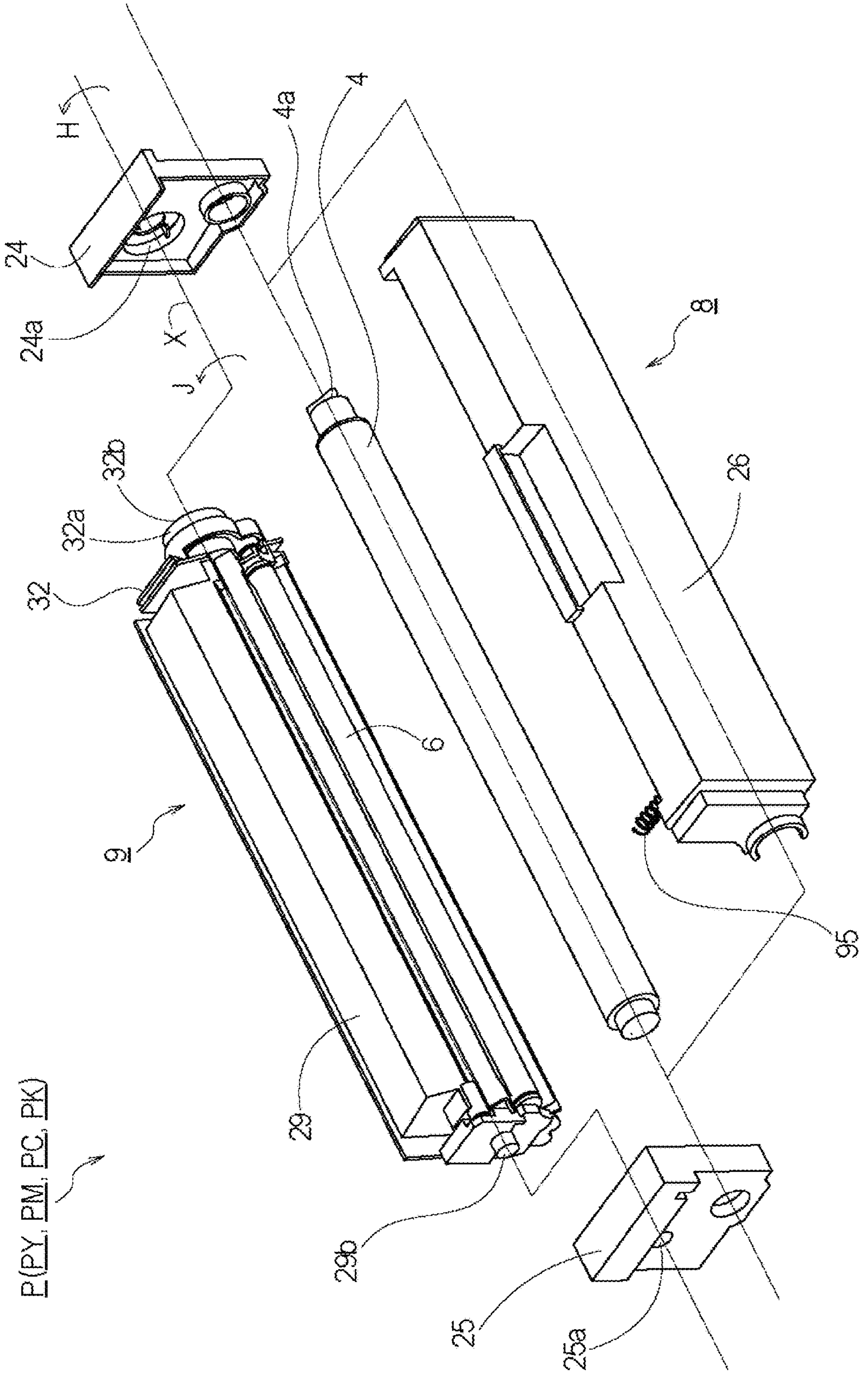
FIG. 6 is an exploded perspective view of the process cartridge according to the first embodiment, as seen from a non-driving side.

FIG. 2 is a schematic section of an electrophotographic image forming apparatus capable of forming an image on a recording material, according to this embodiment. Part (a) of FIG. 3 is a perspective view of the image forming apparatus of this embodiment. FIG. 4 is a sectional view of a process cartridge P of this embodiment. FIG. 5 is a perspective view of the process cartridge P of this embodiment as seen from a driving side, and FIG. 6 is a perspective view of the process cartridge P of this embodiment as seen from a non-driving side.

As shown in FIG. 2, the image forming apparatus 1 is a four full-color laser beam printer using an electrophotographic image forming process for forming a color image on a recording material S. The image forming apparatus 1 is of a process cartridge type, in which the process cartridges are dismountably mounted to a main assembly 2 of the electrophotographic image forming apparatus to form the color image on the recording material S.

Here, a side of the image forming apparatus 1 that is provided with a front door 3 is a front side, and a side opposite from the front side is a rear side. In addition, a right side of the image forming apparatus 1 as seen from the front side is a driving side, and a left side is a non-driving side. FIG. 2 is a sectional view of the image forming apparatus 1 as seen from the non-driving side, in which a front side of the sheet of the drawing is the non-driving side of the image forming apparatus 1, the right side of the sheet of the drawing is the front side of the image forming apparatus 1, and the rear side of the sheet of the drawing is the driving side of the image forming apparatus 1.

In the main assembly 2 of the image forming apparatus, there are provided process cartridges P (PY, PM, PC, PK) including a first process cartridge PY (yellow), a second process cartridge PM (magenta), a third process cartridge PC (cyan), and a fourth process cartridge PK (black), which are arranged in the horizontal direction.

The first-fourth process cartridges P (PY, PM, PC, PK) include similar electrophotographic image forming process mechanisms, although the colors of the developers contained therein are different. To the first-fourth process cartridges P (PY, PM, PC, PK), rotational forces are transmitted from drive outputting portions of the main assembly 2 of the image forming apparatus. This will be described in detail hereinafter.

In addition, the first-fourth each process cartridges P (PY, PM, PC, PK) are supplied with bias voltages (charging bias voltages, developing bias voltages and so on) (unshown), from the main assembly 2 of the image forming apparatus.

As shown in FIG. 4, each of the first-fourth process cartridges P (PY, PM, PC, PK) includes a photosensitive drum unit 8 provided with a photosensitive drum 4, a charging means and a cleaning means as process means actable on the drum 4.

In addition, each of the first-fourth process cartridges P (PY, PM, PC, PK) includes a developing unit 9 provided with a developing means for developing an electrostatic latent image on the drum 4.

The first process cartridge PY accommodates a yellow (Y) developer in a developing device frame 29 thereof to form a yellow color developer image on the surface of the drum 4.

The second process cartridge PM accommodates a magenta (M) developer in the developing device frame 29 thereof to form a magenta color developer image on the surface of the drum 4.

The third process cartridge PC accommodates a cyan (C) developer in the developing device frame 29 thereof to form a cyan color developer image on the surface of the drum 4.

The fourth process cartridge PK accommodates a black (K) developer in the developing device frame 29 thereof to form a black color developer image on the surface of the drum 4.

Above the first-fourth process cartridges P (PY, PM, PC, PK), there is provided a laser scanner unit LB as an exposure means. The laser scanner unit LB outputs a laser beam in accordance with image information. The laser beam Z is scanningly projected onto the surface of the drum 4 through an exposure window 10 of the cartridge P.

Below the first-fourth cartridges P (PY, PM, PC, PK), there is provided an intermediary transfer belt unit 11 as a transfer member. The intermediary transfer belt unit 11 includes a driving roller 13, tension rollers 14 and 15, around which a transfer belt 12 having flexibility is extended.

The drum 4 of each of the first-fourth cartridges P (PY, PM, PC, PK) contacts, at the bottom surface portion, an upper surface of the transfer belt 12. The contact portion is a primary transfer portion. Inside the transfer belt 12, there is provided a primary transfer roller 16 opposed to the drum 4.

In addition, there is provided a secondary transfer roller 17 at a position opposed the tension roller 14 with the transfer belt 12 interposed therebetween. The contact portion between the transfer belt 12 and the secondary transfer roller 17 is a secondary transfer portion.

Below the intermediary transfer belt unit 11, a feeding unit 18 is provided. The feeding unit 18 includes a sheet feeding tray 19 accommodating a stack of recording materials S, and a sheet feeding roller 20.

Below an upper left portion in the main assembly 2 of the apparatus in FIG. 2, a fixing unit 21 and a discharging unit 22 are provided. An upper surface of the main assembly 2 of the apparatus functions as a discharging tray 23.

The recording material S having a developer image transferred thereto is subjected to a fixing operation by a fixing means provided in the fixing unit 21, and thereafter, it is discharged to the discharging tray 23.

The cartridge P is detachably mountable to the main assembly 2 of the apparatus through a drawable cartridge tray 60. Part (a) of FIG. 3 shows a state in which the cartridge tray 60 and the cartridges P are drawn out of the main assembly 2 of the apparatus.

[Image Forming Operation]

Operations for forming a full-color image will be described.

The drums 4 of the first-fourth cartridges P (PY, PM, PC, PK) are rotated at a predetermined speed (counterclockwise direction in FIG. 2, a direction indicated by arrow D in FIG. 4).

The transfer belt 12 is also rotated at the speed corresponding to the speed of the drum 4 codirectionally with the rotation of the drums (the direction indicated by an arrow C in FIG. 2).

Also, the laser scanner unit LB is driven. In synchronism with the drive of the scanner unit LB, the surface of the drums 4 are charged by the charging rollers 5 to a predetermined polarity and potential uniformly. The laser scanner unit LB scans and exposes the surfaces of the drums 4 with the laser beams Z in accordance with the image signal off the respective colors.

By this, the electrostatic latent images are formed on the surfaces of the drums 4 in accordance with the corresponding color image signal, respectively. The electrostatic latent images are developed by the respective developing rollers 6 rotated at a predetermined speed (clockwisely in FIG. 2, the direction indicated by an arrow E in FIG. 4).

Through such an electrophotographic image forming process operation, a yellow color developer image corresponding to the yellow component of the full-color image is formed on the drum 4 of the first cartridge PY. Then, the developer image is transferred (primary transfer) onto the transfer belt 12.

Similarly, a magenta developer image corresponding to the magenta component of the full-color image is formed on the drum 4 of the second cartridge PM. The developer image is transferred (primary transfer) superimposedly onto the yellow color developer image already transferred onto the transfer belt 12.

Similarly, a cyan developer image corresponding to the cyan component of the full-color image is formed on the drum 4 of the third cartridge PC. Then, the developer image is transferred (primary transfer) superimposedly onto the yellow color and magenta color developer images already transferred onto the transfer belt 12.

Similarly, a black developer image corresponding to the black component of the full-color image is formed on the drum 4 of the fourth cartridge PK. Then, the developer image is transferred (primary transfer) superimposedly on the yellow color, magenta color and cyan color developer images already transferred onto the transfer belt 12.

In this manner, a four full-color comprising yellow color, magenta color, cyan color and black color is formed on the transfer belt 12 (unfixed developer image).

On the other hand, a recording material S is singled out and fed at predetermined control timing. The recording material S is introduced at predetermined control timing to the secondary transfer portion which is the contact portion between the secondary transfer roller 17 and the transfer belt 12.

By this, the four color superimposed developer image is all together transferred sequentially onto the surface of the recording material S from the transfer belt 12 while the recording material S is being fed to the secondary transfer portion.

[General Arrangement of the Process Cartridge]

The general arrangement of the process cartridge for forming an electrophotographic image will be described. In this embodiment, the first-fourth cartridges P (PY, PM, PC, PK) have similar electrophotographic image forming process mechanisms, although the colors and/or the filled amounts of the developers accommodated therein are different.

The cartridge P is provided with the drum 4 as the photosensitive member, and the process means actable on the drum 4. The process means includes the charging roller 5 as the charging means for charging the drum 4, a developing roller 6 as the developing means for developing the latent image formed on the drum 4, a cleaning blade 7 as the cleaning means for removing a residual developer remaining on the surface of the drum 4, and so on. The cartridge P is divided into the drum unit 8 and the developing unit 9.

[Structure of the Drum Unit]

As shown in FIGS. 4, 5 and 6, the drum unit 8 comprises the drum 4 as the photosensitive member, the charging roller 5, the cleaning blade 7, a cleaner container 26 as a photosensitive member frame, a residual developer accommodating portion 27, cartridge cover members (a cartridge cover member 24 in the driving side, and a cartridge cover member 25 in the non-driving side in FIGS. 5 and 6). The photosensitive member frame in a broad sense comprises the cleaner container 26 which is the photosensitive member frame in a narrow sense, and the residual developer accommodating portion 27, the driving side cartridge cover member 24, the non-driving side cartridge cover member 25 as well (this applies to the embodiments described hereinafter). When the cartridge P is mounted to the main assembly 2 of the apparatus, the photosensitive member frame is fixed to the main assembly 2 of the apparatus.

The drum 4 is rotatably supported by the cartridge cover members 24 and 25 provided at the longitudinal opposite end portions of the cartridge P. Here, an axial direction of the drum 4 is the longitudinal direction.

The cartridge cover members 24 and 25 are fixed to the cleaner container 26 at the opposite longitudinal end portions of the cleaner container 26.

As shown in FIG. 5, a drive input portion for the photosensitive drum (a drive transmitting portion for the photosensitive drum) **4*a* which is a coupling member for transmitting a driving force to the drum 4 is provided at one longitudinal end portion of the drum 4. Part (b) of FIG. 3 is a perspective view of the main assembly 2 of the apparatus, in which the cartridge tray 60 and the cartridge P are not shown. The coupling members 4*a* of the cartridges P (PY, PM, PC, PK) are engaged with drum-driving-force-outputting members 61 (61Y, 61M, 61C, 61K) as main assembly side drive transmission members of the main assembly of the apparatus 2 shown in part (b) of FIG. 3 so that the driving force of a driving motor (unshown) of the main assembly of the apparatus is transmitted to the drums 4**.

The charging roller 5 is supported by the cleaner container 26 and is contacted to the drum 4 so as to be driven thereby.

The cleaning blade 7 is supported by the cleaner container 26 so as to be contacted to the circumferential surface of the drum 4 at a predetermined pressure.

An untransferred residual developer removed from the peripheral surface of the drum 4 by the cleaning means 7 is accommodated in the residual developer accommodating portion 27 in the cleaner container 26.

In addition, the driving side cartridge cover member 24 and the non-driving side cartridge cover member 25 are provided with supporting portions **24*a*, 25*a* as sliding portions for rotatably supporting the developing unit 9 (FIG. 6**).

[Structure of the Developing Unit]

Figure 1:
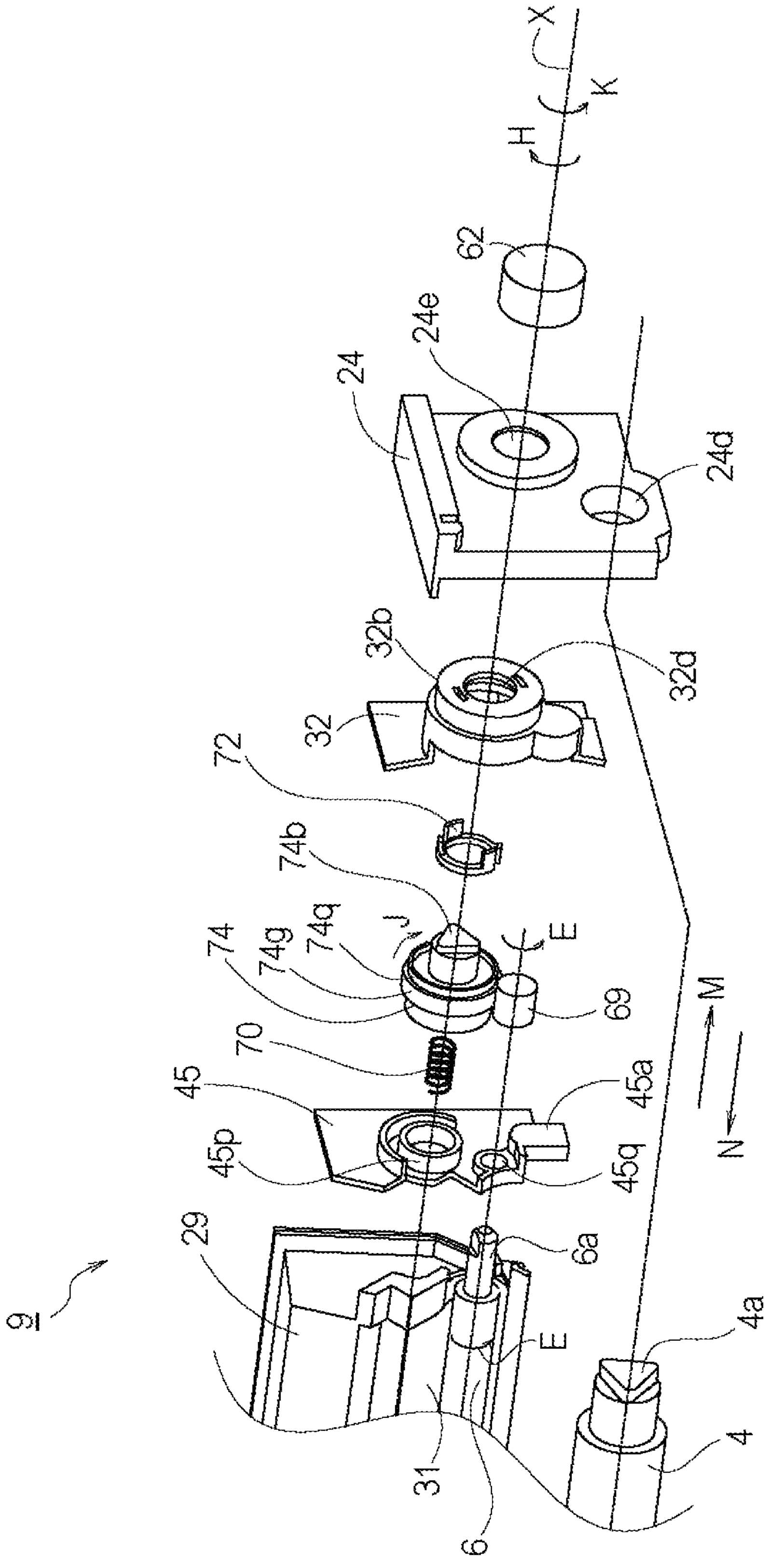
FIG. 1 is an exploded perspective view of a drive connecting portion and elements therearound of a process cartridge according to a first embodiment of the present invention, as seen from a driving side.
Figure 8:
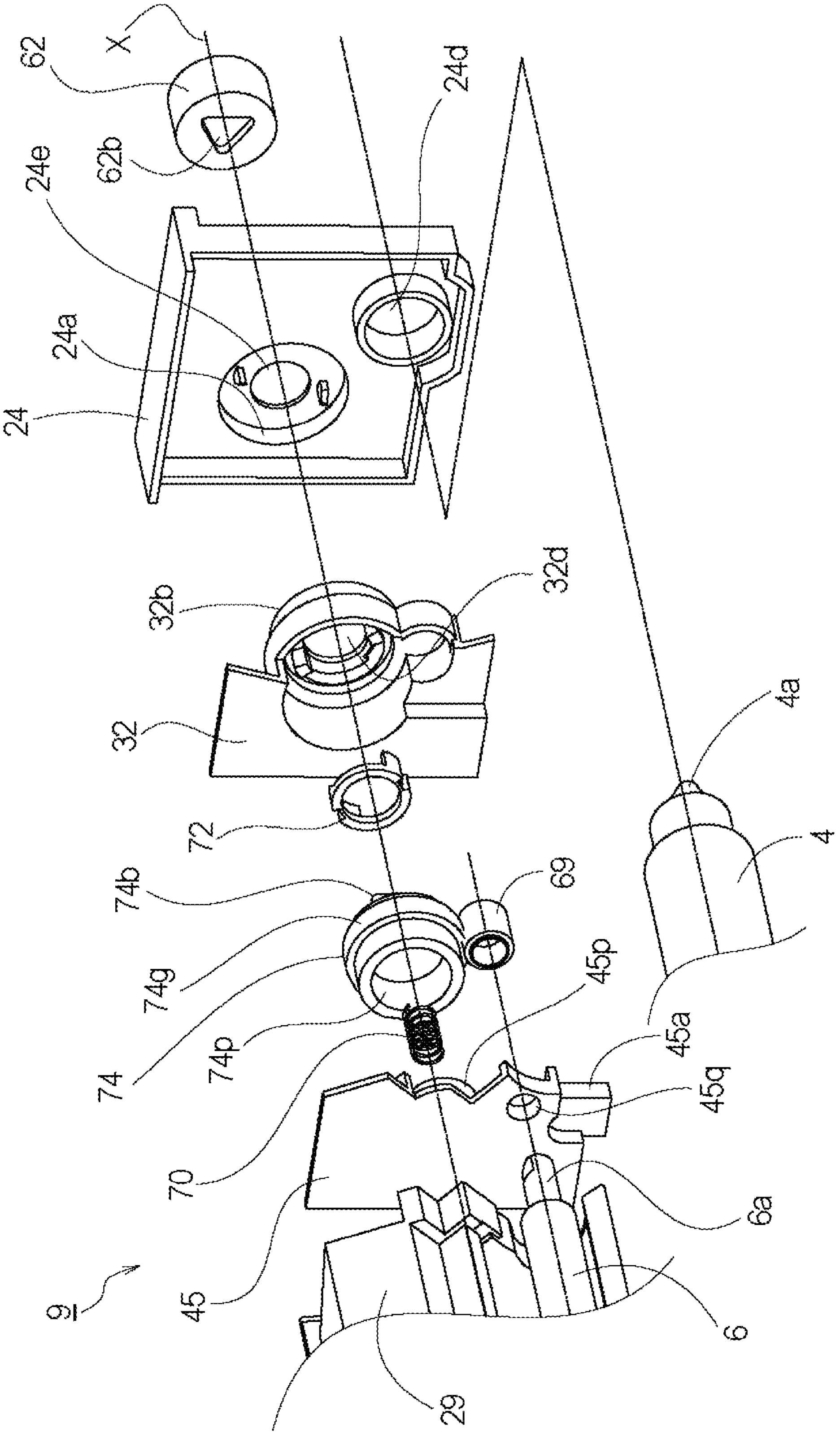
FIG. 8 is an exploded perspective view of the drive connecting portion and the elements therearound of the process cartridge according to the first embodiment, as seen from a non-driving side.

As shown in FIGS. 1 and 8, the developing unit 9 comprises the developing roller 6, a developing blade 31, the developing device frame 29, a bearing member 45, a developing device covering member 32 and so on. The developing device frame in a broad sense comprises the bearing member 45 and the developing device covering member 32 and so on as well as the developing device frame 29 (this applies to the embodiments which will be described hereinafter). When the cartridge P is mounted to the main assembly 2 of the apparatus, the developing device frame 29 is movable relative to the main assembly 2 of the apparatus.

The cartridge frame in a broad sense comprises the photosensitive member frame in the above-described broad sense and the developing device frame in the above-described broad sense (the same applies to the embodiments which will be described hereinafter).

The developing device frame 29 includes the developer accommodating portion 49 accommodating the developer to be supplied to the developing roller 6, and the developing blade 31 for regulating a layer thickness of the developer on the peripheral surface of the developing roller 6.

In addition, as shown in FIG. 1, the bearing member 45 is fixed to one longitudinal end portion of the developing device frame 29. The bearing member 45 rotatably supports the developing roller 6. The developing roller 6 is provided with a developing roller gear 69 as a drive transmission member at a longitudinal end portion. The bearing member 45 also supports rotatably a cartridge side drive transmission member (drive input member) 74 for transmitting the driving force to the developing roller gear 69. The cartridge side drive transmission member (drive input member) 74 is capable of the coupling with a development drive output member 62 (62Y, 62M, 62C and 62K) as a main assembly side drive transmission member of the main assembly 2 shown in part (b) of FIG. 3. That is, by the engagement or coupling between the cartridge side drive transmission member and the development drive output member with each other, the driving force is transmitted from a motor (not shown) provided in the main assembly 2. This will be described in detail hereinafter.

The developing device covering member 32 is fixed to an outside of the bearing member 45 with respect to the longitudinal direction of the cartridge P. The developing device covering member 32 covers the developing roller gear 69 and a part of the cartridge side drive transmission member 36 and so on.

[Assembling of the Drum Unit and the Developing Unit]

FIGS. 5 and 6 show connection between the developing unit 9 and the drum unit 8. At one longitudinal end portion side of the cartridge P, an outside circumference 32*a* of a cylindrical portion 32*b* of the developing device covering member 32 is fitted in the supporting portion 24*a* of the driving side cartridge cover member 24. In addition, at the other longitudinal end portion side of the cartridge P, a projected portion 29*b* projected from the developing device frame 29 is fitted in a supporting hole portion 25*a* of the non-driving side cartridge cover member 25. By this, the developing unit 9 is supported rotatably relative to the drum unit 8. Here, a rotational center (rotation axis) of the developing unit 9 relative to the drum unit is called rotational center (rotation axis) X. The rotational center X is an axis resulting the center of the supporting hole portion 24*a* and the center of the supporting hole portion 25*a*.

[Contact Between the Developing Roller and the Drum]

As shown in FIGS. 4, 5 and 6, developing unit 9 is urged by an urging spring 95 which is an elastic member as an urging member so that the developing roller 6 is contacted to the drum 4 about the rotational center X. That is, the developing unit 9 is pressed in the direction indicated by an arrow G in FIG. 4 by an urging force of the urging spring 95 which produces a moment in the direction indicated by an arrow H about the rotational center X.

By this, the developing roller 6 is contacted to the drum 4 at a predetermined pressure. The position of the developing unit 9 relative to the drum unit 8 at this time is a contacting position. When the developing unit 9 is moved in the direction opposite the direction of the arrow G against the urging force of the urging spring 95, the developing roller 6 is spaced from the drum 4. In this manner, the developing roller 6 is movable toward and away from the drum 4.

[Spacing Between the Developing Roller and the Drum]

Figure 7:
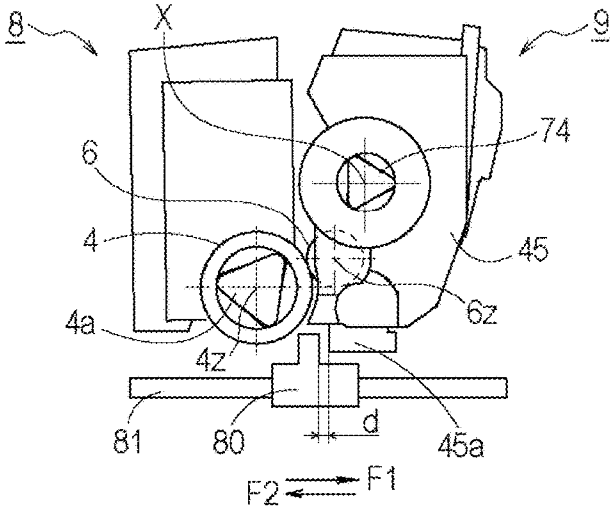
FIG. 7 is a side view of the process cartridge according to the first embodiment, in which (a) illustrates a contact state between a drum and a developing roller, (b) illustrates a state in which the urging force receiving portion has moved by a distance 61, and (c) illustrates a state in which the urging force receiving portion has moved by a distance 62.
Figure 7:
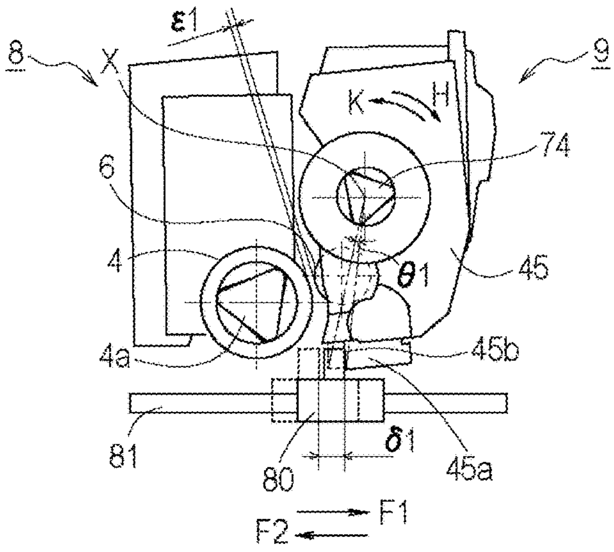
Figure 7:
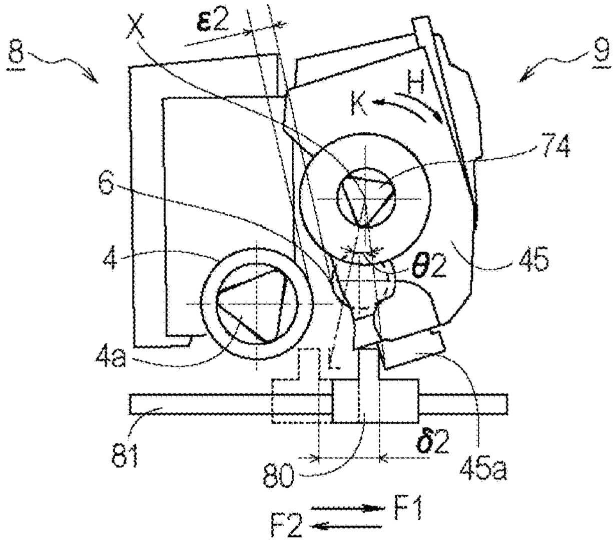

FIG. 7 is a side view of the cartridge P as seen from the driving side along the rotational axis of the developing roller. In this Figure, some parts are omitted for better illustration. When the cartridge P is mounted in the main assembly 2 of the apparatus, the drum unit 8 is positioned in place in the main assembly 2 of the apparatus.

In this embodiment, an urging force receiving portion (spacing force receiving portion) 45*a* is provided on the bearing member 45. Here, the urging force receiving portion (spacing force receiving portion) 45*a* may be provided on another portion (developing device frame or the like, for example) other than the bearing member 45. The force receiving portion 45*a* as an urging force receiving portion is engageable with a main assembly spacing member 80 as a main assembly side urging member (spacing force urging member) provided in the main assembly 2 of the apparatus.

The main assembly spacing member 80 as the main assembly side urging member (spacing force urging member) receives the driving force from the motor (unshown) and is movable along a rail 81 to the direction of arrows F1 and F2.

The description will be made as to the spacing operations between the developing roller and the photosensitive member (drum). Part (a) of FIG. 7 shows a state in which the drum 4 and the developing roller 6 are contacted with each other. At this time, the urging force receiving portion (spacing force receiving portion) 45*a* and the main assembly spacing member (main assembly side urging member) 80 are spaced by a gap d.

Part (b) of FIG. 7 shows a state in which the main assembly spacing member (main assembly side urging member) 80 is away from the position in the state of the part (a) of FIG. 7 in the direction of an arrow F1 by a distance 61. At this time, the urging force receiving portion (spacing force receiving portion) 45*a* is engaged with the main assembly spacing member (main assembly side urging member) 80. As described in the foregoing, the developing unit 9 is rotatable relative to the drum unit 8, and therefore, in the state of part (b) of FIG. 7, the developing unit 9 has rotated by an angle θ1 in the direction of the arrow K about the rotational axis X. At this time, the drum 4 and the developing roller 6 are spaced from each other by distance 1.

Part (c) of FIG. 7 shows the state in which the spacing force urging member (main assembly side urging member) 80 has moved in the direction of the arrow F1 by a distance 62 (>δ1) from the state shown in part (a) of FIG. 7. The developing unit 9 has been rotated in the direction of the arrow K about the rotation axis X by an angle θ2. At this time, the developing roller 6 is spaced from the drum 4 by a gap F2.

[Positional Relations Between Developing Roller, Cartridge Side Drive Transmission Member and Urging Force Receiving Portion]

As shown in parts (a)-(c) of FIG. 7, as the cartridge P is seen along the rotational axis of the developing roller from the driving side, the developing roller 6 is between the cartridge side drive transmission member 74 and the urging force receiving portion 45*a*. More particularly, as the cartridge P is seen along the rotational axis of the developing roller, the urging force receiving portion (spacing force receiving portion) 45*a* is disposed in the substantially opposite side from a drive input member 74 across the developing roller 6. More particularly, a line connecting a contact portion 45*b* of the urging force receiving portion 45*a* for receiving the force from the main assembly side urging member 80 and a rotational axis 6*z* of the developing roller 6, and a line connecting a rotational axis 6*z* of the developing roller 6 and the rotational axis of the cartridge side drive transmission member 74 (coaxial with the rotation axis X in this embodiment) are crossed at an angle. In addition, as the cartridge P is seen along the rotational axis of the developing roller, a line connecting the contact portion 45*b* and the rotational axis of the cartridge side drive transmission member 74 passes through the developing roller 6. Such an arrangement is also expressed as the developing roller 6 being disposed between the cartridge side drive transmission member 74 and the urging force receiving portion 45*a*. In this embodiment, the rotation axis X about which the developing unit 9 is rotatable relative to the drum unit is coaxial with the rotational axis of the cartridge side drive transmission member 74.

Furthermore, the rotational axis 6*z* of the developing roller 6 is disposed between the rotational axis 4*z* of the photosensitive member 4, the rotational axis of the cartridge side drive transmission member 74 and the contact portion 45*b* of the urging force receiving portion 45*a*. In other words, as the cartridge P is seen along the rotational axis of the developing roller from the driving side, the rotational axis 6*z* of the developing roller 6 is disposed within a triangular shape provided by the lines connecting the rotational axis 4*z* of the photosensitive member 4, the rotational axis X of the cartridge side drive transmission member 74 and the contact portion 45*b*.

Here, the developing unit 9 is rotatable relative to the drum unit 8, and therefore, the positional relation of the cartridge side drive transmission member 74 and the urging force receiving portion 45*a* relative to the photosensitive member 4 is changeable. However, in any positional relation, the rotational axis 6*z* of the developing roller 6 is disposed between the rotational axis 4*z*, the rotational axis (X) of the cartridge side drive transmission member 74 and the contact portion 45*b*.

By arranging the developing roller between the contact portion 45*b* and the rotation axis X, the spacing and contacting of the developing roller can be accomplished with precision as compared with the structure in which the developing roller remote from between the contact portion 45*b* and the rotation axis X. Furthermore, as the cartridge P is seen along the rotational axis of the developing roller from the driving side, the distance between the distance between the rotation axis X and the contact portion 45*b* is preferably longer than the distance between the rotation axis X and the rotational axis 6*z* of the developing roller 6, since then the spacing and contacting timings can be controlled with the precision.

In this embodiment (also in the substrate second embodiments), the distance between the rotational axis of the drum 4 and the contact portion between the urging force receiving portion (spacing force receiving portion) 45*a* and the main assembly side urging member 80 is within arrange of 13 mm-33 mm. In addition, in this embodiment (also in the subsequent embodiments), the distance between the rotation axis X and the contact portion between the force receiving portion 45*a* and the main assembly side urging member 80 is within a range of 27 mm-32 mm.

[Drive Transmission to Photosensitive Drum]

The drive transmission to the photosensitive drum 4 will be described.

As described hereinbefore, the drive inputting portion for the photosensitive member (drive transmitting portion for the photosensitive member) 4*a* which is the coupling member provided at the end portion of the drum 4 as the photosensitive member is engaged with the drum-driving-force-outputting member 61 (61C, 61K) of the main assembly 2 shown in part (b) of FIG. 3 to receive the driving force from the driving motor (unshown) of the main assembly A. By this, the drive is transmitted from the main assembly to the drum 4.

As shown in FIG. 1, a drive inputting portion for the photosensitive member (drive transmitting portion for the photosensitive member) 4*a* which is the coupling member provided at the end portion of the photosensitive drum 4 is exposed through an opening 24*d* of the driving side cartridge cover member 24 which is the frame provided at a longitudinal end portion of the cartridge P. More particularly, the drive inputting portion 4*a* for the photosensitive member is projected outwardly of the cartridge beyond the opening plane of the opening 24*d* of the cartridge cover member 24. The drive inputting portion 4*a* for the photosensitive member is fixed in the direction toward the inside of the cartridge P (along the rotational axis of the photosensitive member), as contrasted to the drive inputting portion 74*b* which is capable of advancing and retracting as described in the foregoing. That is, the drive inputting portion 4*a* for the photosensitive member is fixed relative to the drum 4.

[Drive Transmission to Developing Roller]

(Operations of Drive Connecting Portion and Releasing Mechanism)

Referring to FIGS. 1 and 8, the structure of the drive connecting portion will be described. Here, the drive connecting portion is a mechanism for receiving a driving force from the developing device-drive output member 62 as the main assembly side drive transmission member of the main assembly 2 and for selectively transmitting and disconnecting the drive force to the developing roller 6. In this embodiment, the drive connecting portion comprises a spring 70, the drive input member 74, a release cam 72, the developing device covering member 32 and the driving side cartridge cover member 24.

As shown in FIGS. 1 and 8, the cartridge side drive transmission member 74 and the developing device-drive output member 62 are engaged with each other through the, an opening 32*d* and an opening 72*f* of the release cam 72. More particularly, as shown in FIG. 1, the driving side cartridge cover member 24 which is the frame provided at the longitudinal end portion of the cartridge is provided with openings 24*e* (through-openings). The developing device covering member 32 which is coupled with the driving side cartridge cover member 24 is provided with a cylindrical portion 32*b* which is provided with an opening 32*d* (through-opening).

The cartridge side drive transmission member 74 is provided with a shaft portion 74*x* and has an end portion provided with the drive inputting portion 74*b* as a rotational force receiving portion. The shaft portion 74*x* penetrates the opening 72*f* of the release cam, the opening 32*d* of the developing device covering member 32 and the opening 24*e* of the driving side cartridge cover member 24, and the drive inputting portion 74*b* at the free end is exposed toward the outside of the cartridge. More particularly, the drive inputting portion 74*b* is projected to the outside of the cartridge beyond an opening plane of the driving side cartridge cover member 24 provided with the opening 24*e*. A projection of the drive inputting portion 74*b* is coupled with a recess 62*b* provided on the main assembly side drive transmission member 62, so that the driving is transmitted to the drive inputting portion 74*b* from the main assembly side. The drive inputting portion 74*b* has a configuration provided by slightly twisting a substantially triangular prism (FIG. 1).

Furthermore, a gear portion 74 *g* is provided on an outer peripheral surface of the cartridge side drive transmission member 74 and is engaged with the developing roller gear 69. By this, the drive transmitted to the drive inputting portion 74*b* of the cartridge side drive transmission member 74 is transmitted to the developing roller 6 through the gear portion 74 *g* and the developing roller gear 69 of the cartridge side drive transmission member 74.

The drive inputting portion 74*b* of this embodiment is movable toward the inside of the cartridge. More particularly, a portion-to-be-urged 74*c* provided at the base portion of the shaft portion 74*x* of the cartridge side drive transmission member 74 is pressed by the release cam 72, so that the drive input member 74 is retracted toward the inside of the cartridge. By doing so, the transmission and disconnection of the driving force supplied from the main assembly side drive transmission member 62.

In this embodiment and also in the subsequent embodiments, the direction toward the inside of the cartridge is along the rotation axis X and is indicated by N in FIG. 1. However, even if it is slightly oblique relative to the rotation axis X, such a direction is also a direction toward the inside of the cartridge is the direction is effective to be engaged the drive inputting portion 74*b* and the main assembly side drive transmission member 62 from each other.

(Structure of Drive Connecting Portion)

Figure 9:
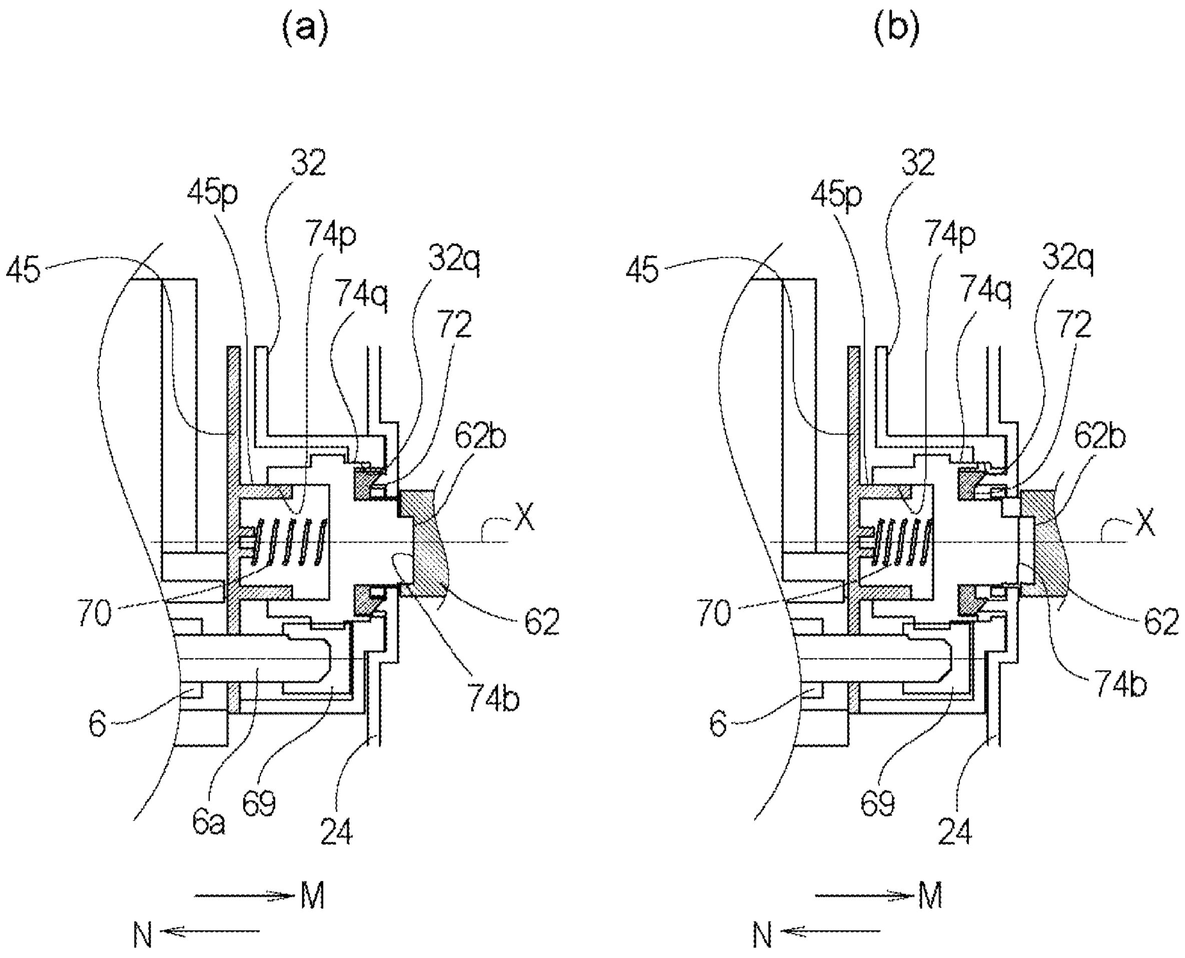
FIG. 9 is a schematic sectional view of elements in the neighborhood of a cartridge side drive transmission member according to the first embodiment, in which (a) illustrates a drive transmission state, and (b) illustrates a drive disconnection state.

Referring to FIGS. 1, 8 and 9, the structure will be described in detail. Provided between the driving side cartridge cover member 24 as a part of the frame provided at the longitudinal end portion of the cartridge P and the bearing member 45 supporting the shaft of the developing roller, are the spring 70 which is an elastic portion as an urging member for urging in the direction from the bearing member 45 toward the driving side cartridge cover member 24, the drive input member 74 as the cartridge side drive transmission member urged by the spring 70, the release cam 72 as a coupling releasing member which is a part of the releasing mechanism, and the developing device covering member 32. The rotational axes of these members are coaxially with the rotational axis of the drive input member 74. Here, they are coaxial with each other within the range of the dimensional tolerances of the respect that parts, which applies to the subsequent embodiments which will be described hereinafter.

FIG. 9 is a schematic sectional view of the drive connecting portion.

As described hereinbefore, the supported portion 74*p* (inner surface of the cylindrical portion) of the drive input member 74 and the first shaft receiving portion 45*p* (outer surface of the cylindrical portion) of the bearing member 45 are engaged with each other. In addition, the cylindrical portion 74*q* of the drive input member 74 and the inside circumference 32*q* of the developing device covering member 32 are engaged with each other. Thus, the drive input member 74 is rotatably supported at the opposite ends thereof by the bearing member 45 and in the developing device covering member 32.

In addition, the bearing member 45 rotatably supports the developing roller 6. More particularly, a second shaft receiving portion 45*q* (inner surface of the cylindrical portion) of the bearing member 45 rotatably supports the shaft portion 6*a* of the developing roller 6. And, the developing roller gear 69 is engaged with the shaft portion 6*a* of the developing roller 6. As described hereinbefore, the outer peripheral surface of the drive input member 74 is formed into a gear portion 74 *g* for meshing engagement with the developing roller gear 69. By this, the rotational force is transmitted from the drive input member 74 to the developing roller 6 through the developing roller gear 69.

The centers of the first shaft receiving portion 45*p* (outer surface of the cylindrical portion) of the bearing member 45 and the inside circumference 32*q* of the developing device covering member 32 are on the rotation axis X of the developing unit 9. That is, the drive input member 74 is supported rotatably about the rotation axis X of the developing unit 9.

Outside of the developing device covering member 32 with respect to the longitudinal direction of the cartridge P, the driving side cartridge cover member 24 is provided. Part (a) of FIG. 9 is a schematic sectional view illustrating a connection state (coupling state) between the drive inputting portion 74*b* of the drive input member 74 and the developing device-drive output member 62 of the main assembly. Such a state in which the drive inputting portion 74*b* is projected to the outside of the cartridge beyond the opening plane of the opening 24*e* of the driving side cartridge cover member 24, and the rotational force can be transmitted from the developing device-drive output member 62 to the drive inputting portion 74*b* is called "first position" of the drive input member 74. Provided between the bearing member 45 and the drive inputting portion 74*b* is the spring 70 (elastic member) as the urging member to urge the drive inputting portion 74*b* in the direction indicated by an arrow M.

In the state of part (a) of FIG. 9, when the release cam 72 and the drive input member 74 are projected on a phantom line parallel with the rotational axis of the developing roller 6, the range of the release cam 72 within the range of the cartridge side drive transmission member 74. Thus, at least a part of the range of the release cam 72 is overlapped with the range of a part of the drive input member 74, by which the drive disconnecting mechanism can be downsized.

Part (b) of FIG. 9 is a schematic sectional view in which the connection between the drive inputting portion 74*b* and the developing device-drive output member 62 has been broken, and they are spaced from each other. The drive inputting portion 74*b* is movable in the direction of an arrow N against an urging force of a spring 39, by being pressed by the release cam 72 which is an urging mechanism.

A state in which the rotational force from the developing device-drive output member 62 is not transmitted to the drive inputting portion 74*b* as shown in part (b) of FIG. 9 is called "second position" of the drive input member 74. In the second position, the drive inputting portion 74*b* is closer to the side of the cartridge than in the first position. The second position is preferably such that the drive inputting portion 74*b* provided at the end portion of the cartridge drive input member is retracted from the outer surface of the cartridge in which the opening plane of the frame exists. However, as shown in part (b) of FIG. 9, the outer surface and the end surface of the drive inputting portion 74*b* may be flush with each other, or the end surface of the drive inputting portion 74*b* may be projected slightly beyond the outer surface. In any case, the second position may correspond to the state in which the drive inputting portion 74 closer to the inside of the cartridge than in the first position, and the developing device-drive output member 62 and the drive input member 74 are out of the driving connection.

Figure 12:
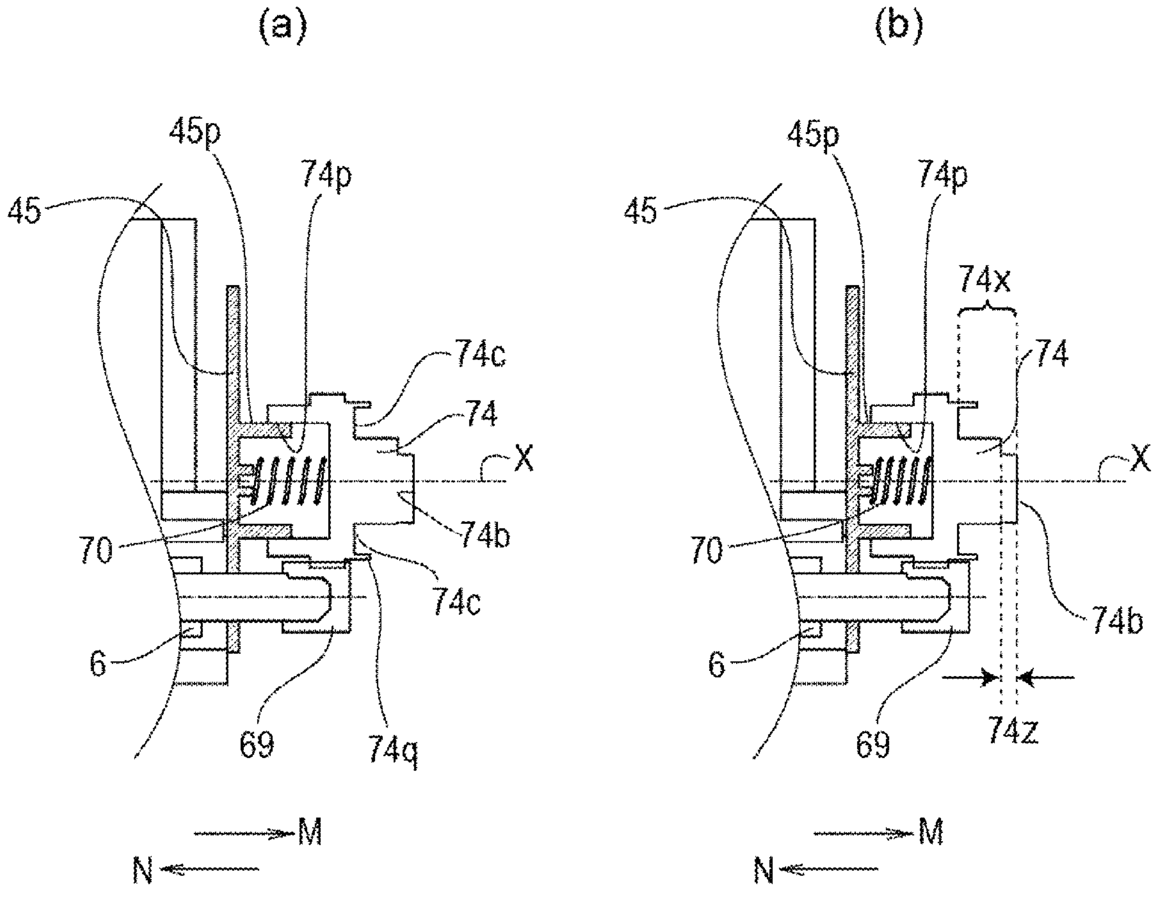
In FIG. 12, (a) is a schematic sectional view of cartridge side drive transmission member according to the first embodiment, and (b) as a sectional view in which the cartridge side drive transmission member has moved in the direction indicated by N.

FIG. 12 is a sectional view of a structure including the bearing member 45, the spring 70, the drive input member 74 and the developing roller gear 69.

The first shaft receiving portion 45*p* (outer surface of cylindrical portion) has a first guide portion for the bearing member 45 rotatably supports a supported portion (portion to be supported) 74*p* (inner surface of the cylindrical portion) as a first portion-to-be-guided of the drive input member 74. In the state that the supported portion 74*p* is engaged with the first shaft receiving portion 45*p*, the drive input member 74 is movable along the rotation axis (rotational center) X. In other words, the bearing member 45 supports the drive input member 74 slidably (reciprocally) along the rotation axis X. Further in other words, the drive input member 74 is slidable relative to the bearing member 45 in the directions of arrows M and N.

Part (b) of FIG. 12 shows a state in which the drive input member 74 has moved in the direction of the arrow N relative to the bearing member 45 from the state shown in part (a) of FIG. 12. The drive input member 74 is movable in the directions of arrow M and arrow N while engaging with the developing roller gear 69. In order to make it easier the movement of the drive input member 74 along the rotation axis X in the directions of the arrow M (outwardly of the cartridge) and arrow N (inwardly of the cartridge), the gear portion 74*g* of the drive input member 74 is preferably a spur gear rather than a helical gear. The position of the drive input member 74 of part (a) of FIG. 12 response to the above-described first position, and the position of the drive input member 74 of part (b) of FIG. 12 corresponds to the above-described second position.

(Releasing Mechanism)

A drive disconnecting mechanism we've be described.

As shown in FIGS. 1 and 8, between the gear portion 74 *g* of the drive input member 74 and the developing device covering member 32, the release cam 72 Is provided as the coupling releasing member which is a part of the releasing mechanism. In other words, the release cam 72 is provided in the range of the drive input member 74 with respect to a direction parallel with the rotational axis of the developing roller 6.

Figure 10:
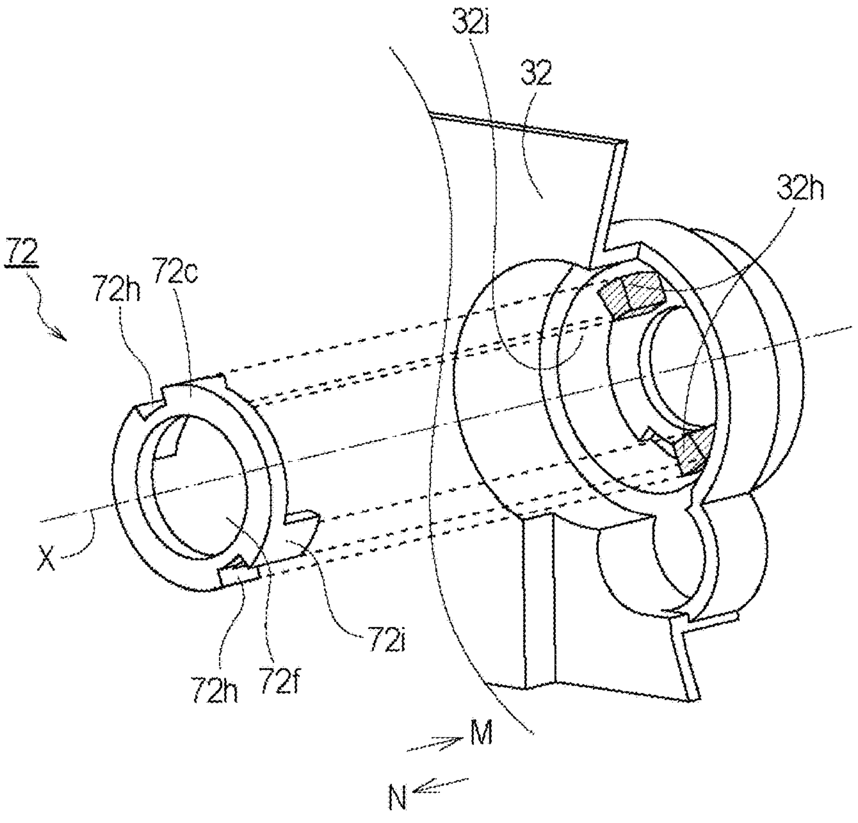
FIG. 10 is a schematic exploded view of a release cam and a developing device covering member according to the first embodiment.

FIG. 10 shows a relationship between the release cam 72 and the developing device covering member 32. The release cam 72 is provided with a ring portion having a substantially ring configuration, and the release cam 72 as an outer periphery portion which is an outer peripheral surface. The outer periphery portion is provided with a projected portion 72*i* projecting from the ring portion. In this embodiment, the projected portion 72*i* projects in the direction along the rotational axis of the developing roller. In addition, the developing device covering member 32 has an inner surface 32*i*. The inner surface 32*i* is engaged with the outer peripheral surface. By doing so, the release cam 72 is slidable in the direction of the axis of the developing roller 6 relative to the developing device covering member 32. In other words, the release cam 72 is movable relative to the developing device covering member 32 in the direction substantially parallel with the rotational axis of the developing roller 6. The centers of the outer peripheral surface of the release cam 72, the inner surface 32*i* of the developing device covering member 32 and the outside circumference 32*a* of the developing device covering member 32 are coaxial with each other In addition, an urging surface 72*c* as an urging portion is provided on the surface opposite from the surface from which the projected portion 72*i* of the release cam 72 projects. As will be described hereinafter, the urging surface 72*c* urges an urged surface (surface to be urged) 74*c* of the drive input member 74.

In addition, the developing device covering member 32 is provided with a guide 32*h* as a second guide portion, and the release cam 72 is provided with a guide groove 72*h* as a second portion-to-be-guided. The guide 32*h* and the guide groove 72*h* extend in the direction parallel with the axial direction. The guide 32*h* of the developing device covering member 32 is engaged with the guide groove 72*h* of the release cam 72 as the coupling releasing member. Because of disengagement between the guide 32*h* and the guide groove 72*h*, the release cam 72 is slidable only in the axial directions (arrows M and N) relative to the developing device covering member 32.

It is not inevitable the both of the guide 32*h* and the guide groove 72 are parallel with the rotational axis X of the opposite sides, but it will suffice if only one side contacting to each other is parallel with the rotational axis X.

Figure 11:
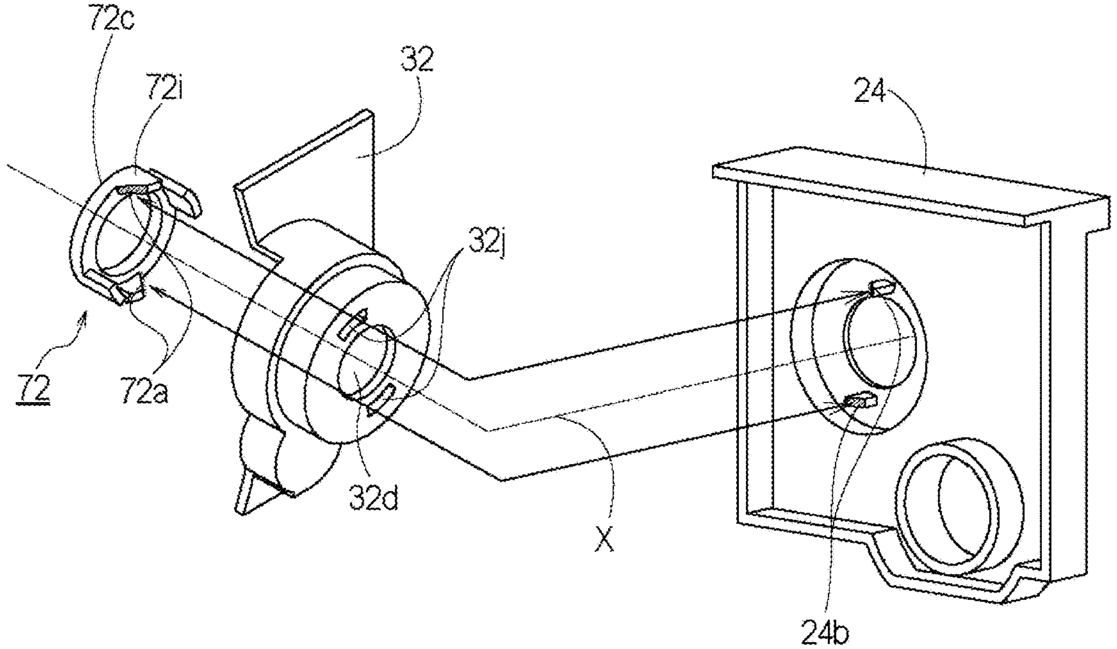
FIG. 11 is a schematic exploded view of the release cam, the developing device covering member and a driving side cartridge cover member according to the first embodiment.

FIG. 11 illustrates structures of the release cam 72, the developing device covering member 32 and the driving side cartridge cover member 24.

Outside of the developing device covering member 32 with respect to the longitudinal direction of the cartridge P, the driving side cartridge cover member 24 is provided.

The release cam 72 as the coupling releasing member includes a contact portion (inclined surface) 72*a* as a force receiving portion for receiving the force produced by (the urging member 80 of) the main assembly 2. The driving side cartridge cover member 24 includes a contact portion (inclined surface 24*b* as an operating member. In addition, the developing device covering member 32 is provided with another opening 32*j* around the opening 32*d*. The contact portion 72*a* of the release cam 72 and the contact portion 24*b* of the driving side cartridge cover member 24 are contactable to each other through the opening 32*j* of the developing device covering member 32.

In this example, the numbers of the contact portion 72*a* of the release cam 72 and the contact portion 24*b* of the driving side cartridge cover member 24 are two, respectively, but these numbers and not restrictive. For example, the numbers may be three, respectively.

The numbers may be one, respectively, but in that case, the release cam 72 is likely to tilt relative to the axis X by the force applied to the contact portion during the drive transmission releasing operation as will be described hereinafter. If the tilting occurs, the drive switching property such as the driving connection and releasing operation timing may be deteriorated. In other to suppress the tilting, it is preferable that the supporting portion (inner surface 32*i* of the developing device covering member 32) slidably supporting the release cam 72 (slidable along the axis of the developing roller 6) is reinforced. In this respect, it is preferable that the members of the respective contact portions are plural and they are all arranged substantially at regular intervals in the circumferential direction about the axis X. In such a case, the resultant force of the force is applied to the contact portion produces moment tending to rotate the release cam 72 about the axis X. Therefore, the tilting of the release cam 72 relative to the axis X can be suppressed. Furthermore, when more than three contact portions are provided, a flat plane in which the release cam 72 it supported can be fixed, and therefore, the tilting of the release cam 72 can be further prevented. Thus, the attitude of the release cam 72 can be stabilized.

[Drive Disconnecting Operation]

Referring to FIG. 7 and FIGS. 13-15, the description will be made as to an operation of the drive connecting portion when the developing roller 6 is separating from the drum 4. For the simplicity of the restoration, a part of the elements are shown, and a part of the structure of the release cam is illustrated schematically. In the Figures, an arrow M is along the rotation axis X and is oriented toward a outside of the cartridge, and an arrow N is along the rotation axis X and is oriented toward an inside of the cartridge.

[State 1]

Figure 13:
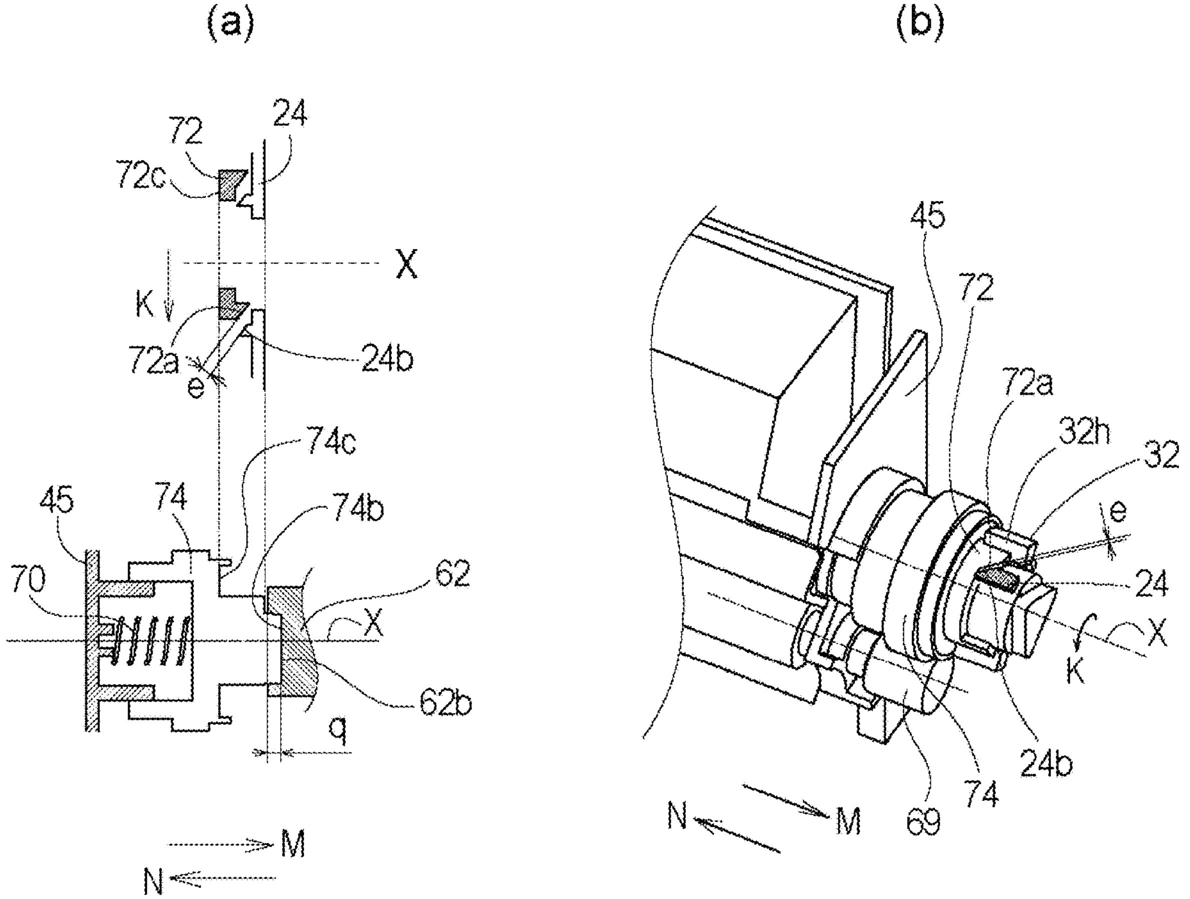
FIG. 13 is a schematic view of a neighborhood of the cartridge side drive transmission member according to the first embodiment in a drum-roller-contact-and-drive-transmission state, in which (a) is a schematic sectional view of the drive connecting portion, and (b) is a perspective view of the drive connecting portion.

As shown in part (a) of FIG. 7, between the spacing force urging member 80 and the urging force receiving portion (spacing force receiving portion) 45*a* of the bearing member 45, there is a gap d. Here, the drum 4 and the developing roller 6 are contacted with each other. This state is called "state 1" of the spacing force urging member 80. FIG. 13 shows the structures of the drive connecting portion at this time. In part (a) of FIG. 13, the pair of the drive input member 74 and the developing device-drive output member 62, and the pair of the release cam 72 with driving side cartridge cover member 24 are separately and schematically shown. Part (b) of FIG. 13 is the perspective view of the drive connecting portion. In part (b) of FIG. 13, as to the driving side cartridge cover member 24, only a part including the contact portion 24*b* is shown, and as to the developing device covering member 32, only a part including the guide 32*h* is shown. A gap e is provided between the contact portion 72*a* of the release cam 72 and the contact portion 24*b* of the driving side cartridge cover member 24. At this time, the drive input member 74 and the developing device-drive output member 62 are engaged with each other by an engaging amount (depth) q, and in this state, the drive transmission is possible. As described hereinbefore, the drive input member 74 is engaged with the developing roller gear 69 (FIG. 12). Therefore, the driving force supplied from the main assembly 2 to the drive input member 74 is transmitted to the developing roller gear 69 to drive the developing roller 6. The position of various parts in the state is called a contacting position, and is also called a development contact drive transmission state. The position of the drive input member 74 at this time is called a first position.

[State 2]

When the spacing force urging member (main assembly side urging member) 80 move in the direction of the arrow F1 in the Figure by 61 from the drum-roller-contact-and-drive-transmission state, as shown in part (b) of FIG. 7, the developing unit 9 rotates in the direction indicated by the arrow K about the rotation axis X by the angle θ1. As a result, the developing roller 6 space is from the drum 4 by a distance F1. The release cam 72 and the developing device covering member 32 in the developing unit 9 rotates in the direction indicated by the arrow K by the angle θ1 in interrelation with the rotation of the developing unit 9. On the other hand, when the cartridge P is mounted on the main assembly 2, the drum unit 8, the driving side cartridge cover member 24 and the non-driving side cartridge cover member 25 are position and fixed to the main assembly 2. In other words, as shown in part (a) and part (b) of FIG. 14, the contact portion 24*b* of the driving side cartridge cover member 24 does not move. In the Figure, the release cam 72 has rotated in the direction of the arrow K in the Figure in interrelation with the rotation of the developing unit 9 to a state in which the contact portion 72*a* of the release cam 72 and the contact portion 24*b* of the driving side cartridge cover member 24 start contacting to each other. At this time, the drive input member 74 and the developing device-drive output member 62 *e* kept in engagement with each other (part (a) of FIG. 14). Therefore, the driving force supplied from the main assembly 2 to the drive input member 74 is transmitted to the developing roller 6 through the developing roller gear 69. This state of various parts is called a drum-roller-spaced-and-drive-transmission state. The position of the drive input member 74 is in the first position.

[State 3]

Figure 15:
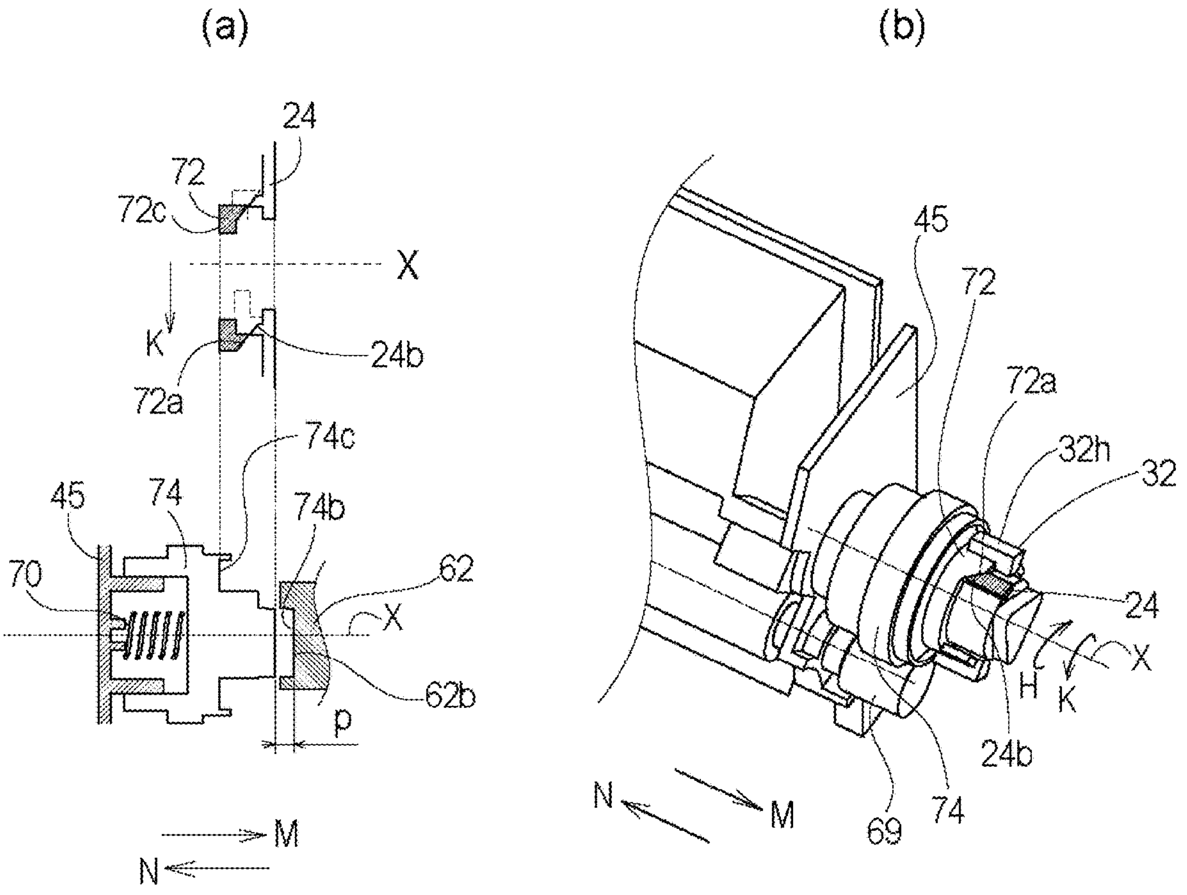
FIG. 15 is a schematic view of the neighborhood of the cartridge side drive transmission member according to the first embodiment in a drum-roller-spaced-and-drive-disconnection state, in which (a) is a schematic sectional view of the drive connecting portion, and (b) is a perspective view of the drive connecting portion.

Part (a) and part (b) of FIG. 15 show the structures of the drive connecting portion when the spacing force urging member (main assembly side urging member) 80 moves in the direction indicated by the arrow F1 in the Figure by the distance 62 from the drum-roller-spaced-and-drive-transmission state, as shown in part (c) of FIG. 7. In interrelation with the rotation of the developing unit 9 by the angle θ2 (>θ1), the release cam 72 and the developing device covering member 32 rotate. On the other hand, the driving side cartridge cover member 24 does not move similarly to the above-described case, and the release cam 72 rotates in the direction indicated by the arrow K in the Figure. At this time, the contact portion 72*a* of the release cam 72 receives a reaction force from the contact portion 24*b* of the driving side cartridge cover member 24. In addition, as described hereinbefore, the guide groove 72*h* of the release cam 72 is engaged with the guide 32*h* of the developing device covering member 32, and therefore, is movable only in the axial direction (arrow M and N directions) (FIG. 10). As a result, the release cam 72 makes sliding movement in the direction of the arrow N relative to the developing device covering member by movement distance p. In addition, in interrelation with the movement of the release cam 72 in the direction of the arrow N, the urging surface 72*c* which is an urging portion of the release cam 72 as the urging member urges the urged surface 74*c* of the drive input member 74. By this, the drive input member 74 slides by the movement distance p in the direction of the arrow N against the urging force of the spring 70 (parts (b) of FIG. 15 and FIG. 12).

Because the movement distance p is larger than the engagement amount q between the drive input member 74 and the developing device-drive output member 62, the engagement between the drive input member 74 and the developing device-drive output member 62 is released. As a result, the developing device-drive output member 62 of the main assembly 2 continues rotating, and on the other hand, the drive input member 74 stops. Therefore, the rotations of the developing roller gear 69 and the developing roller 6 stop. This state of various parts is called a spacing position and is also called a drum-roller-spaced-and-drive-disconnection state. The position of the drive input member 74 at this time is called a second position.

By the drive input member 74 being urged by the urging portion 72*c* of the release cam 72 in this manner, the drive input member 74 is moved from the first position to the second position toward the inside of the cartridge. By doing so, the engagement between the drive input member 74 and the developing device-drive output member 62 are released, so that the rotational force from the developing device-drive output member 62 is no longer transmitted to the drive input member 74.

In the movement distance p through which the drive input member 74 moves from the first position to the second position is not less than the engagement amount q between the drive input member 74 and the developing device-drive output member 62 (FIG. 34), and is more preferably not less than a height 74*z* of the drive inputting portion 74*b* (measured in the direction of the axis X) (FIG. 12). What specific early, the movement distance p of this embodiment is 2.2 mm. In order to assure that transmission and release of the driving force from the main assembly side, the movement distance p is preferably not less than 2 mm and not more than 3 mm.

In the foregoing, the description has been made as to the drive disconnecting operation relative to the developing roller 6 in interrelation with the rotation of the developing unit 9 in the direction of the arrow K. By employing the above-described structure, the developing roller 6 is capable of spacing from the drum 4 while rotating. As a result, the drive to the developing roller 6 can be stopped depending on the space distance between the developing roller 6 and the drum 4.

[Drive Connecting Operation]

The description will be made as to the operation of the drive connecting portion at the time when the developing roller 6 and the drum 4 change from the spaced state to the contacted state, The operation is reciprocal of the above-described operation from the contact state (drum-roller) to the spaced state.

In the spaced-developing-device state (the developing unit 9 is rotated by the angle θ2 as shown in part (c) of FIG. 7), the engagement between the drive input member 74 and the developing device-drive output member 62 is released in the drive connecting portion, as shown in FIG. 15. That is, the drive input member 74 is in the second position.

Figure 14:
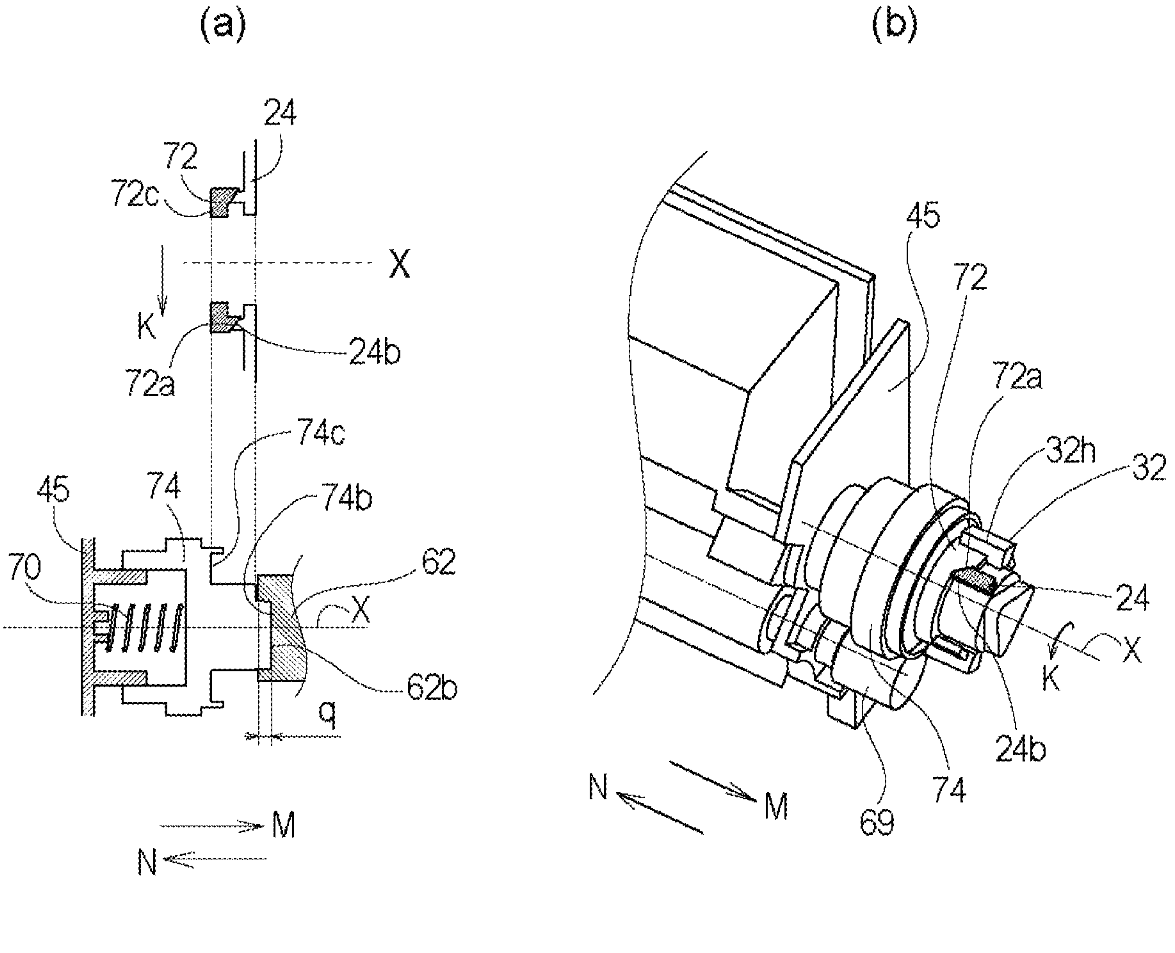
FIG. 14 is a schematic view of the neighborhood of the cartridge side drive transmission member according to the first embodiment in a drum-roller-spaced-and-drive-transmission state, image (a) is a schematic sectional view of the drive connecting portion, and (b) is a perspective view of the drive connecting portion.

In the state that the developing unit 9 has been gradually rotated ion the direction of the arrow H in FIG. 7 (in the direction opposite from the above-described arrow K direction) so that the developing unit 9 is rotated by the angle θ1 (part (b) of FIG. 7 and FIG. 14), the drive input member 74 and the developing device-drive output member 62 are engaged with each other by the drive input member 74 moving in the direction of the arrow M by the urging force of the spring 70.

By this, the driving force is transmitted from the main assembly 2 to the developing roller 6 so that the developing roller 6 is rotated. That is, the drive input member 74 is in the first position. At this time, the developing roller 6 and the drum 4 are kept separated from each other.

By further rotating the developing unit 9 gradually from this state in the direction of the arrow H (FIG. 7), the developing roller 6 and the drum 4 can be contacted to each other. Also in this state, the drive input member 74 is in the first position.

In the foregoing, the drive transmission operation to the developing roller 6 in interrelation with the rotation of the developing unit 9 in the direction of the arrow H has been described. With the foregoing structures, the developing roller 6 is brought into contact to the drum 4 while rotating, and the drive can be transmitted to the developing roller 6 depending on the spacing distance between the developing roller 6 and the drum 4.

As described in the foregoing, wherein such structures, the switching between the connection and disconnection relative to the developing roller 6 can be effected unique depending on the angle of rotation of the developing unit 9.

In the foregoing description, the contact between the contact portion 72*a* of the release cam 72 and the contact portion 24*b* of the driving side cartridge cover member 24 is surface-to-surface contact, but this is not restrictive on the present invention. For example, the contact may be between a surface and a ridge, between a surface and a point, between a ridge and a ridge, or between a ridge and a point.

[Releasing Mechanism]

Figure 16:
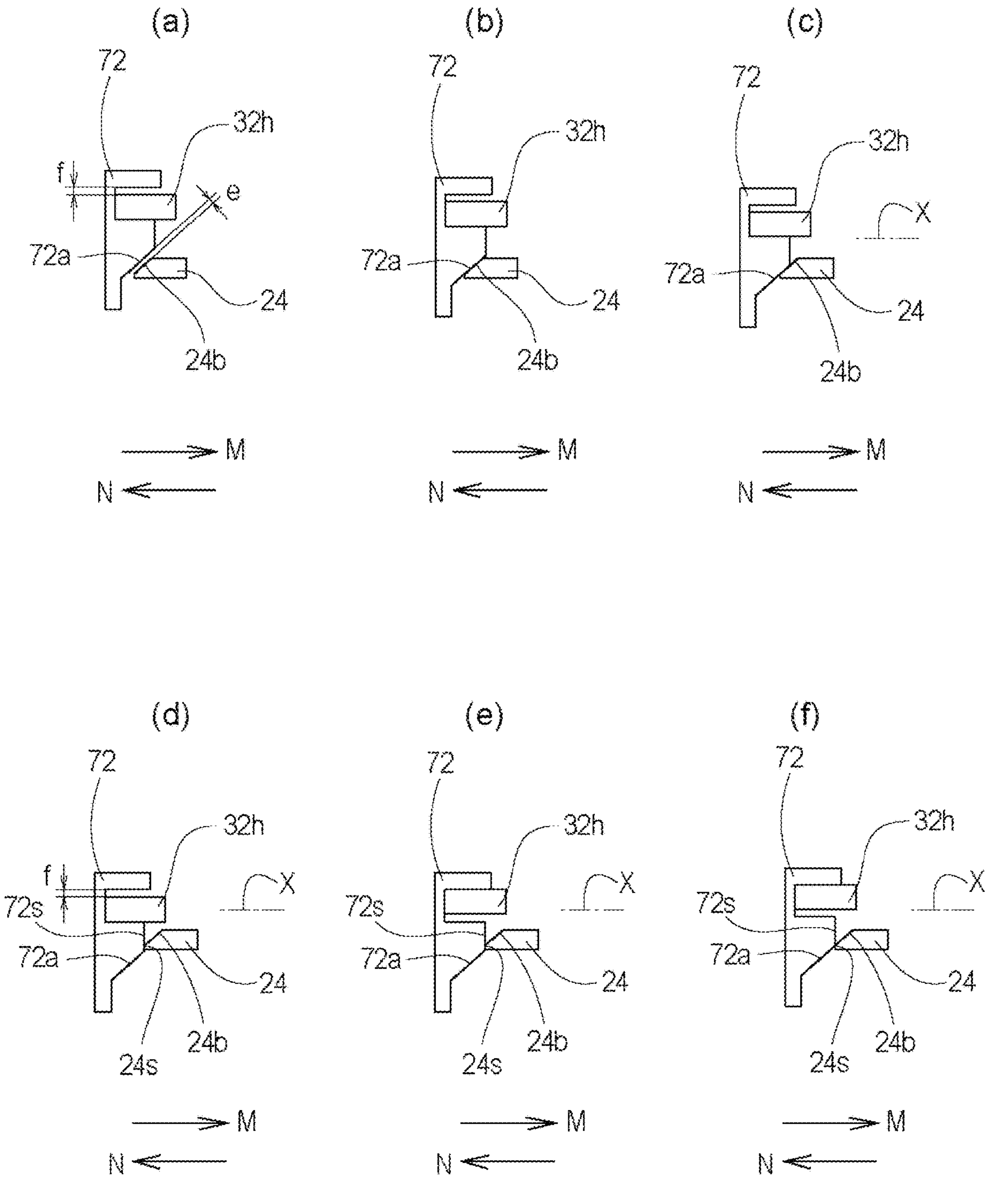
FIG. 16 is a schematic view illustrating a positional relation between the release cam, the driving side cartridge cover member and a guide of the developing device covering member according to the first embodiment.

Referring to FIG. 16 schematically illustrating a projection a relationship between the release cam 72, the driving side cartridge cover member 24 and the guide 32*h* of the developing device covering member 32, the releasing mechanism will be described.

Part (a) of FIG. 16 illustrates the drum-roller-contact-and-drive-transmission state, part (b) of FIG. 16 illustrates the drum-roller-spaced-and-drive-transmission state, and part (c) of FIG. 16 illustrates the drum-roller-spaced-and-drive-disconnection state. These states are the same as those shown in FIGS. 13, 14 and 15, respectively. In part (c) of FIG. 16, the release cam 72 and the driving side cartridge cover member 24 are contacted with each other at the contact portion 72*a* and the, which are inclined relative to the rotation axis X. Here, in the drum-roller-spaced-and-drive-disconnection state, the positional relationship between the release cam 72 and the driving side cartridge cover member 24 may be as shown in part (d) of FIG. 16. More particularly, as shown in part (c) of FIG. 16, the contact portion 72*a* and the contact portion 24*b* which are inclined relative to the rotation axis X are contacted to each other, and then the developing unit 9 is rotated. By this, the release cam 72 and the driving side cartridge cover member 24 are contacted with each other at a flat surface portion 72*s* and a flat surface portion 24*s* which are perpendicular to the rotation axis X.

When there is a gap f between the guide groove 72*h* of the release cam 72 and in the guide 32*h* of the developing device covering member 32, as shown in part (a) of FIG. 16, the change from the drum-roller-contact-and-drive-transmission state shown in part (a) of FIG. 16 to the drum-roller-spaced-and-disconnection state as shown in part (d) of FIG. 16 is the same as that described in the foregoing. On the other hand, in the change from the drum-roller-spaced-and-drive-disconnection state shown in part (d) of FIG. 16 to the driving connection state shown in part (a) of FIG. 16, the gap f between the guide groove 72*h* of the release cam 72 and the guide 32*h* of the developing device covering member 32 first disappears (part (e) of FIG. 16). Then, the situation changes to the state immediately before the contact between the contact portion 72*a* and the contact portion 24*b* (part (f) of FIG. 16). Then, the situation changes to the state in which the contact portion 72*a* and the contact portion 24*b* are contacted to each other (part (c) a FIG. 16). The relative to position the relationship between the release cam 72 and in the driving side cartridge cover member 24 in the changed from the spaced-developing-device state to the contacted-developing-device state of the developing unit 9 is the same as that described hereinbefore.

In the case that the gap f exists between the guide groove 72*h* of the release cam 72 and the guide 32*h* of the developing device covering member 32 as shown in FIG. 16, the release cam 72 does not move in the ejection of the arrow M until the gap f disappears in the process of changing from the spaced-developing-device state to the contacted-developing-device state. By the release cam 72 moving in the direction of the arrow M, the driving connection is accomplished between the drive input member 74 and in the developing device-drive output member 62. That is, the timing at which the release cam 72 move in the ejection of the arrow M and the driving connection a synchronized with each other. In other words, the timing of the driving connection can be controlled by the gap f between the guide groove 72*h* of the release cam 72 and in the guide 32*h* of the developing device covering member 32.

The description will be made as to the structure in which the developing device separation and the drive disconnection states of the developing unit 9 are accomplished in the state shown in part (c) of FIG. 16 and FIG. 15. That is, in the drum-roller-spaced-and-drive-disconnection state, the contact portion 72*a* and the contact portion 24*b* which are inclined relative to the rotation axis X are contacted with each other, by which the release cam 72 and the driving side cartridge cover member 24 are contacted with each other. In this case, the timing at which the release cam 72 move in the direction of the arrow M is not dependent on the gap f between the guide groove 72*h* of the release cam 72 and the guide 32*h* of the developing device covering member 32. Therefore, the timing of the driving connection can be controlled more accurately. In addition, the movement distances of the release cam 72 in the directions of arrows M and N can be reduced so that the size of the process cartridge in the axial direction can be reduced.

[Difference from the Conventional Example]

The difference is from the conventional structure will be described.

In the structure of Japanese Laid-open Patent Application 2001-337511, the coupling for receiving the drive from the main assembly of the image forming apparatus and a spring clutch for switching the drive transmission are provided at a developing roller end portion. In addition, the link interrelated with the rotation of the developing unit is provided in the process cartridge. When the developing roller it is spaced from the drum by the rotation of the developing unit, the link acts on the spring clutch provided at the developing roller end portion to disconnect the drive transmission to the developing roller.

The spring clutch per se is not free of variation. With this structure, delay tends to occur from the operation of the spring clutch to the actual drive transmission this connection. Furthermore, because of the dimension variations of the link mechanism and the variations of the rotation angle of the developing unit, the timing at which the link mechanism acts on the spring clutch may not be constant. Moreover, the link mechanism actable on the spring clutch is provided at the position not the rotational center of the developing unit and the drum unit.

In the embodiment of the present invention, a control variation of the rotation time of the developing roller can be reduced by employing the structure four switching the drive transmission to the developing roller (contact portion 72*a* of the release cam 72, the contact portion 24*b* as the operating portion of the driving side cartridge cover member 24 actable on the contact portion 72*a*, the contact portion (inclined surface) 72*a* of the release cam 72, contact portion (inclined surface) 24*b* of the driving side cartridge cover member 24).

Furthermore, the structure of the clutch is coaxial with the rotational center about which the developing unit is rotatable relative to the drum unit. The relative position error between the drum unit and the developing unit is least at the rotational center. Therefore, by disposing the drive transmission switching clutch at the rotational center, the switching timing of the clutch relative to the rotation angle of the developing unit can be controlled most accurately. As a result, the rotation time of the developing roller can be controlled with the precision, so that the deteriorations of the developer and the developing roller can be suppressed.

In addition, in the conventional image forming apparatus and process cartridge, the drive switching clutch for the developing roller is provided in the image forming apparatus in some cases.

For example, when a monochromatic printing is carried out in a full-color image forming apparatus, the drive for the developing device or devices for the non-black color or colors and is collected using clutches. In addition, also in a monochromatic image forming apparatus, it is possible that the drive is transmitted to the developing device when the electrostatic latent image on the drum is developed by the developing device, whereas when the developing operation is not carried out, the driving to the developing device is disconnected, using the clutch. By controlling the rotation time of the developing roller by disconnecting the driving to the developing device during non-image-forming operation, the deterioration of the developer or the developing roller can be suppressed.

Figure 17:
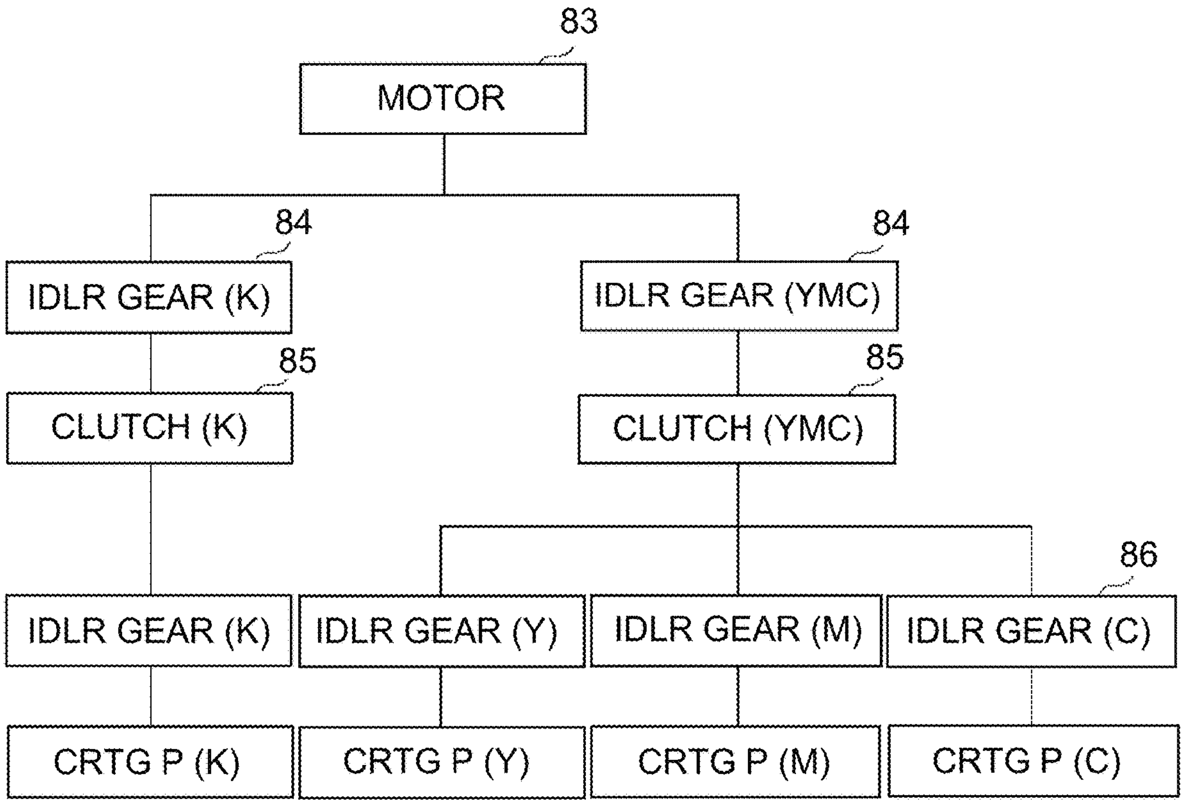
FIG. 17 is a block diagram of an example of a gear arrangement of the image forming apparatus.

As compared with the case in which a clutch for the drive switching to the developing roller in the image forming apparatus, the clutch can be downsized in the case that the these is provided in the process cartridge. FIG. 17 is a block diagram showing an example over a gear arrangement in the image forming apparatus when the drive from the motor (driving source) provided in the image forming apparatus is transmitted to the process cartridge. When the drive is transmitted from a motor 83 to the process cartridge P (PK), the transmission is effected through the idler gear 84 (K), the clutch 85 (K) and the idler gear 86 (K). When the drive is transmitted from a motor 83 to the process cartridge P (PY, PM, PC), the transmission is effected through the idler gear 84 (YMC), the clutch 85 (YMC) and the idler gear 86 (YMC). The drive of the motor 83 is divided into a drive for the idler gear 84 (K) and a drive for the idler gear 84 (YMC), and the drive from the clutch 85 (YMC) is divided into a drive for the idler gear 86 (Y), a drive for the idler gear 86 (M) and a drive for the idler gear 86 (C).

When the monochromatic printing is carried out in the full-color image forming apparatus, for example, the drives for the developing devices containing non-black developers are disconnected using the clutch 85 (YMC). In the case of the full-color printing, the drive of the motor 83 is transmitted to the process cartridges P through the clutch 85 (YMC). At this time, the load concentration occurs at the clutch 85 (YMC) to driving the process cartridges P. More particularly, 3-times the load applied to the clutch 85 (K) is applied to the clutch 85 (YMC). Load variations of the color developing devices are similarly applied to the single clutch 85 (YMC). In order to transmit the drives without deterioration of the rotational accuracy of the developing roller despite the load concentration and the load variations, the rigid of the clutch has to be enhanced. This results in upsizing of the clutch and a necessity for use of a high stiffness material such as a sintered metal. On the other hand, when the clutch is provided in each of the process cartridges, the load and the load variation applied to each clutch is only those of the associated developing device. Therefore, it is unnecessary to enhance the rigid as in the above example, and each clutch can be downsized.

Also in the gear arrangement for transmitting the driving to the black color process cartridge P (PK) shown in FIG. 17, it is desirable to minimize the load applied to the drive switching clutch 85 (K). In the gear arrangement for the drive transmission to the process cartridge P, the load applied to the gear shaft closer to the process cartridge P is smaller in view of the drive transmission efficiency of the gear. Therefore, the clutch can be downsized by providing the clutch between the cartridge and the main assembly, that is, in the cartridge than in the case of providing the drive switching clutch in the main assembly of the image forming apparatus.

Embodiment 2

A cartridge according to a second embodiment of the present invention will be described. In the description of this embodiment, the same reference numerals as in Embodiment 1 are assigned to the elements having the corresponding functions in this embodiment, and the detailed description thereof is omitted for simplicity. In this embodiment, a universal joint (Oldham coupling) is provided inside the cartridge and a rotation axis X of the developing unit 9 relative to the drum unit 8 is different from a rotational axis Z of a drive input member 274. In the example of this embodiment, rotation axis X is offset from but parallel with the rotational axis Z.

In this embodiment, the engaging relation between the drive input member 274 and the developing device-drive output member 62 of the main assembly is equivalent to the engaging relation between the drive inputting portion 74*b* of the drive input member 74 and the developing device-drive output member 62 of the main assembly in Embodiment 1.

More particularly, the cartridge side drive transmission member 274 projects outwardly of the cartridge through an opening 272*f*, an opening 232*d* and an opening 224*e* of the release cam 272. By the engagement between the cartridge side drive transmission member 274 and the developing device-drive output member 62, the driving force (rotational force) for rotating the developing roller is received from the main assembly.

In addition, the engaging relation between the release cam 272 and the developing device covering member 232, and the engaging relation between the release cam 272, the developing device covering member 232 and the driving side cartridge cover member 224 are equivalent to those of Embodiment 1 (FIGS. 10, 11).

In addition, the structures of the drive inputting portion (drive transmitting portion for the photosensitive member) for receiving the driving force for rotating the photosensitive drum 4 is similar to those of Embodiment 1. More particularly, the drive inputting portion 4*a* for the photosensitive member is projected through the opening 224*d*. By the engagement between the drive inputting portion 4*a* for the photosensitive member and the drum-driving-force-outputting member 61 (FIG. 3), the driving force (rotational force) is received from the main assembly.

[Structure of Drive Connecting Portion]

Figure 18:
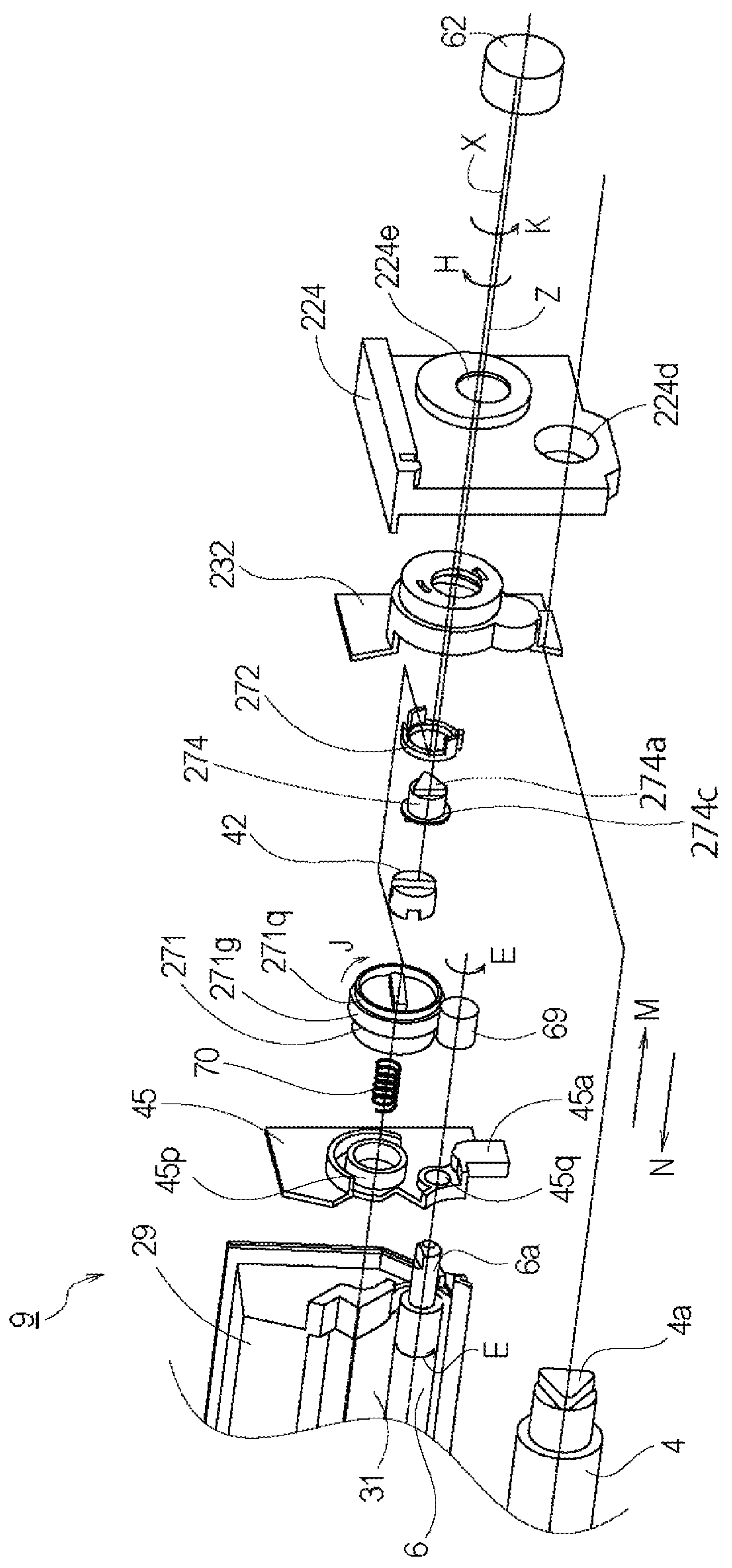
FIG. 18 is an exploded perspective view of a neighborhood of a drive connecting portion of a process cartridge according to a second embodiment of the present invention, as seen from a driving side.
Figure 19:
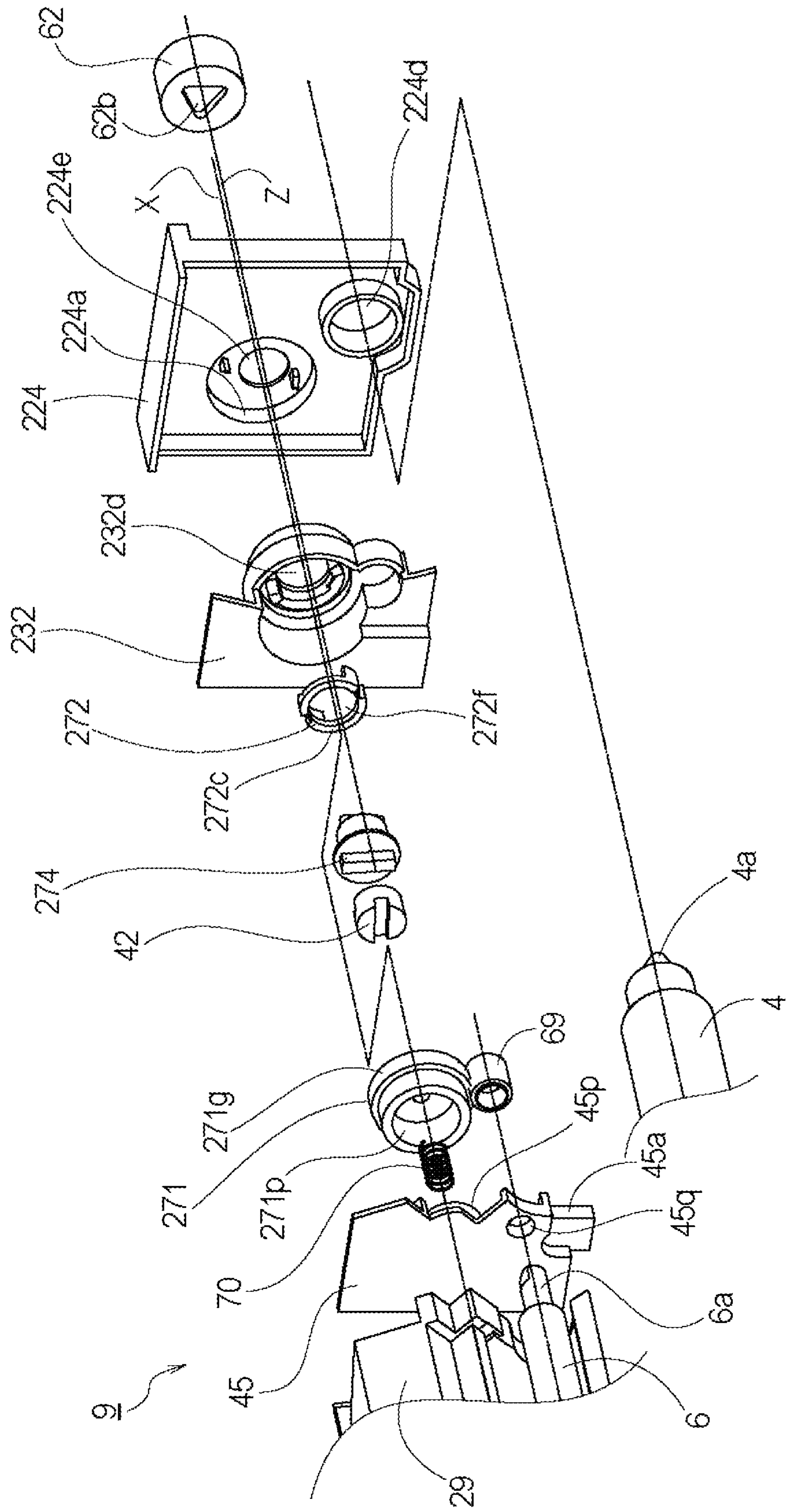
FIG. 19 is an exploded perspective view of the neighborhood of the drive connecting portion of the process cartridge according to the second embodiment as seen from a non-driving side.

Referring to FIGS. 18, 19, the structure of the drive connecting portion of this embodiment will be described. The drive connecting portion of this embodiment comprises a spring 70, an idler gear 271 as a downstream member of the Oldham coupling, a middle member 42 of the Oldham coupling, the drive input member 274 as an upstream member of the Oldham coupling, the release cam 272 as a releasing member (a part of a releasing mechanism), the developing device covering member 232 and the driving side cartridge cover member 224. Between the bearing member 45 and the driving side cartridge cover member 224, the above-described drive connecting portion is provided from the bearing member 45 in the order named toward the driving side cartridge cover member 224.

Figure 20:
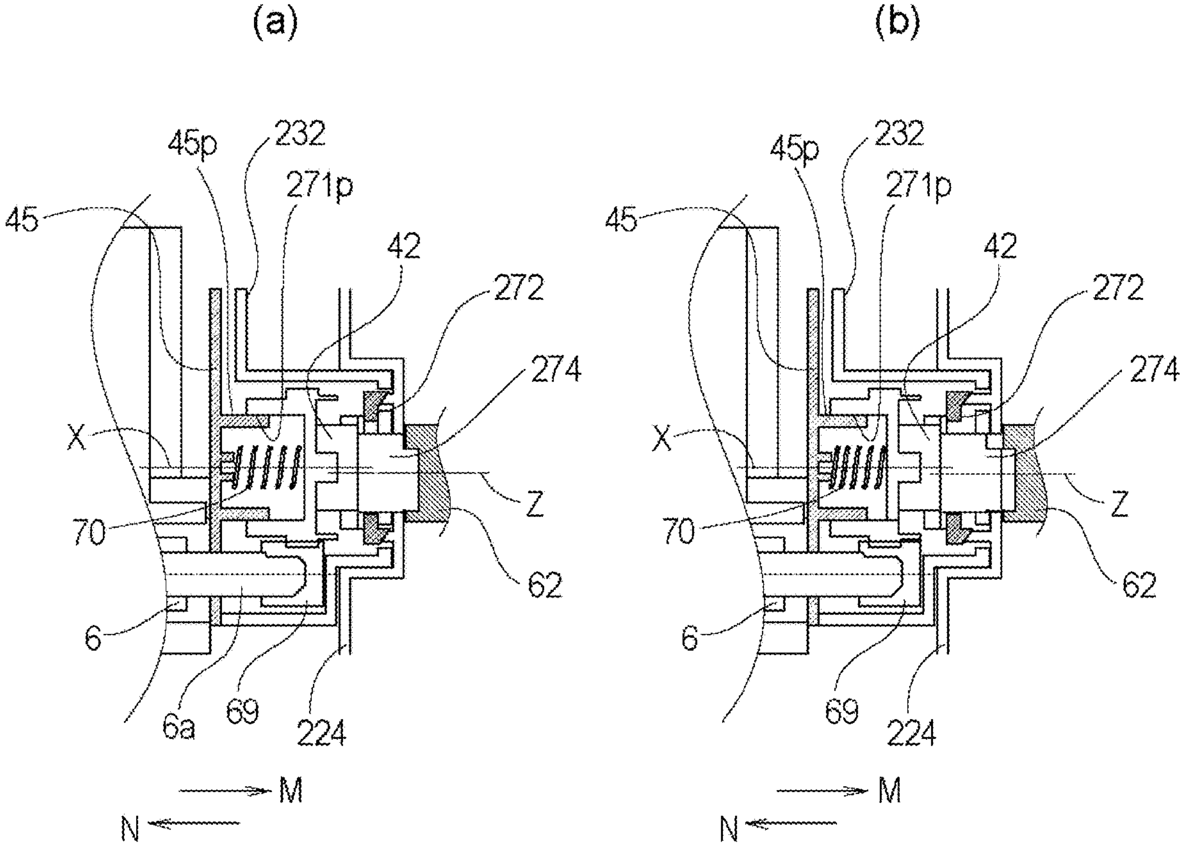
FIG. 20 as a schematic sectional view of a neighborhood of the cartridge side drive transmission member according to the second embodiment, in which (a) Illustrates a drive transmission state, and (b) illustrates a drive disconnection state.

Even when the developing unit 9 is moved between the development contact state position and the spaced-developing-device state position, the driving force supplied from the developing unit 9 has to be assuredly transmitted to the developing roller 6. At least the center line of the release cam 272 is coaxial with the rotation axis X, but in this embodiment, the rotation axis X of the developing unit 9 relative to the drum unit 8 is not coaxial with the rotational axis Z of the drive input member 274. Therefore, when the developing unit 9 moves between the development contact state position and the spaced-developing-device state position, the relative position between the drive input member 274 and the idler gear 271. In view of this, the universal joint (Oldham coupling) through which the drive-transmittable is capable even if the relative positional deviation occurs is employed. More specifically, in this embodiment, the drive input member 274, the middle member 42 and the idler gear 271 constitute the Oldham coupling. FIG. 20 is a schematic sectional view of the drive connecting portion. Part (a) of FIG. 20 illustrates a state in which the drive inputting portion 74*b* of the drive input member 74 and the developing device-drive output member 62 of the main assembly are engaged with each other to effect the drive transmission to the developing roller 6. That is, the drive input member 74 is in the first position.

Part (b) of FIG. 20 illustrates a state in which the drive inputting portion 274*b* of the drive input member 274 is disconnected from the developing device-drive output member 62 of the main assembly, so that the drive for the developing roller 6 is stopped. That is, the drive input member 74 is in the second position.

As will be understood from these Figures, the rotational axis of the idler gear 271 is coaxial with the rotation axis X. The middle member 42 whirls between the rotation axis X and the rotational axis Z. The center of the release cam 272 is on the rotation axis X.

[Drive Disconnecting Operation]

Referring to FIG. 7 and FIGS. 21-23, the description will be made as to an operation of the drive connecting portion when the developing roller 6 is separating from the drum 4.

For the simplicity of the restoration, a part of the elements are shown, and a part of the structure of the release cam is illustrated schematically. In the Figures, an arrow M is along the rotation axis X and is oriented toward a outside of the cartridge, and an arrow N is along the rotation axis X and is oriented toward an inside of the cartridge.

[State 1]

Figure 21:
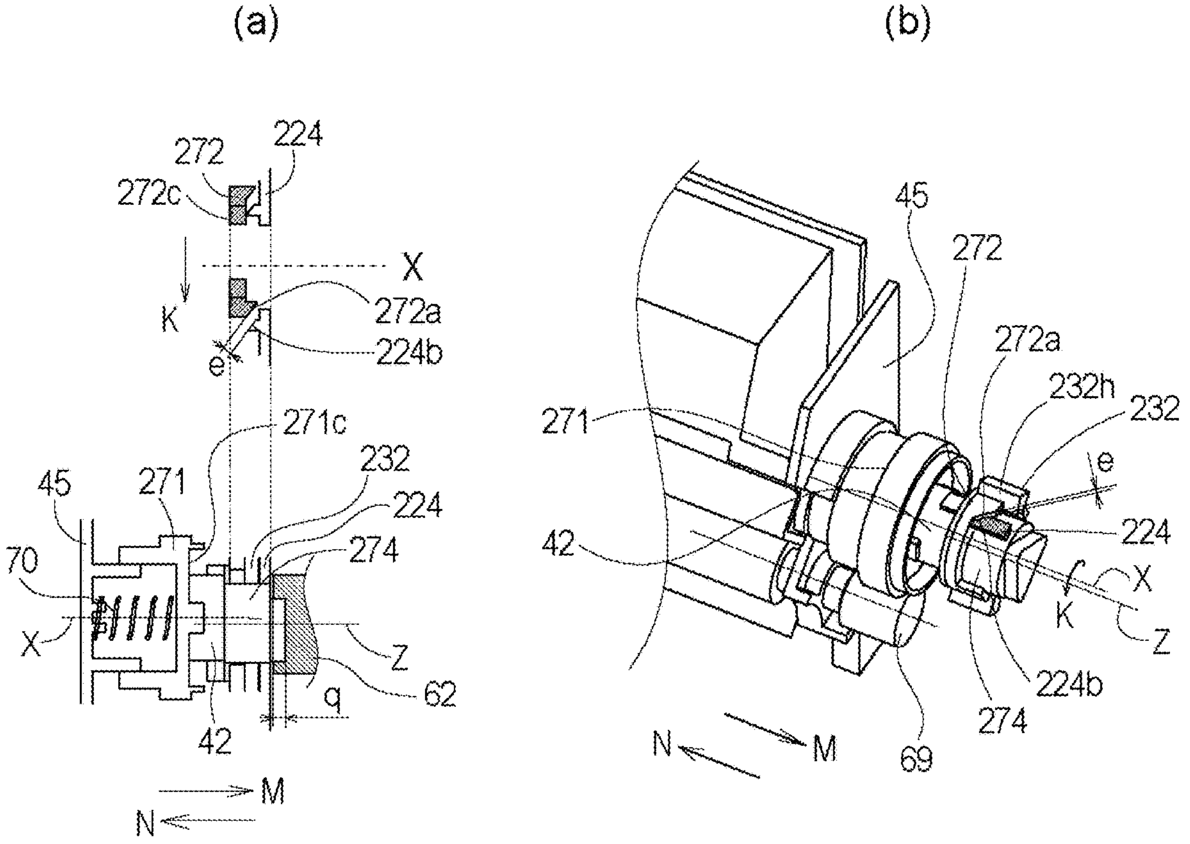
FIG. 21 is a schematic view of a neighborhood of the cartridge side drive transmission member according to the second embodiment in a drum-roller-spaced-and-drive-transmission state, in which (a) is a schematic sectional view of the drive connecting portion, and (b) is a perspective view of the drive connecting portion.

As shown in part (a) of FIG. 7, between the spacing force urging member (main assembly side urging member) 80 and the urging force receiving portion (spacing force receiving portion) 45*a* of the bearing member 45, there is a gap d. Here, the drum 4 and the developing roller 6 are contacted with each other. This state is called "state 1" of the spacing force urging member (main assembly side urging member) 80. FIG. 21 shows the structures of the drive connecting portion at this time.

In part (a) of FIG. 21, the pair of the drive input member 74 and the developing device-drive output member 62, and the pair of the release cam 272 with driving side cartridge cover member 224 are separately and schematically shown.

Part (b) of FIG. 21 is the perspective view of the drive connecting portion. In part (b) of FIG. 21, as to the driving side cartridge cover member 224, only a part including the contact portion 224*b* is shown, and as to the developing device covering member 232, only a part including the guide 232*h* is shown. A gap e is provided between the contact portion 272*a* of the release cam 272 and the contact portion 224*b* of the driving side cartridge cover member 224. At this time, the drive input member 274 and the developing device-drive output member 62 are engaged with each other by an engaging amount (depth) q, and in this state, the drive transmission is possible. As described hereinbefore, the drive input member 274 is engaged with the developing roller gear 69 as a developing roller drive transmission member. Therefore, the driving force supplied from the main assembly 2 to the drive input member 274 is transmitted to the developing roller gear 69 to drive the developing roller 6. The positions of various parts in the state is called contacting position, and is also called a drum-roller-spaced-and-drive-transmission state. The position of the drive input member 274 at this time is called a first position.

[State 2]

When the spacing force urging member (main assembly side urging member) 80 move in the direction of the arrow F1 in the Figure by 61 from the drum-roller-contact-and-drive-transmission state, as shown in part (b) of FIG. 7, the developing unit 9 rotates in the direction indicated by the arrow K about the rotation axis X by the angle θ1. As a result, the developing roller 6 space is from the drum 4 by a distance F1. The release cam 272 and the developing device covering member 232 in the developing unit 9 rotates in the direction indicated by the arrow K by the angle θ1 in interrelation with the rotation of the developing unit 9. On the other hand, when the cartridge P is mounted on the main assembly 2, the drum unit 8, the driving side cartridge cover member 224 and the non-driving side cartridge cover member 225 are position and fixed to the main assembly 2. In other words, as shown in part (a) and part (b) of FIG. 14, the contact portion 24*b* of the driving side cartridge cover member 24 does not move. In the Figure, the release cam 272 has rotated in the direction of the arrow K in the Figure in interrelation with the rotation of the developing unit 9 to a state in which the contact portion 272*a* of the release cam 272 and the contact portion 224*b* of the driving side cartridge cover member 224 start contacting to each other. At this time, the drive input member 274 and the developing device-drive output member 62 *e* kept in engagement with each other (part (a) of FIG. 22). Therefore, the driving force supplied from the main assembly 2 to the drive input member 274 is transmitted to the developing roller 6 through the developing roller gear 69. This state of various parts is called a drum-roller-spaced-and-drive-transmission state. The position of the drive input member 274 is in the first position.

[State 3]

Figure 23:
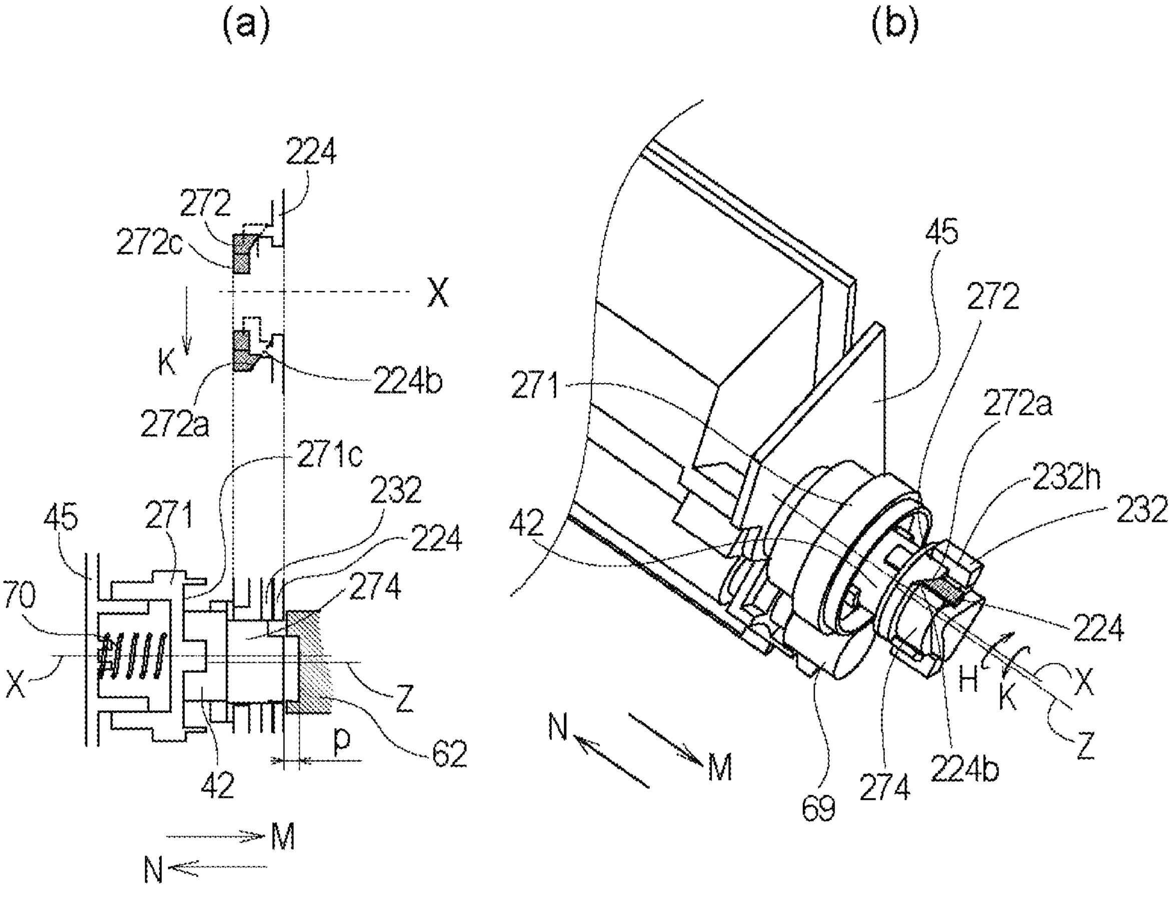
FIG. 23 is a schematic view of the neighborhood of the cartridge side drive transmission member according to the second embodiment in a drum-roller-spaced-and-drive-disconnection state, in which (a) is a schematic sectional view of the drive connecting portion, and (b) is a perspective view of the drive connecting portion.

Part (a) and part (b) of FIG. 23 show the structures of the drive connecting portion when the spacing force urging member (main assembly side urging member) 80 moves in the direction indicated by the arrow F1 in the Figure by the distance 62 from the drum-roller-spaced-and-drive-transmission state, as shown in part (c) of FIG. 7. In interrelation with the rotation of the developing unit 9 by the angle θ2 (>θ1), the release cam 272 and the developing device covering member 232 rotate. On the other hand, the driving side cartridge cover member 224 does not move similarly to the above-described case, and the release cam 272 rotates in the direction indicated by the arrow K in the Figure. At this time, the contact portion 272*a* of the release cam 272 receives a reaction force from the contact portion 224*b* of the driving side cartridge cover member 224. In addition, as described hereinbefore, the guide groove 272*h* of the release cam 272 is engaged with the guide 232*h* of the developing device covering member 232, and therefore, is movable only in the axial direction (arrow M and N directions) (FIG. 10). As a result, the release cam 272 makes sliding movement in the direction of the arrow N relative to the developing device covering member by movement distance p. In addition, in interrelation with the movement of the release cam 272 in the direction of the arrow N, the urging surface 272*c* which is an urging portion of the release cam 272 as the urging member urges the urged surface 274*c* of the drive input member 74. By this, the drive input member 274 slides by the movement distance p in the direction of the arrow N against the urging force of the spring 70 (parts (b) of FIG. 23 and FIG. 12).

Because the movement distance p is larger than the engagement amount q between the drive input member 274 and the developing device-drive output member 262, the engagement between the drive input member 274 and the developing device-drive output member 62 is released. As a result, the developing device-drive output member 62 of the main assembly 2 continues rotating, and on the other hand, the drive input member 274 stops. Therefore, the rotations of the developing roller gear 69 and the developing roller 6 stop. This state of various parts is called a spacing position and is also called a drum-roller-spaced-and-drive-disconnection state.

The position of the drive input member 274 at this time is called a second position.

By the drive input member 274 being urged by the urging portion 272*c* of the release cam 272 in this manner, the drive input member 274 is moved from the first position to the second position toward the inside of the cartridge. On the other hand, the idler gear 271 moves in alignment with the rotation axis X. By doing so, the engagement between the drive input member 274 and the developing device-drive output member 62 are released, so that the rotational force from the developing device-drive output member 62 is no longer transmitted to the drive input member 274.

In the foregoing, the description has been made as to the drive disconnecting operation relative to the developing roller 6 in interrelation with the rotation of the developing unit 9 in the direction of the arrow K. By employing the above-described structure, the developing roller 6 is capable of spacing from the drum 4 while rotating. As a result, the drive to the developing roller 6 can be stopped depending on the space distance between the developing roller 6 and the drum 4.

[Drive Connecting Operation]

The description will be made as to the operation of the drive connecting portion at the time when the developing roller 6 and the drum 4 change from the spaced state to the contacted state. The operation is reciprocal of the above-described operation from the contact state to the spaced state.

In the spaced-developing-device state (the developing unit 9 is rotated by the angle θ2 as shown in part (c) of FIG. 7), the engagement between the drive input member 274 and the developing device-drive output member 62 is released in the drive connecting portion, as shown in FIG. 23. That is, the drive input member 274 is in the second position.

Figure 22:
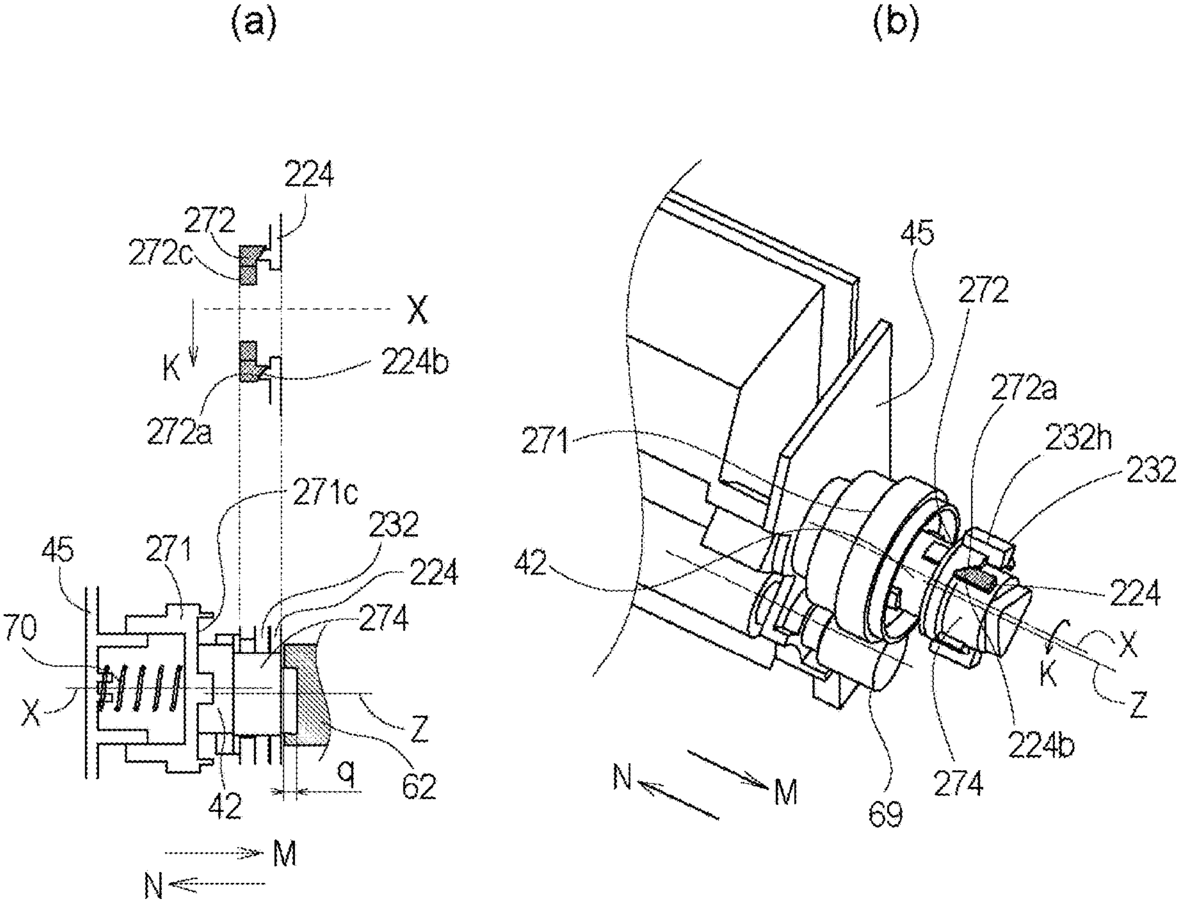
FIG. 22 is a schematic view of the neighborhood of the cartridge side drive transmission member according to the second embodiment in a drum-roller-spaced-and-drive-transmission state, image (a) is a schematic sectional view of the drive connecting portion, and (b) is a perspective view of the drive connecting portion.

In the state that the developing unit 9 has been gradually rotated ion the direction of the arrow H in FIG. 7 (in the direction opposite from the above-described arrow K direction) so that the developing unit 9 is rotated by the angle θ1 (part (b) of FIG. 7 and FIG. 22), the drive input member 274 and the developing device-drive output member 62 are engaged with each other by the drive input member 274 moving in the direction of the arrow M by the urging force of the spring 70.

By this, the driving force is transmitted from the main assembly 2 to the developing roller 6 so that the developing roller 6 is rotated. That is, the drive input member 274 is in the first position. At this time, the developing roller 6 and the drum 4 are kept separated from each other.

By further rotating the developing unit 9 gradually from this state in the direction of the arrow H (FIG. 7), the developing roller 6 and the drum 4 can be contacted to each other. Also in this state, the drive input member 274 is in the first position.

In the foregoing, the drive transmission operation to the developing roller 6 in interrelation with the rotation of the developing unit 9 in the direction of the arrow H has been described. With the foregoing structures, the developing roller 6 is brought into contact to the drum 4 while rotating, and the drive can be transmitted to the developing roller 6 depending on the spacing distance between the developing roller 6 and the drum 4.

As described in the foregoing, wherein such structures, the switching between the connection and disconnection relative to the developing roller 6 can be effected unique depending on the angle of rotation of the developing unit 9.

In the foregoing description, the contact between the contact portion 272*a* of the release cam 272 and the contact portion 24*b* of the driving side cartridge cover member 224 is surface-to-surface contact, but this is not restrictive on the present invention.

As described in the foregoing, the release cam 272 disposed coaxially with the rotation axis X of the developing unit 9 is moved in the longitudinal direction (arrows M, N) in response to the contact space operations of the developing unit 9, similarly to Embodiment 1. In this embodiment, in interrelation with the rotation of the developing unit 9, the idler gear 271, the middle member 42 and the drive input member 74 move in the longitudinal direction (arrows M, N). By this, the driving connection and disconnection between the drive input member 274 and the developing device-drive output member 62 can be affected.

Embodiment 3

A cartridge according to a third embodiment of the present invention will be described. In the description of this embodiment, the same reference numerals as in Embodiments are assigned to the elements having the corresponding functions in this embodiment, and the detailed description thereof is omitted for simplicity. The drive input member 374 of this embodiment is movable in the axial direction inside the idler gear 371 as a cartridge side drive transmission member. That is, it is unnecessary to move the idler gear 371 engaged with the developing roller gear 69 in the axial direction as seen in the foregoing embodiments, and therefore, the wearing of the idler gear 371 can be reduced.

In this embodiment, the engaging relation between the drive input member 374 and the developing device-drive output member 62 of the main assembly is equivalent to the engaging relation between the drive inputting portion 74*b* of the drive input member 74 and the developing device-drive output member 62 of the main assembly in Embodiment 1. In addition, the drive inputting portion 4*a* for the photosensitive member (photosensitive member drive transmitting portion) is similar to that in Embodiment 1. The engaging relation between the drive input member 374, the release cam 372, the developing device covering member 232 and the driving side cartridge cover member 324 is similar to that of Embodiment 1 (FIGS. 10 and 11).

[Structure of Drive Connecting Portion]

Figure 24:
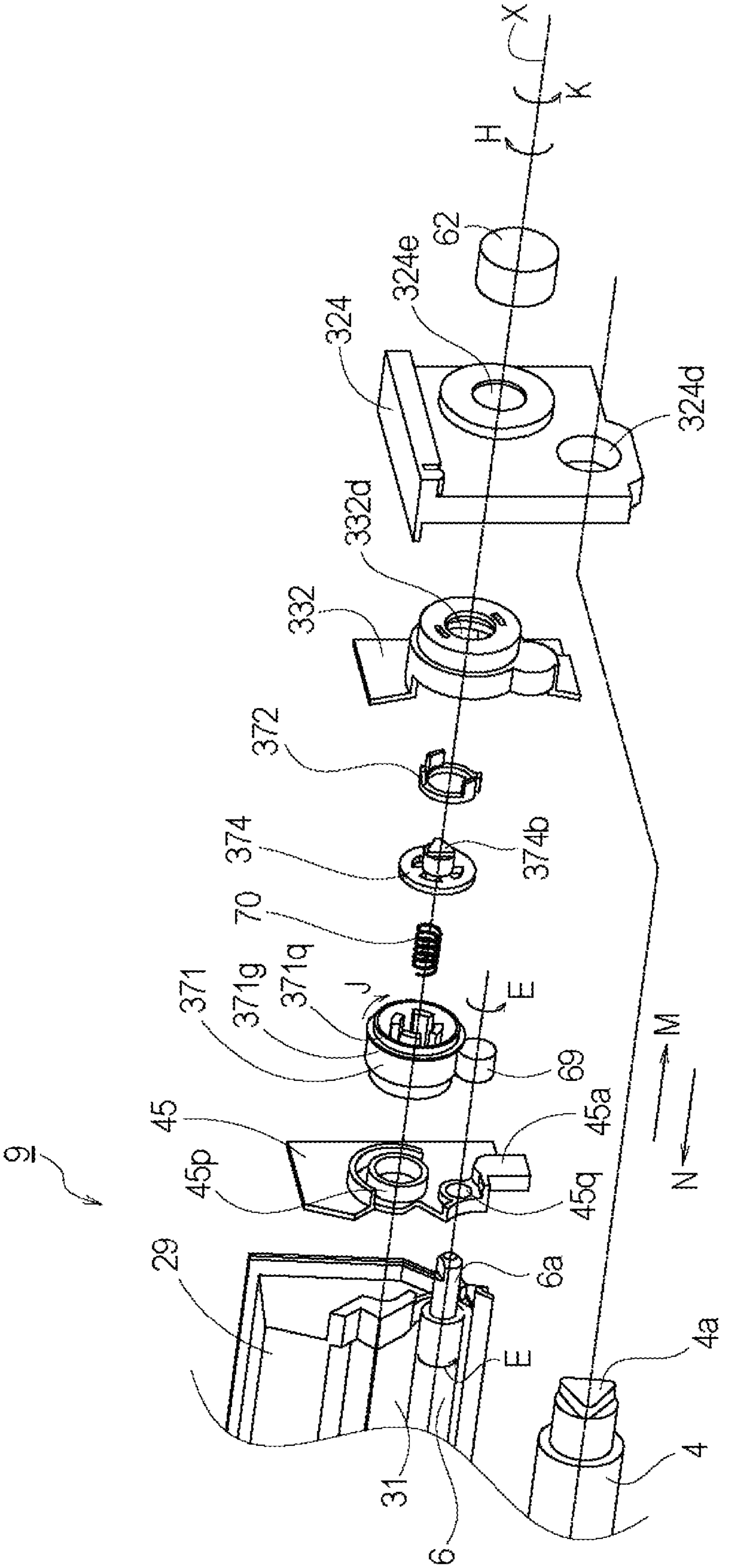
FIG. 24 is an exploded perspective view of a drive connecting portion of a process cartridge according to a third embodiment, as seen from a driving side.
Figure 25:
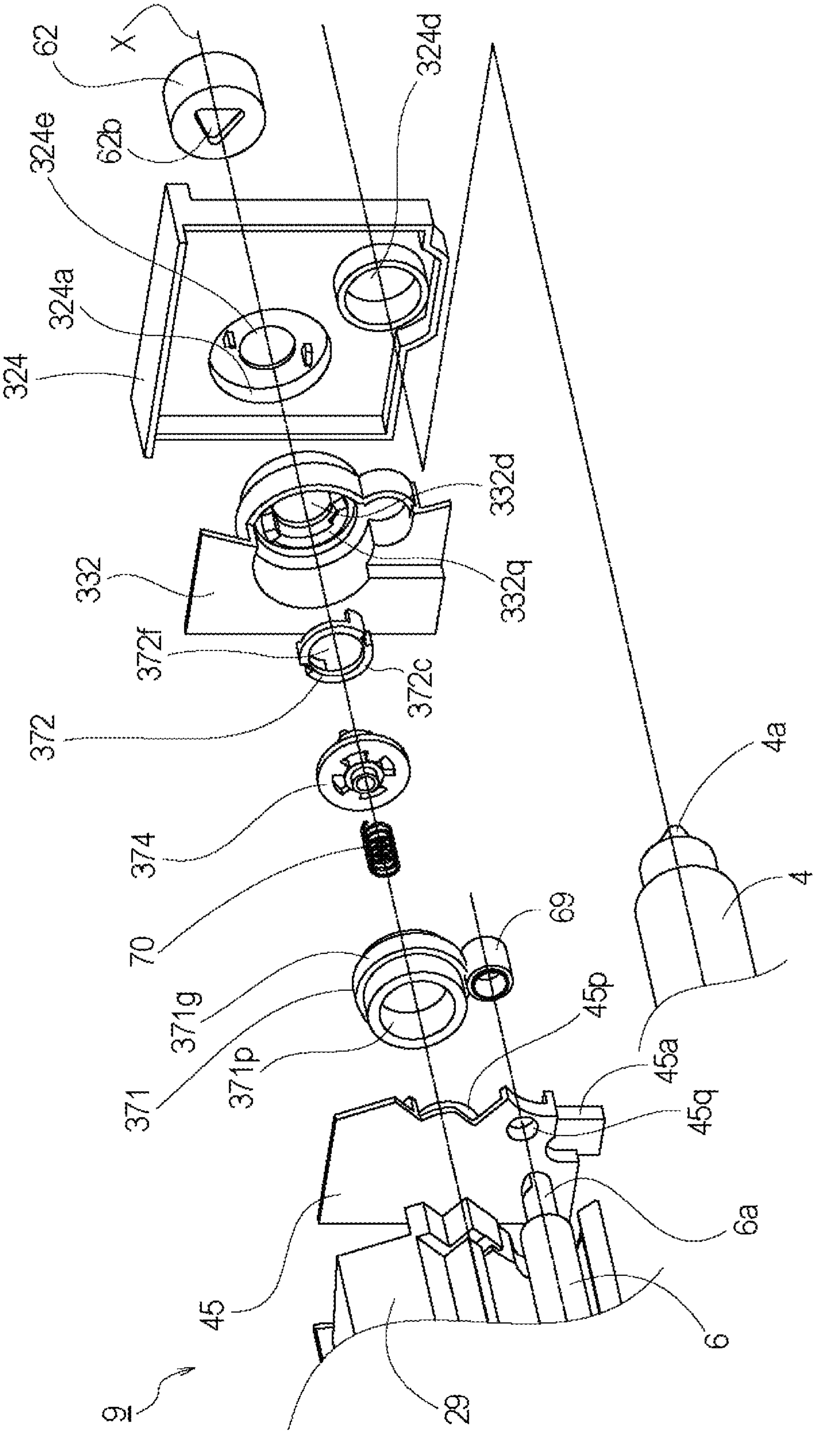
FIG. 25 is an exploded perspective view of a drive connecting portion of a process cartridge according to the third embodiment, as seen from a non-driving side.
Figure 27:
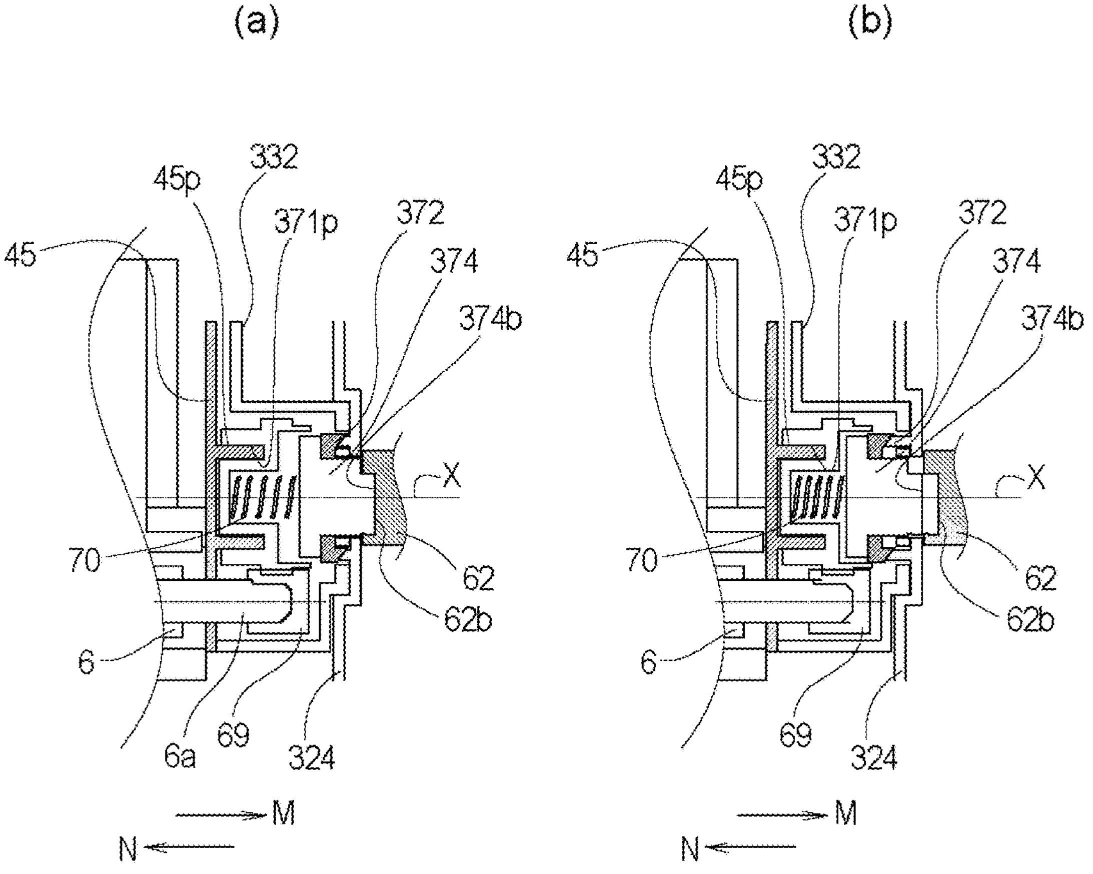
FIG. 27 is a schematic sectional view of a neighborhood of the cartridge side drive transmission member according to the third embodiment, in which (a) illustrates a drive transmission state, and (b) illustrates a drive disconnection state.

Referring to FIGS. 24 and 25, the structure of the drive connecting portion of this embodiment will be described. The drive connecting portion of this embodiment comprises an idler gear 371 as another cartridge side drive transmission member, the spring 70, a drive input member 374, a release cam 372 as a part of the releasing mechanism, a developing device covering member 332, and a cartridge cover member 324. Between the bearing member 45 and the driving side cartridge cover member 224, the elements of the above-described drive connecting portion is provided coaxially from the bearing member 45 in the order named toward the driving side cartridge cover member 224. The idler gear 371 which is another cartridge side drive transmission member and the cartridge side drive transmission member 374 are engaged directly coaxially with each other. The bearing member 45 rotatably supports the idler gear 371. More particularly, a first shaft receiving portion 45*p* (outer surface of the cylindrical portion) of the bearing member 45 rotatably supports the supported portion 371*p* (inner surface of the cylindrical portion) of the idler gear 371 (FIGS. 24, 25 and 27). In addition, the bearing member 45 rotatably supports the developing roller 6. More particularly, a second shaft receiving portion 45*q* (inner surface of the cylindrical portion) of the bearing member 45 rotatably supports the shaft portion 6*a* of the developing roller 6. The developing roller gear 69 as the developing roller drive transmission member is engaged with the shaft portion 6*a* of the developing roller 6. The outer periphery of the idler gear 371 is formed into a gear portion 371 *g* for meshing engagement with the developing roller gear 69. By this, the rotational force is transmitted from the idler gear 371 to the developing roller 6 through the developing roller gear 69.

Figure 26:
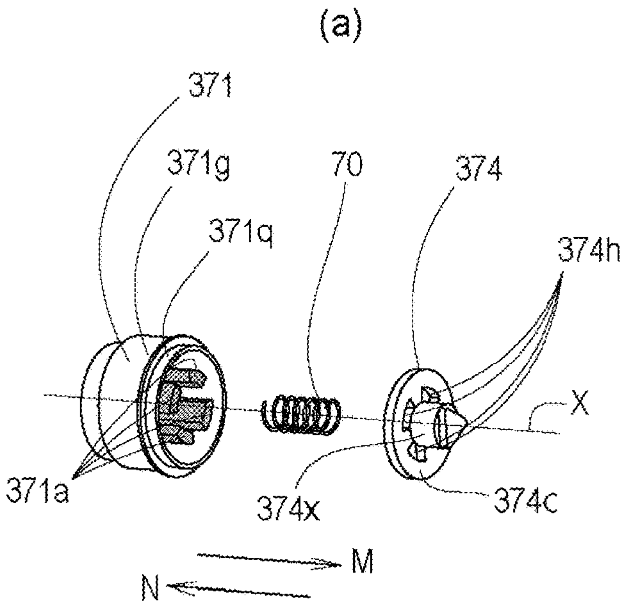
FIG. 26 is an exploded view (a), perspective view (b) of an idler gear and a cartridge side drive transmission member, according to the third embodiment.

FIG. 26 illustrates structures of the parts constituting the idler gear 371, the spring 70 and the drive input member 374. Part (b) of FIG. 26 illustrates a state in which the parts are assembled. The idler gear 371 is substantially cylindrical, and is provided with a guide 371*a* as a first guide portion inside thereof. The guide portion 371*a* is in the form of a shaft portion substantially parallel with the rotation axis X. On the other hand, the drive input member 374 is provided with a hole portion 374*h* as a first portion-to-be-guided. The drive input member 374 is movable along the rotation axis X in the state that the hole portion 374*h* is engaged with the guide 371*a*. In other words, the idler gear 371 supports therein the drive input member 374 slidably along the rotational axis. Further in other words, the drive input member 374 is slidable (reciprocable) in the directions of arrows M and N relative to the idler gear 371. By the engagement between the guide portion 371*a* and the hole portion 374*h*, the guide portion 371*a* is capable of receiving the rotational force for rotating the developing roller 6, from the drive input member 374.

Four of such guides 371*a* are provided in this embodiment, and they are disposed at 90 degrees intervals so as to surround the rotation axis X. Correspondingly, four of such hole portions 374*h* are provided at 90 degrees intervals so as to surround the rotation axis X. The numbers of the guides 371*a* and the hole portions 374*h* are not limited to "four". However, the members of the guides 371*a* and the hole portions 374*h* are preferably plural, and they are preferably arranged about the rotation axis X at regular intervals in the circumferential direction. In this case, the resultant force of the forces applied to the guides 371*a* or the hole portions 374*h* provides a moment tending to rotate the drive input member 374 and the idler gear 371 about the rotation axis X. Therefore, axis tilting of the drive input member 374 or the idler gear 371 relative to the rotation axis X can be suppressed.

As the drive input member 374 is seen from the drive inputting portion 374*b* side in the direction in which the shaft portion of the drive input member 374 extends, the drive inputting portion 374*b* is disposed at the center of the drive input member 374, and the plurality of the hole portions 374*h* are disposed therearound, and the portion outside the hole portions 374*h* constitutes an portion-to-be-urged 374*c* of the drive inputting portion 374 which is pressed by the release cam 372.

As shown in FIG. 24 and FIG. 25, the release cam 372 is disposed between the drive input member 374 and the developing device covering member 332. Similarly to the first embodiment, the release cam 372 is slidable only in the axial direction (arrows M and N) relative to the developing device covering member 332 (FIG. 10). More particularly, the drive input member 374 is provided with a shaft portion 374*x*, and an end portion thereof is provided with the drive inputting portion 74*b* as a rotational force receiving portion. The shaft portion 374*x* penetrates an opening 372*f* of the release cam 372, an opening 332*d* of the developing device covering member 332 and an opening 324*e* of the driving side cartridge cover portion 324, and the drive inputting portion 374*b* at the free end is exposed to the outside of the cartridge. That is, the drive inputting portion 374*b* is projected outwardly of the cartridge beyond an opening plane of the driving side cartridge cover member 324 having the opening 324*e*.

The drive inputting portion 374*b* is movable toward the inside of the cartridge. By the portion-to-be-urged 374*c* provided in the base portion of the shaft portion 374*x* of the drive inputting portion 374 being urged by the release cam 372, the drive input member 374 retracts inwardly of the cartridge. By doing so, the transmission and disconnection of the driving force supplied from the main assembly side drive transmission member 62.

FIG. 27 is a schematic sectional view of the drive connecting portion. In a sectional view of the drive connecting portion shown in part (a) of FIG. 27, the drive inputting portion 374*b* of the drive input member 374 and the developing device-drive output member 62 are engaged with each other. That is, the drive inputting portion 374*b* is in the position capable of transmitting the drive from the developing device-drive output member 62, and therefore, the drive input member 374 is in the first position. In a sectional view of the drive connecting portion shown in part (b) of FIG. 27, the drive inputting portion 374*b* of the drive input member 374 is spaced from the developing device-drive output member 62.

That is, the drive inputting portion 374*b* is in the position not transmitting the drive from the developing device-drive output member 62, and therefore, the drive input member 374 is in the second position.

As described hereinbefore, the cylindrical portion 37*ip* of the idler gear 371 and the first shaft receiving portion 45*p* (outer surface of the cylindrical portion) of the bearing member 45 are engaged with each other. In addition, the cylindrical portion 371*q* of the idler gear 371 and the inside circumference 332*q* of the developing device covering member 332 are engaged with each other. Thus, the idler gear 371 is rotatably supported by the bearing member 45 and the developing device covering member 332 at the opposite end portions thereof, and the drive input member 374 it supported slidably relative to the idler gear 371 along the axis of the developing roller.

The center of the first shaft receiving portion 45*p* (outer surface of the cylindrical portion) of the bearing member 45 and the center of the opening 332*d* provided in the inside circumference 332*q* of the developing device covering member 332 are coaxial with the rotation axis X of the developing unit 9. That is, the drive input member 374 is supported rotatably about the rotation axis X of the developing unit 9.

In addition, between the idler gear 371 and the drive input member 374, the spring 70 which is an elastic member as an urging member is provided. As schematically shown in FIG. 27, the spring 70 is provided inside the idler gear 371 and urges the drive input member 374 in the direction of the arrow M. Thus, the drive input member 374 is movable toward the inside of the idler gear 371 against the elastic force of the spring 70. By the drive input member 374 moving into the idler gear 371, the coupling with the main assembly side drive transmission member 62 is disconnected.

As the drive input member 374 and the other cartridge side drive transmission member (idler gear 371) are projected on a phantom line parallel with the rotational axis of the developing roller 6 in the state shown in FIG. 27, a part of the drive input member 374 overlaps with at least a part of the idler gear 371.

[Drive Disconnection and Connecting Operation]

The operation of the drive connecting portion at the time when the state between the developing roller 6 and the drum 4 is changed from the contact state to the spaced state and the operation of the drive connecting portion at the time when the state changed from the spaced state to the contact state are similar to those of Embodiment 1. With this structure of this embodiment, the drive input member 374 is movable in the axial direction (arrows M and N) inside the idler gear 371. Thus, in the switching operation between the drive disconnection and the drive transmission for the developing roller 6, it is unnecessary to move the idler gear 371 in the axial direction relative to the developing roller gear 69. When the gears are helical gears, a thrust force (axial direction) is produced at the gear tooth surfaces in the gear drive transmitting portion. Therefore, in the case of the first embodiment, a force against the thrust force it is required in order to move the idler gear 371 in the axial direction (arrows M or N).

On the contrary, in this embodiment, it is unnecessary to move the idler gear 371 in the axial direction (arrow M or N). It will suffice if the drive input member 374 is moved in the axial direction (arrows M and N) in the idler gear 371, and as a result, the force required for moving the drive input member 374 in the axial direction can be reduced.

In addition, because the drive input member 374 is provided in the inside circumference of the idler gear 371, the dimension of the developing unit 9 in the longitudinal direction can be reduced. In the axial direction, a width 374*y* of the drive input member 374, as movement space p of the drive input member 374 and a width 371*x* of the idler gear 371 are required. By disposing at least a part of the width 374*y* of the drive input member 374 and at least a part of the movement space p in the width 371*x* of the idler gear 371, the size of the entirety of the developing unit 9 in the longitudinal direction can be reduced.

Embodiment 4

A cartridge according to a fourth embodiment of the present invention will be described. In the description of this embodiment, the same reference numerals as in Embodiments are assigned to the elements having the corresponding functions in this embodiment, and the detailed description thereof is omitted for simplicity. The structure of the cartridge of this embodiment is different from the foregoing embodiments in the structure of the releasing mechanism.

[Structure of Drive Connecting Portion]

In this embodiment, the engaging relation between the drive input member 374 and the developing device-drive output member 62 of the main assembly is equivalent to the engaging relation between the drive inputting portion 74*b* of the drive input member 74 and the developing device-drive output member 62 of the main assembly in Embodiment 1. In addition, the drive inputting portion 4*a* for the photosensitive member (photosensitive member drive transmitting portion) is similar to that in Embodiment 1. The configurations of the drive input member 474 and the idler gear 471 in this embodiment are similar to those of Embodiment 3.

Figure 28:
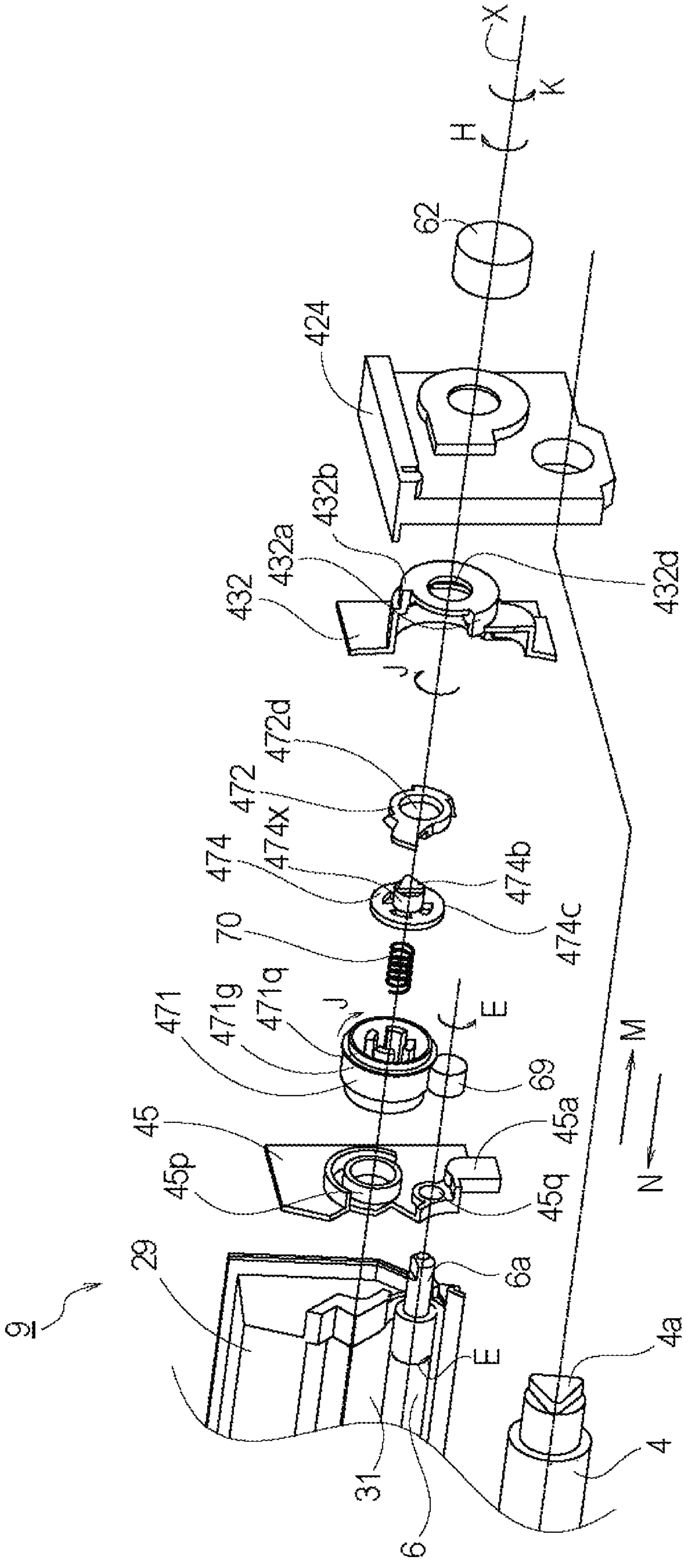
FIG. 28 is an exploded perspective view of a drive connecting portion of a process cartridge according to a fourth embodiment, as seen from a driving side.
Figure 29:
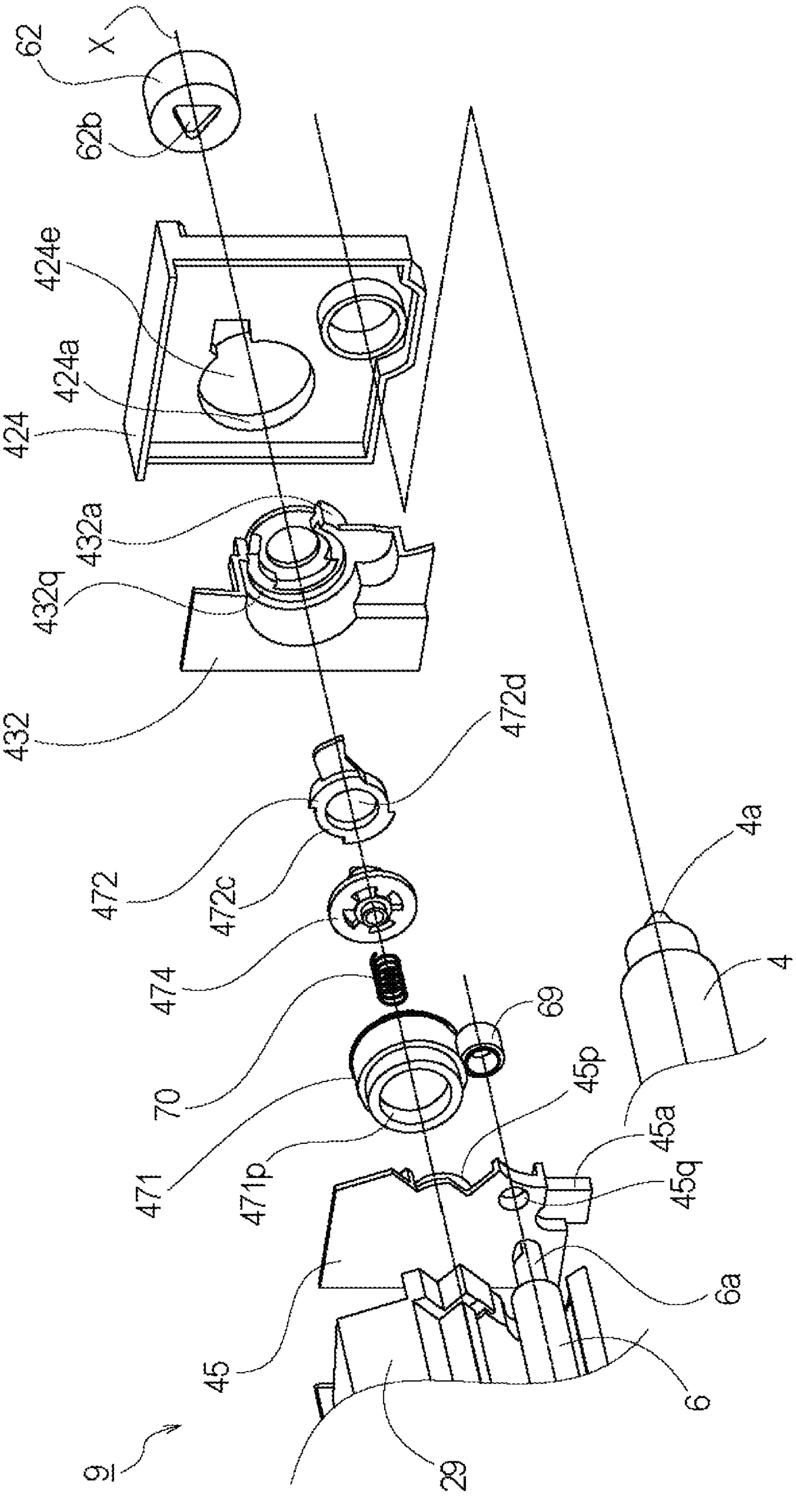
FIG. 29 exploded perspective view of the neighborhood of the drive connecting portion of the process cartridge according to the fourth embodiment, as seen from a non-driving side.

Referring to FIGS. 28, 29, the structures of the drive connecting portion of this embodiment will be described in detail. The drive connecting portion of this embodiment comprises an idler gear 471 which is another cartridge side drive transmission member, a spring 70, a drive input member 474, a release cam 472 as an operating member which is a part of the releasing mechanism and which is a coupling releasing member, and a developing device covering member 432. Between the bearing member 45 and the driving side cartridge cover member 324, the above-described drive connecting portion is provided coaxially from the bearing member 45 in the order named toward the driving side cartridge cover member 324. The idler gear 471 and the cartridge side drive transmission member 474 are engaged directly and coaxially with each other.

The cartridge side drive transmission member 474 is provided with a shaft portion 474*x* and has an end portion provided with the drive inputting portion 474*b* as a rotational force receiving portion. The shaft portion 474*x* penetrates the opening 472*d* of the release cam, the opening 432*d* of the developing device covering member 432 and the opening 424*e* of the driving side cartridge cover member 424, and the drive inputting portion 474*b* at the free end is exposed toward the outside of the cartridge. By portion-to-be-urged 474*c* provided at the base portion of the shaft portion 474*x* of the cartridge side drive transmission member 474 being urged by the urging portion 472*c* of the release cam 472, the drive input member 474 retracts toward the inside of the cartridge.

Figure 30:
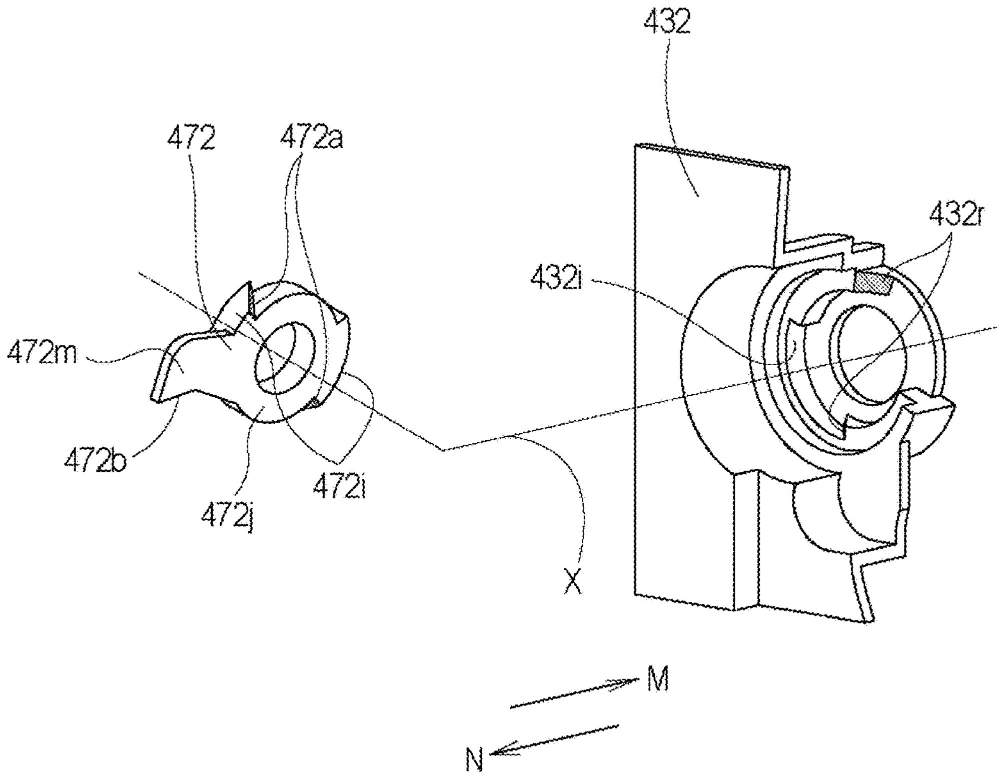
FIG. 30 is a perspective view of a release cam and a developing device covering member according to the fourth embodiment.

FIG. 30 illustrates a relationship between the release cam 472 as the coupling releasing member and the developing device covering member 432. The release cam 472 has a ring portion 472*j* which is substantially in the form of a ring. The ring portion 472*j* has an outer peripheral surface which functions as a second portion-to-be-guided. The outer periphery portion is provided with a projected portion 472*i* projecting from the ring portion. In this embodiment, the projected portion 472*i* projects radially outwardly of the ring portion. In addition, the developing device covering member 432 has an inner surface 432*i* functioning as a second guide portion. The inner surface 432*i* is engageable with the outer peripheral surface of the release cam 472.

The center of the outer peripheral surface of the release cam 472 and the center of the inner surface 432*i* of the developing device covering member 432 are coaxial with the rotation axis X. Thus, the release cam 472 slidable in the axial direction relative to the developing device covering member 432 and the developing unit 9, and is also rotatable about the rotation axis X.

In addition, an inside surface of the release cam 472 (the surface remote from the developing device covering member) is provided with an urging surface 472*c* as an urging portion. By the urging surface urging the urged surface 474*c* of the drive input member 474, the drive input member 474 is moved toward the inside of the cartridge.

The ring portion 472*j* of the release cam 472 as the coupling releasing member is provided with a contact portion 472*a* as a slanted force receiving portion. The developing device covering member 432 is provided with a slanted contact portion 432*r* contactable to the contact portion 472*a* of the release cam, corresponding to the contact portion 472*a* of the release cam. The release cam 472 is provided with a lever portion 472*m* as a projected portion projecting in the direction substantially perpendicular to the rotational axis of the developing roller, that is, radially outwardly of the ring portion.

Figure 31:
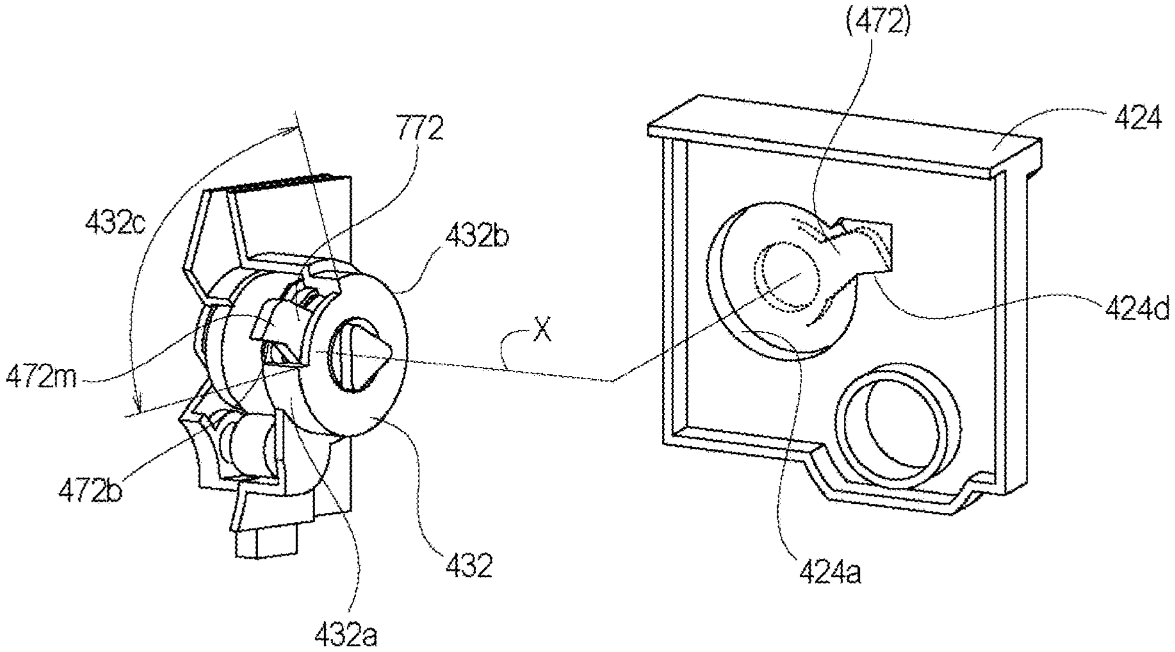
FIG. 31 is a perspective view of a cartridge side drive transmission member, a releasing member, peripheral parts and a driving side cartridge cover member, according to the fourth embodiment.

FIG. 31 illustrates the structures of the drive connecting portion and the driving side cartridge cover member 424. The lever portion 472*m* as the projected portion is provided with a force receiving portion 472*b* as the second portion-to-be-guided. The force receiving portion 472*b* is engaged with the engaging portion 424*d* which is a regulating portion as a part of the second guide portion of the driving side cartridge cover member 424 to receive the force from the driving side cartridge cover member 424. The force receiving portion 472*b* projects through an opening 432*c* provided in a cylindrical portion 432*b* of the developing device covering member 432 to engage with the engaging portion 424*d* of the driving side cartridge cover member 424. By the engagement between the engaging portion 424*d* and the force receiving portion 472*b*, the release cam 472 is slidable only in the axial direction (arrows M and N) relative to the driving side cartridge cover member 424. Similarly to the foregoing embodiments, the outside circumference 432*a* of the cylindrical portion 432*b* of the developing device covering member 432 is slidable relative to a supporting portion 424*a* (inner surface of the cylindrical portion) as a sliding portion of the driving side cartridge cover member 424. Thus, the outside circumference 432*a* is rotatably connected with the supporting portion 424*a* as the sliding portion.

Figure 32:
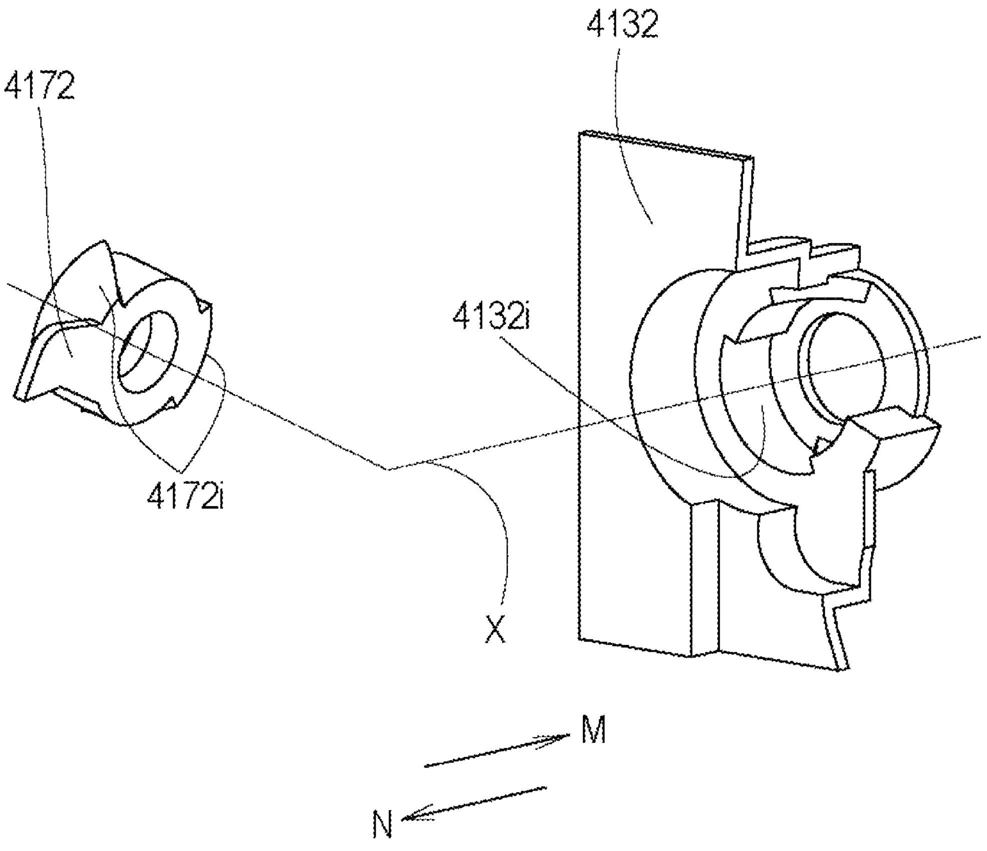
FIG. 32 is a perspective view of a release cam and a developing device covering member according to the fourth embodiment.

Here, in a drive switching operation which will be described hereinafter, when the release cam 472 slides in the axial direction (arrows M and N), it is likely to tilt relative to the axial direction. If the tilting occurs, the drive switching property such as the driving connection and releasing operation timing may be deteriorated. In order to suppress the axis tilting of the release cam 472, it is preferable that a sliding resistance between the outer peripheral surface of the release cam 472 and the inner surface 432*i* of the developing device covering member 432 and a sliding resistance between the force receiving portion 472*b* of the release cam 472 and the engaging portion 424*d* of the driving side cartridge cover member 424 are lowered. In addition, as shown in FIG. 32, it is preferable to increase an engagement amount of the release cam 4172 in the axial direction by extending the inner surface 4132*i* of the developing device covering member 4132 and the outer peripheral surface 4172*i* of the release cam 4172 in the axial direction.

From these aspects, the release cam 472 is engaged with both of the inner surface 432*i* of the developing device covering member 432 which is a part of the second guide portion and the engaging portion 424*d* of the driving side cartridge cover member 424 which is a part of the second guide portion. Thus, the release cam 472 is slidable in the axial direction (arrows M and N) and is rotatable in the rotational moving direction about the rotation axis X relative to the developing unit 9, and further is slidable relative to the drum unit 8 and the driving side cartridge cover member 424 fixed to the drum unit 8 only in the axial direction (arrows M and N).

[Relationship Among the Forces Applied to the Parts of the Cartridge]

The relationship among the forces applied to parts of the cartridge will be described. Part (a) of FIG. 37 is an exploded perspective view of the cartridge P on which the forces applied to the developing unit 9 are schematically shown, part (b) of FIG. 37 is a part of side view of the cartridge P as seen from the driving side along the rotation axis X.

To the developing unit 9, a reaction force Q1 from the urging spring 95, a reaction force Q2 applied from the drum 4 through the developing roller 6, a weight Q3 and so on are applied. In addition to these forces, during the drive disconnecting operation, the release cam 472 receives a reaction force Q4 as a result of engagement with the driving side cartridge cover member 424, as will be described in detail hereinafter. A resultant force Q0 of the reaction forces Q1, Q2, Q4 and the weight Q3 is supplied to the driving side cartridge cover member 424 rotatably supporting the developing unit 9 and the supporting portions 424*a*, 25*a* as the sliding portion of the non-driving side cartridge cover member 25.

Figure 37:
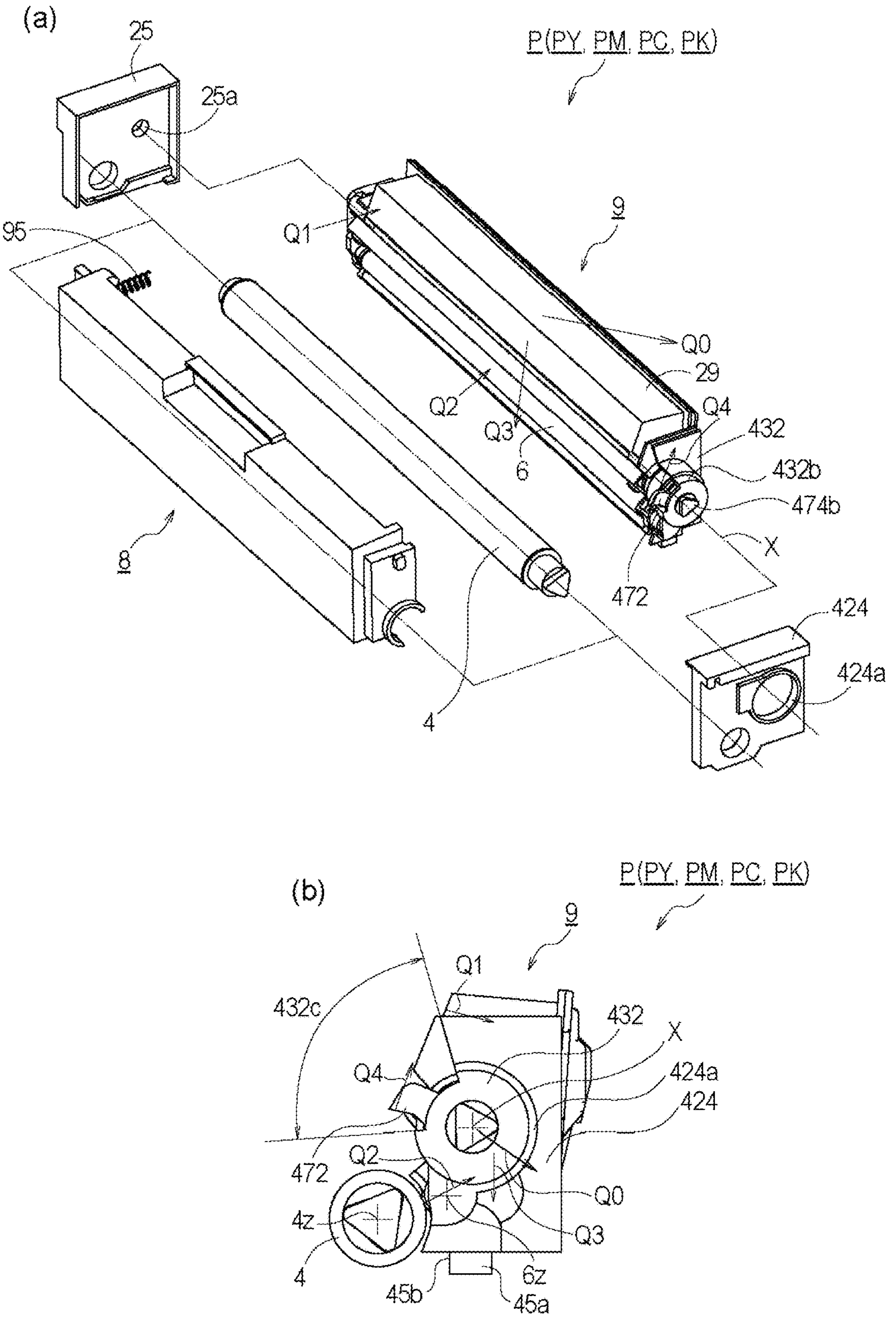
FIG. 37 illustrates a process cartridge according to a fourth embodiment, in which (a) is an exploded perspective view schematically illustrating a force functioned to developing unit 9, and (b) is a schematic side view as seen from a driving side along a rotation axis X.
Figure 38:
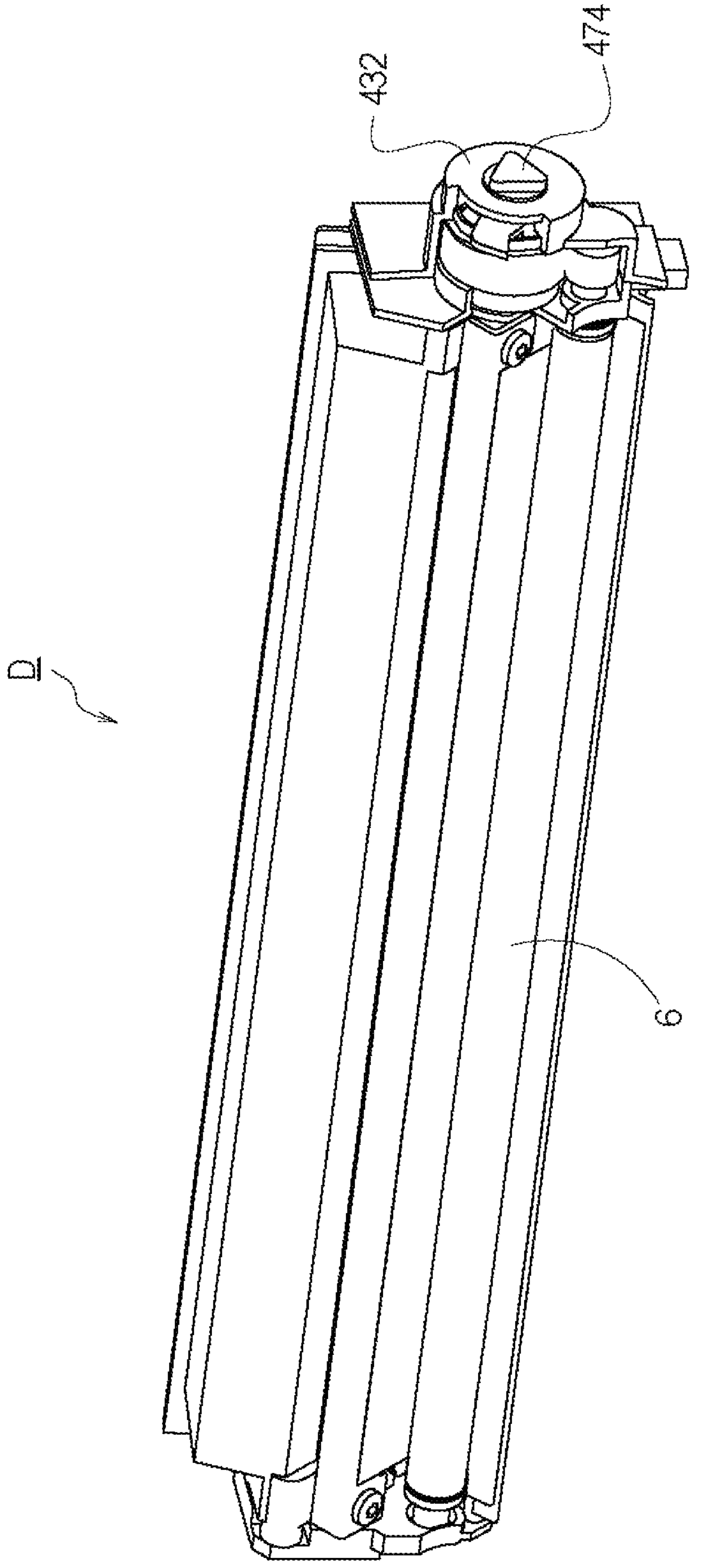
FIG. 38 illustrates a developing cartridge D according to the fourth embodiment.

Therefore, as the cartridge P is seen in the axial direction (part (b) of FIG. 37), the supporting portion 424*a* as the sliding portion of the driving side cartridge cover member 424 contacting the developing device covering member 432 it is necessary against the resultant force Q0. Therefore, the supporting portion 424*a* as the sliding portion of the driving side cartridge cover member 424 is provided with a resultant force receiving portion for receiving the resultant force Q0. The supporting portion 424*a* is not inevitable for the cylindrical portion 432*b* of the developing device covering member 432 and the other driving side cartridge cover member 424, in the other direction other than the direction of the resultant force Q0. In view of this in this embodiment, the opening 432*c* is provided in the cylindrical portion 432*b* slidable relative to the driving side cartridge cover member 424 in the direction which is not the direction of the resultant force Q0 (opposite side of the resultant force Q0 in this embodiment). The release cam 472 engaged with the engaging portion 424*d* which is the regulating portion of the driving side cartridge cover member 424 is provided in the opening 432*c*.

[Positional Relations Between Developing Roller, Cartridge Side Drive Transmission Member and Urging Force Receiving Portion]

As shown in part (b) of FIG. 37, as the cartridge 9 is seen from the driving side along the rotational axis of the developing roller, the rotational axis 6*z* of the developing roller 6 is disposed among the rotational axis 4*z* of the photosensitive member 4, the rotational axis of the cartridge side drive transmission member 474 (coaxially with the rotation axis X in this embodiment) and the contact portion 45*b* of the urging force receiving portion 45*a* for receiving the force from the main assembly side urging member 80. That is, as the cartridge P is seen from the driving side along the rotational axis of the developing roller, the rotational axis 6*z* of the developing roller 6 is disposed within a triangle constituted by three lines, namely, the lines connecting the rotational axis 4*z* of the photosensitive member 4, the rotational axis x of the cartridge side drive transmission member 74 and the contact portion 45*b* of the urging force receiving portion 45*a*.

Figure 33:
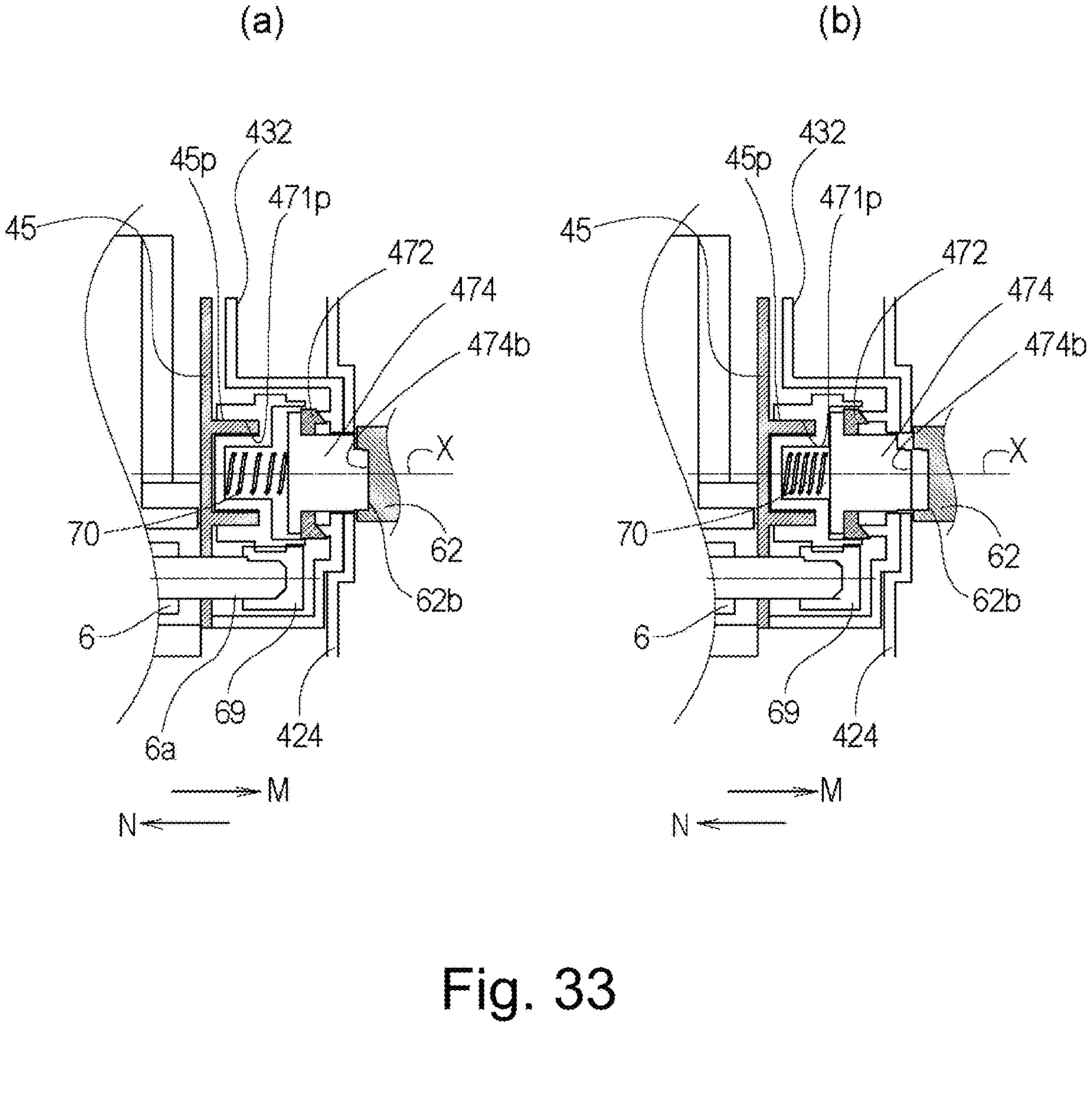
FIG. 33 is a schematic sectional view of a neighborhood of the cartridge side drive transmission member according to the fourth embodiment, in which (a) shows a drive transmission state, and (b) shows a drive disconnection state.

FIG. 33 is a schematic sectional view of the drive connecting portion.

The cylindrical portion 471*p* of the idler gear 471 (inner surface of the cylindrical portion) and the first shaft receiving portion 45*p* (outer surface of the cylindrical portion) of the bearing member 45 are engaged with each other. In addition, the cylindrical portion 471*q* (outer surface of the cylindrical portion) of the idler gear 471 and the inside circumference 432*q* of the developing device covering member 432 are engaged with each other. That is, the idler gear 471 it is rotatably supported by the bearing member 45 and the developing device covering member 432 at each of the opposite end portions.

In addition, the shaft portion 474*x* of the drive input member 474 and the opening 432*d* of the developing device covering member 432 are engaged with each other. By this, the drive input member 474 is supported slidably (rotatably) relative to the developing device covering member 432.

Furthermore, the center of the first shaft receiving portion 45*p* (outer surface of the cylindrical portion) of the bearing member 45 and the center of the opening 432*d* provided in the inside circumference 432*q* of the developing device covering member 432 are coaxial with the rotation axis X of the developing unit 9. That is, the drive input member 474 is supported rotatably about the rotation axis X of the developing unit 9.

In a sectional view of the drive connecting portion shown in part (a) of FIG. 33, the drive inputting portion 474*b* of the drive input member 474 and the developing device-drive output member 62 are engaged with each other. In a sectional view of the drive connecting portion shown in part (b) of FIG. 33, the drive inputting portion 474*b* of the drive input member 474 is spaced from the developing device-drive output member 62.

[Drive Disconnecting Operation]

Referring to FIG. 7 and FIGS. 34-36, the description will be made as to an operation of the drive connecting portion when the developing roller 6 is separating from the drum 4.

For the simplicity of the restoration, a part of the elements are shown, and a part of the structure of the release cam is illustrated schematically. In the Figures, an arrow M is along the rotation axis X and is oriented toward a outside of the cartridge, and an arrow N is along the rotation axis X and is oriented toward an inside of the cartridge.

[State 1]

As shown in part (a) of FIG. 7, between the spacing force urging member (main assembly side urging member) 80 and the urging force receiving portion (spacing force receiving portion) 45*a* of the bearing member 45, there is a gap d. Here, the drum 4 and the developing roller 6 are contacted with each other. This state is called "state 1" of the spacing force urging member (main assembly side urging member) 80. FIG. 21 shows the structures of the drive connecting portion at this time. In part (a) of FIG. 21, the pair of the drive input member 74 and the developing device-drive output member 62, and the pair of the release cam 272 with cartridge cover member 224 are schematically shown.

Figure 34:
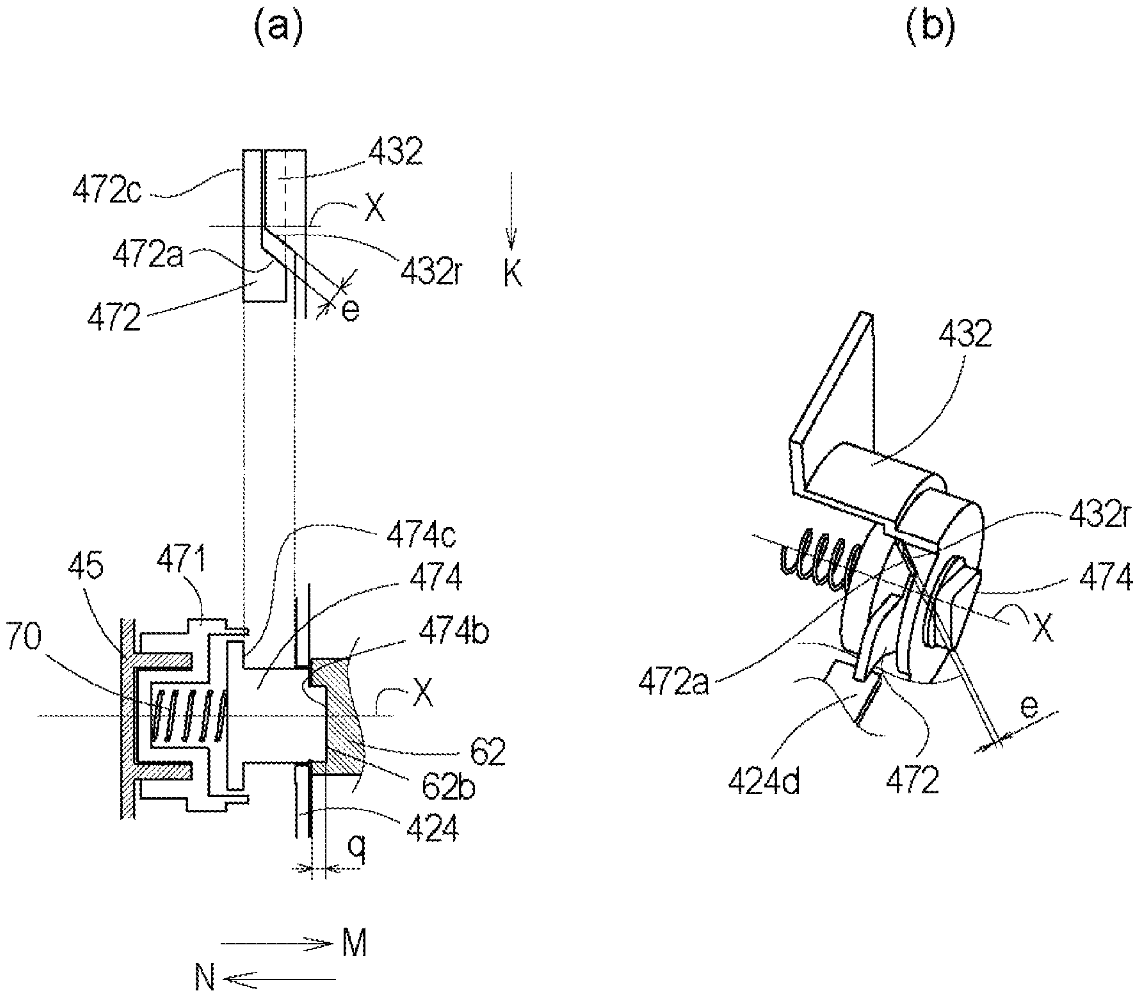
FIG. 34 is a schematic view of a neighborhood of the cartridge side drive transmission member according to the fourth embodiment in a drum-roller-spaced-and-drive-transmission state, in which (a) is a schematic sectional view of the drive connecting portion, and (b) is a perspective view of the drive connecting portion.

Part (b) of FIG. 34 is a perspective view of the drive connecting portion. In part (b) of FIG. 34, as to the developing device cover member 432, only a part including the contact portion 432*r* is shown, and as to the developing device covering member 424, only a part including the engaging portion 424*d* is shown. A gap e is provided between the contact portion 472*a* of the release cam 472 and the contact portion 432*r* of the developing device covering member 432. At this time, a drive input member 474*b* of the drive input member 474 and the developing device-drive output member 62 are engaged with each other by an engagement amount q, and the drive transmission is enabled. As described hereinbefore, the drive input member 474 is engaged with the idler gear 471 (FIG. 26). Therefore, the driving force supplied from the main assembly 2 to the drive input member 474 is transmitted through the drive input member 474 to the idler gear 471 and the developing roller gear 69 as the developing roller drive transmission member. By this, the developing roller 6 is driven. The position of various parts in the state is called a contacting position, and is also called a drum-roller-contact-and-drive-transmission state. The position of the drive input member 474 at this time is called a first position.

[State 2]

When the spacing force urging member (main assembly side urging member) 80 move in the direction of the arrow F1 in the Figure by 61 from the drum-roller-contact-and-drive-transmission state, as shown in part (b) of FIG. 7, the developing unit 9 rotates in the direction indicated by the arrow K about the rotation axis X by the angle θ1. As a result, the developing roller 6 space is from the drum 4 by a distance F1. The release cam 472 and the developing device covering member 432 in the developing unit 9 rotates in the direction indicated by the arrow K by the angle θ1 in interrelation with the rotation of the developing unit 9. On the other hand, the release cam 472 is assembled into the developing unit 9, but as shown in FIG. 31, the force receiving portion 472*b* is engaged with the engaging portion 424*d* which is the regulating portion of the driving side cartridge cover member 424. Therefore, even if the developing unit 9 is rotated, the position of the release cam 472 remains the same. That is, the release cam 472 moves relative to the developing unit 9. In the state shown in part (a) of FIG. 35 and part (b) of FIG. 35, the contact portion 472*a* of the release cam 472 and the contact portion 432*r* of the developing device covering member 432 start contacting to each other. At this time, the drive input member 474*b* of the drive input member 474 and the developing device-drive output member 62 keep in engagement with each other (part (a) of FIG. 35). Therefore, the driving force supplied to the drive input member 474 from the main assembly 2 is transmitted to the developing roller 6 through the drive input member 474, the idler gear 471 and the developing roller gear 69. This state of various parts is called a drum-roller-spaced-and-drive-transmission state. In the above-described state 1, the force receiving portion 472*b* is not always in contact with the engaging portion 424*d* of the driving side cartridge cover member 424. In other words, in the state 1, the force receiving portion 472*b* may be disposed so as to be spaced from the engaging portion 424*d* of the driving side cartridge cover member 424. In such a case, during the operation changing from the state 1 to the state 2, the gap between the force receiving portion 472*b* and the engaging portion 424*d* of the driving side cartridge cover member 424 disappears so that the force receiving portion 472*b* is brought into contact with the engaging portion 424*d* of the driving side cartridge cover member 424. The position of the drive input member 74 is in the first position.

[State 3]

Figure 36:
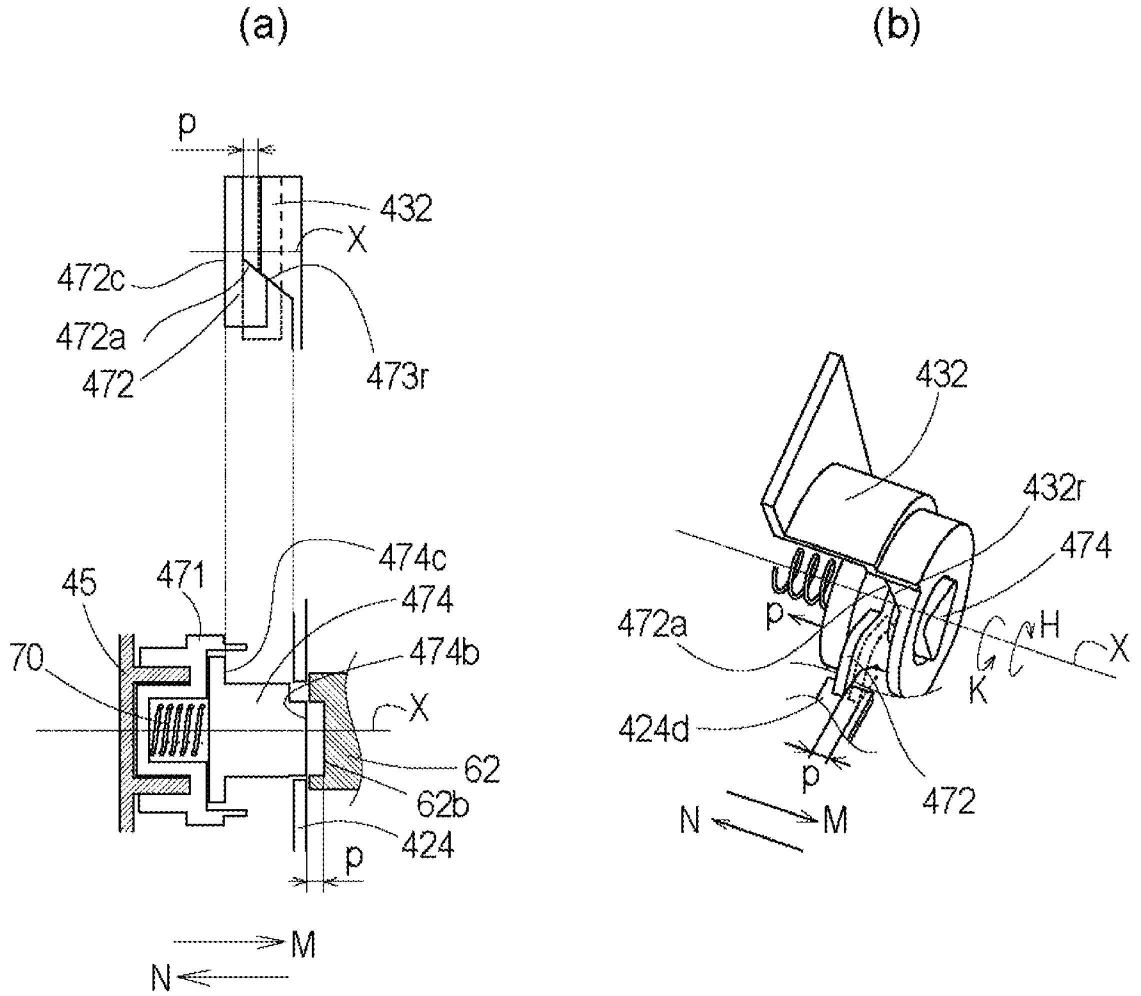
FIG. 36 is a schematic view of the neighborhood of the cartridge side drive transmission member according to the fourth embodiment in a drum-roller-spaced-and-drive-disconnection state, in which (a) is a schematic sectional view of the drive connecting portion, and (b) is a perspective view of the drive connecting portion.

Part (a) and part (b) of FIG. 36 show the structures of the drive connecting portion when the spacing force urging member (main assembly side urging member) 80 moves in the direction indicated by the arrow F1 in the Figure by the distance 62 from the drum-roller-spaced-and-drive-transmission state, as shown in part (c) of FIG. 7. In interrelation with the rotation of the developing unit 9 by the angle θ2 (>θ1), the developing device covering member 432 rotates. At this time, the contact portion 472*a* of the release cam 472 receives a reaction force from the contact portion 432*r* of the developing device covering member 432. As described hereinbefore, the movement of the release cam 472 is limited to that in the axial direction (arrows M and N) by the engagement of the force receiving portion 472*b* thereof with the engaging portion 424*d* of the driving side cartridge cover member 424. As a result, the release cam 472 slides on the direction of the arrow N through a movement distance p. In addition, in interrelation with the movement of the release cam 472 in the direction of the arrow N, the urging surface 472*c* which is an urging portion of the release cam 472 as the urging member urges the urged surface 474*c* of the drive input member 74. By this, the drive input member 474 slides by the movement distance p in the direction of the arrow N against the urging force of the spring 70 (parts (b) of FIG. 36 and FIG. 33).

At this time, the movement distance p is larger than the engagement amount q between the drive input member 474*b* of the drive input member 474 and the developing device-drive output member 62, and therefore, the drive input member 474 and the developing device-drive output member 62 are disengaged from each other. With this operation, the developing device-drive output member 62 continues to rotate, and on the other hand, the drive input member 474 stops. As a result, the rotations of the idler gear 471, the developing roller gear 69 and the developing roller 6 stop. This state of various parts is called a spacing position and is also called a drum-roller-spaced-and-drive-disconnection state. The position of the drive input member 74 at this time is called a second position.

By the drive input member 474 being urged by the urging portion 472*c* of the release cam 472 in this manner, the drive input member 474 is moved from the first position to the second position toward the inside of the cartridge. By doing so, the engagement between the drive input member 474 and the developing device-drive output member 62 are released, so that the rotational force from the developing device-drive output member 62 is no longer transmitted to the drive input member 474.

In the foregoing, the description has been made as to the drive disconnecting operation relative to the developing roller 6 in interrelation with the rotation of the developing unit 9 in the direction of the arrow K. With the foregoing structures, the developing roller 6 can be spaced from the drum 4 while rotating, and the drive can be disconnected depending on the spacing distance between the developing roller 6 and the drum 4.

[Drive Connecting Operation].

The description will be made as to the operation of the drive connecting portion at the time when the developing roller 6 and the drum 4 change from the spaced state to the contacted state. The operation is reciprocal of the above-described operation from the contact state to the spaced state.

In the spaced-developing-device state (the developing unit 9 is rotated by the angle θ2 as shown in part (c) of FIG. 7), the engagement between the drive input member 474 and the developing device-drive output member 62 is released in the drive connecting portion, as shown in FIG. 36. That is, the drive input member 74 is in the second position.

Figure 35:
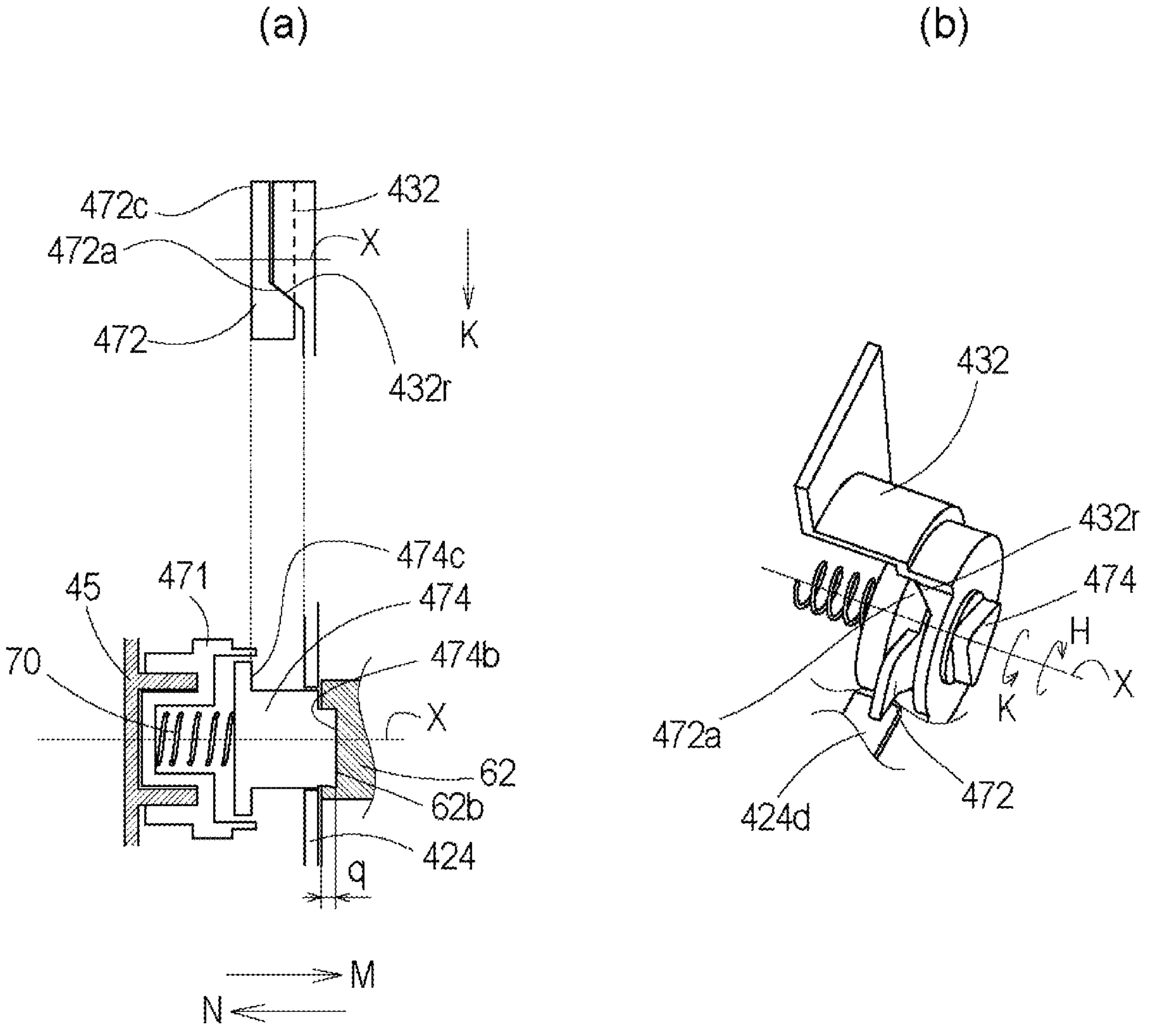
FIG. 35 is a schematic view of the neighborhood of the cartridge side drive transmission member according to the fourth embodiment in a drum-roller-spaced-and-drive-transmission state, image (a) is a schematic sectional view of the drive connecting portion, and (b) is a perspective view of the drive connecting portion.

In the state that the developing unit 9 has been gradually rotated ion the direction of the arrow H in FIG. 7 (in the direction opposite from the above-described arrow K direction) so that the developing unit 9 is rotated by the angle θ1 (part (b) of FIG. 7 and FIG. 35), the drive input member 474*b* of the drive input member 474 and the developing device-drive output member 62 are engaged with each other by the drive input member 74 moving in the direction of the arrow M by the urging force of the spring 70. By this, the driving force is transmitted from the main assembly 2 to the developing roller 6 so that the developing roller 6 is rotated. That is, the drive input member 74 is in the first position. At this time, the developing roller 6 and the drum 4 are kept separated from each other.

By further rotating the developing unit 9 gradually from this state in the direction of the arrow H (FIG. 7), the drive input member 474 moves from the second position to the first position, and the developing roller 6 and the drum 4 can be contacted to each other. In the foregoing, the drive transmission operation to the developing roller 6 in interrelation with the rotation of the developing unit 9 in the direction of the arrow H has been described. With the foregoing structures, the developing roller 6 is brought into contact to the drum 4 while rotating, and the drive can be transmitted to the developing roller 6 depending on the spacing distance between the developing roller 6 and the drum 4.

In this example, the force receiving portion 472*b* of the release cam 472 is engaged with the engaging portion 424*d* which is the regulating portion of the driving side cartridge cover member 424, but this is not inevitable, and may be engaged with a cleaner container 26.

In the case of this embodiment, the release cam 472 is provided with the contact portion 472*a*, and the developing device covering member 432 is provided with the contact portion 432*r* as an operating portion contactable to the contact portion 472*a*. In addition, the force receiving portion 472*b* engageable with the drum unit 8 is projected from the opening 432*c* provided in a part of the cylindrical portion 432*b* of the developing device covering member 432. Therefore, the latitude of arrangement of the force receiving portion 472*b* and the engaging portion 424*d* as a part of the second guide portion actable thereon is enhanced. More specifically, as shown in FIG. 11, it is unnecessary to provide the operating member 24*b* through another opening 32*j* of the developing device covering member 32.

[Modified Examples]

In the foregoing, the description has been made with respect to process cartridge detachably mountable to an image forming apparatus, but the cartridge may be a developing cartridge D detachably mountable to an image forming apparatus. Part (a) of FIG. 39 is an exploded view of various parts provided at the driving side end portion of the developing cartridge D, and In the description of this embodiment, the same reference numerals as in the foregoing embodiments are assigned to the elements having the corresponding functions in this embodiment, and the detailed description thereof is omitted for simplicity.

The release cam 72 as the coupling releasing member is provided with a force receiving portion 72*u* for receiving a force in the direction of an arrow F2 from a main assembly of the image forming apparatus. When the release cam 72 receives the force from the main assembly of the image forming apparatus in the direction of the arrow F2, it rotates in the direction of the arrow H about the rotation axis X. Similarly to the foregoing, the contact portion 72*p* as the force receiving portion provided on the release cam 72 receives a reaction force from the contact portion 32*r* (unshown) of the developing device covering member 32. By this, the release cam 72 moves in the direction of the arrow N. With the movement of the release cam 72, the drive input member 74 is urged by the release cam 72 to move along the axis X toward the inside of the cartridge. As a result, the engagement between the drive input member 74 and the developing device-drive output member 62 *a* broken so that the rotation of the developing roller 6 stops.

When the drive is to be transmitted to the developing roller 6, the release cam 72 is moved in the ejection of the arrow M to engage the drive input member 74 with the developing device-drive output member 62. At this time, the force in the ejection of the arrow F2 to the release cam 72 is removed, and therefore, the release cam 72 is moved in the direction of the arrow M by the reaction force of the spring 70. As described in the foregoing, the drive transmission to the developing roller 6 can be reached even in the state that the developing roller 6 is always in contact with the drum 4.

Figure 39:
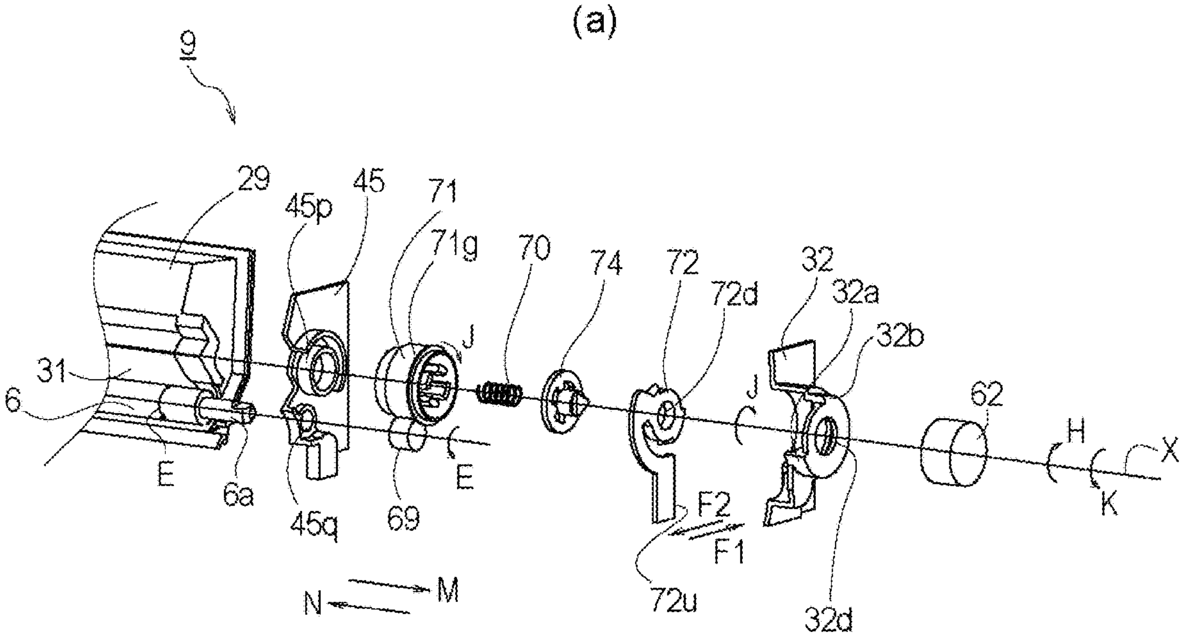
FIG. 39 illustrates a developing cartridge according to the fourth embodiment, in which (a) is an exploded perspective view of a neighborhood of a drive connecting portion, and (b) is a schematic side view as seen from a driving side along a rotation axis X direction.
Figure 39:
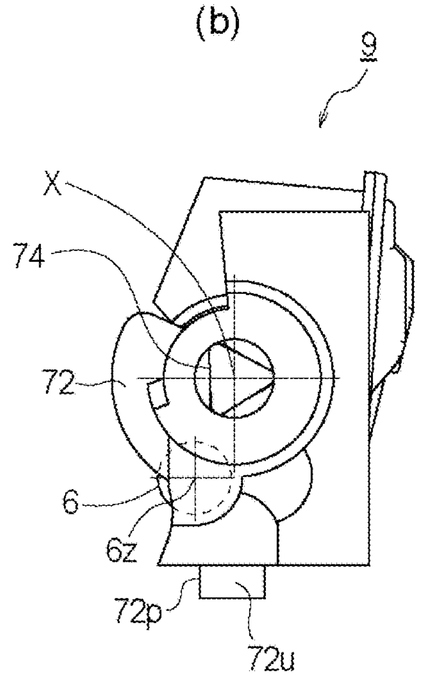

As shown in part (b) of FIG. 39, as the cartridge 9 is seen from the driving side on the rotational axis of the developing roller, the rotational axis 6*z* of the developing roller 6 is disposed between the rotational axis of the cartridge side drive transmission member 74 (co-axial wherein the rotation axis X in this embodiment) and the urging force receiving portion 72*u* which is the force receiving portion. The urging force receiving portion 72*u* and the rotational axis (X) of the cartridge side drive transmission member 74 is disposed in the same side with respect to the rotational axis 6*z* of the developing roller 6.

More particularly, a line connecting the contact portion 72*b* at which the urging force receiving portion 72*u* contacts to the main assembly side urging member 80 and the rotational axis 6*z* of the cartridge side drive transmission member 74 and a line connecting the rotational axis 6*z* of the cartridge side drive transmission member 74 and the rotational axis of the cartridge side drive transmission member 74, cross with each other. As the cartridge 9 is seen along the rotational axis of the developing roller, a line connecting the contact portion 72*p* and the rotational axis of the cartridge side drive transmission member 74 passes through the developing roller 6.

In the above-described structure, the developing cartridge D is taken, but the cartridge is not limited to such a cartridge, and the cartridge may be process cartridge P including a drum. The structures of this embodiment is applicable to the structure in which the drive transmission to the developing roller is switched in the state that the developing roller 6 is in contact with the drum 4 in the process cartridge P.

In the foregoing description, when the electrostatic latent image on the drum 4 is developed, the developing roller 6 is in contact with the drum 4 (contact-type developing system), but the developing system is not limited to these examples. The present invention is applicable to a non-contact type developing system in which the electrostatic latent image on the drum 4 is developed with a space kept between the drum 4 and the developing roller 6. As described in the foregoing, the cartridge detachably mountable to the image forming apparatus may be a process cartridge P including the drum, or may be a developing cartridge D.

Embodiment 5

A cartridge according to a fifth embodiment of the present invention will be described. In the description of this embodiment, the same reference numerals as in the foregoing Embodiments are assigned to the elements having the corresponding functions in this embodiment, and the detailed description thereof is omitted for simplicity. In this embodiment, the structure of the covering member is different from that of the foregoing embodiments.

[Structure of Developing Unit]

As shown in FIG. 40-43, the developing unit 9 comprises the developing roller 6, the developing blade 31, the developing device frame 29 and the bearing member 45.

Figure 40:
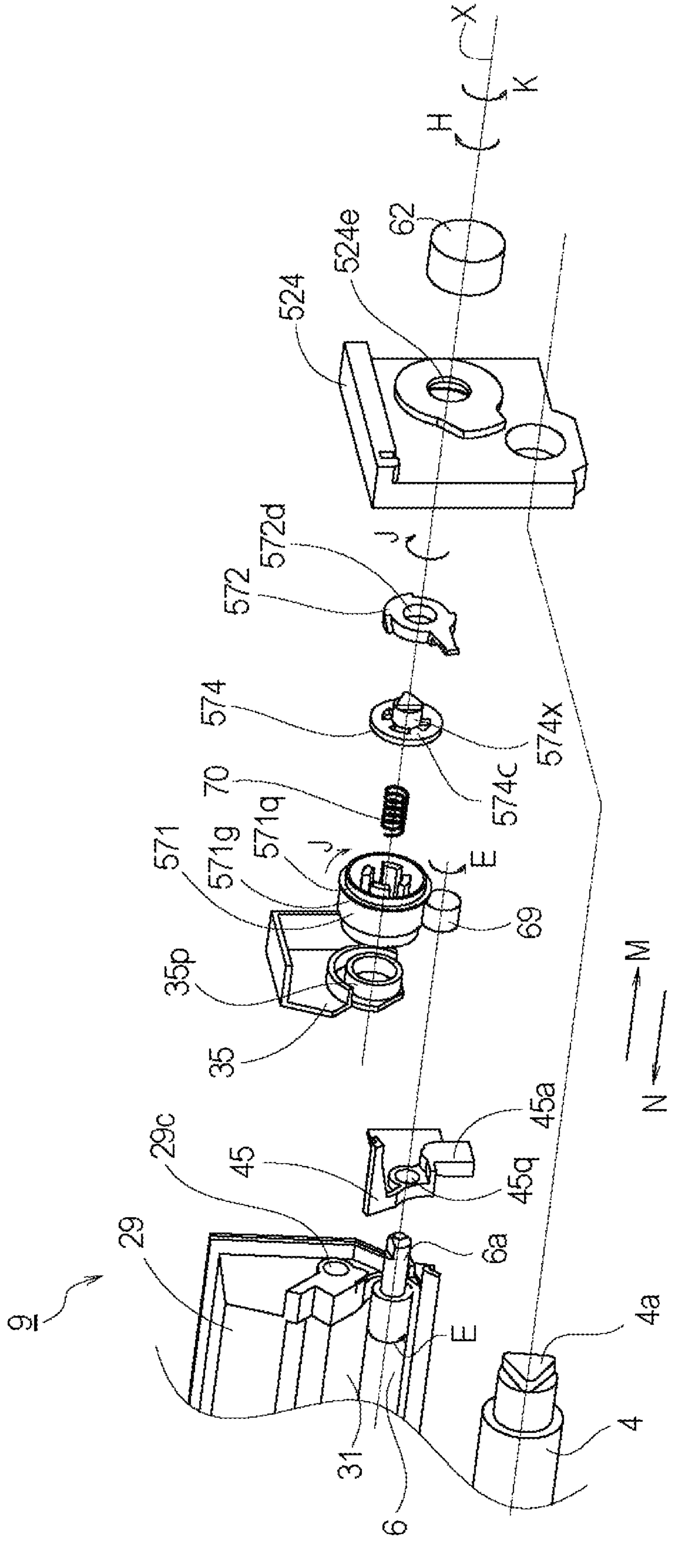
FIG. 40 is an exploded perspective view of a neighborhood of a drive connecting portion of a process cartridge according to a fifth embodiment.

As shown in FIG. 40, the bearing member 45 is fixed to one longitudinal end portion of the developing device frame 29. The bearing member 45 rotatably supports the developing roller 6. The developing roller 6 is provided with a developing roller gear 69 as a developing roller drive transmission member at the longitudinal end portion.

Figure 43:
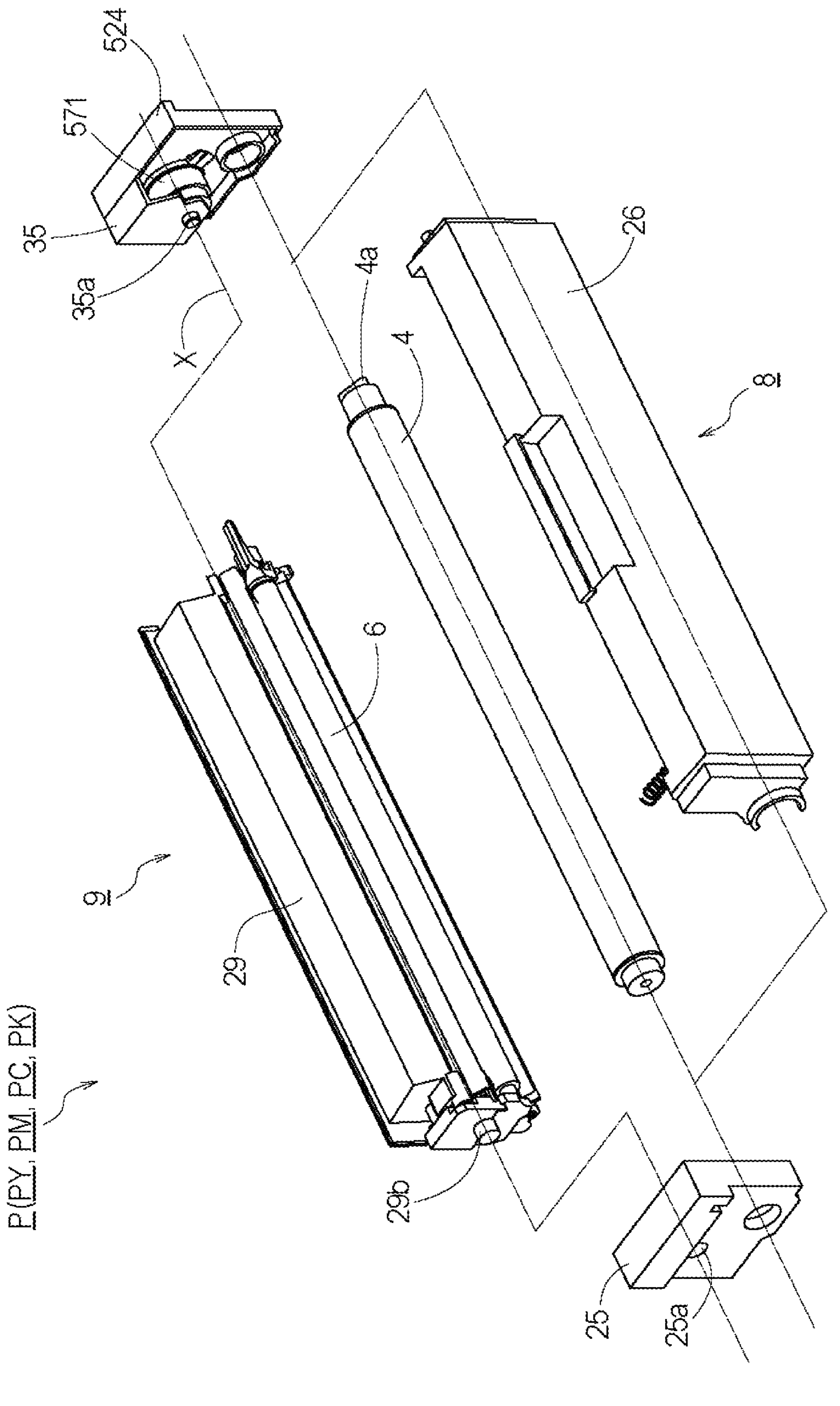
FIG. 43 is an exploded perspective view of the process cartridge according to the fifth embodiment as seen from a non-driving side.

To a driving side cartridge cover member 524, another bearing member 35 is fixed (FIG. 43). Between the bearing member 35 and the driving side cartridge cover member 524, there are provided an idler gear 571, an idler gear 571 as a drive connecting portion, for transmitting the driving force to the developing roller gear 69.

Figure 42:
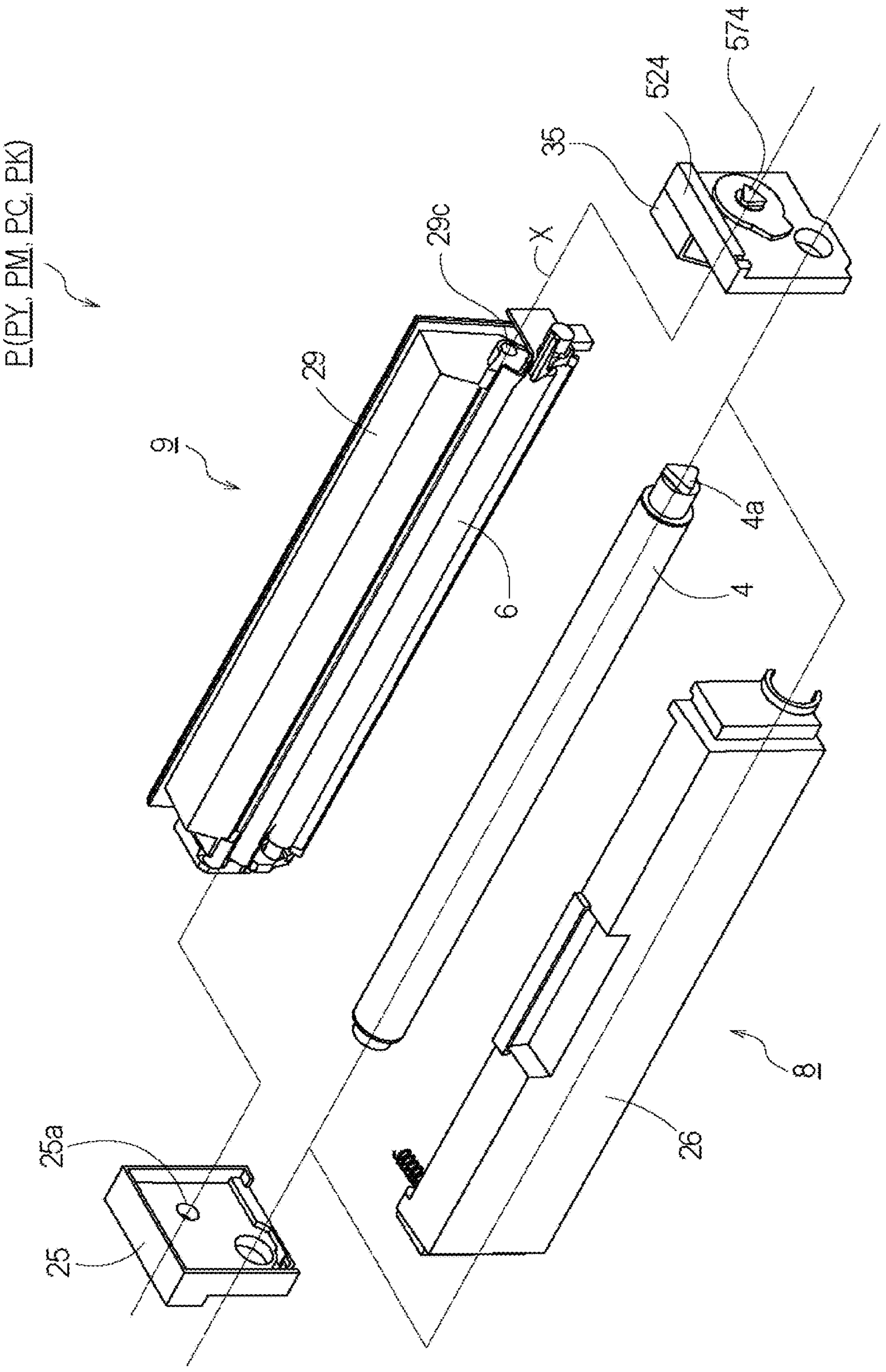
FIG. 42 is an exploded perspective view of the process cartridge according to the fifth embodiment as seen from a driving side.

The bearing member 35 rotatably supports the idler gear 571 for transmitting the driving force to the developing roller gear 69. An opening 524*e* is provided in the driving side cartridge cover member 524. Through the opening 524*e*, a drive inputting portion 574*b* of the drive input member 574 is exposed and projected to the outside of the cartridge. When the cartridge P is mounted to the main assembly 2, the drive inputting portion 574*b* is engaged with a developing device-drive output member 62 (62Y, 62M, 62C, 62K) shown in part (b) of FIG. 3 so that a driving force is transmitted from the driving motor (unshown). That is, the drive input member 574 functions as an input coupling for the development. The driving force supplied from the main assembly 2 to the drive input member 574 is transmitted through the idler gear 571 to the developing roller gear 69 and the developing roller 6. FIG. 42 and FIG. 43 are perspective views illustrating the developing unit 9, a drum unit 8 and the driving side cartridge cover member 524 to which the bearing member 35 is fixed. As shown in FIG. 43, the bearing member 35 is fixed to the driving side cartridge cover member 524. The bearing member 35 is provided with a supporting portion 35*a*. On the other hand, the developing device frame 29 is provided with a rotation hole 29*c* (FIG. 42). When the developing unit 9 and the drum unit 8 are assembled with each other, the rotation hole 29*c* of the developing device frame 29 is engaged with the supporting portion 35*a* of the bearing member 35 at one longitudinal end portion side of the developing unit 9. In the other longitudinal end portion side of the cartridge P, a projection 29*b* projected from the developing device frame 29 is engaged with a supporting hole portion 25*a* of the non-driving side cartridge cover member. By this, the developing unit 9 is rotatably supported by the drum unit 8. In this case, the rotation axis X which is a rotational center of the rotation of the developing unit 9 relative to the drum unit 8 is a line connecting the center of the supporting portion 35*a* of the bearing member 35 and the center of the supporting hole portion 25*a* of the non-driving side cartridge cover member 25.

[Structure of Drive Connecting Portion]

In this embodiment, the engaging relation between the drive input member 574 and the developing device-drive output member 62 of the main assembly is equivalent to the engaging relation between the drive inputting portion 74*b* of the drive input member 74 and the developing device-drive output member 62 of the main assembly in Embodiment 1. In addition, the drive inputting portion 4*a* for the photosensitive member (photosensitive member drive transmitting portion) is similar to that in Embodiment 1. The configurations of the drive input member 374 and the idler gear 471 in this embodiment are similar to those of Embodiment 3.

Figure 41:
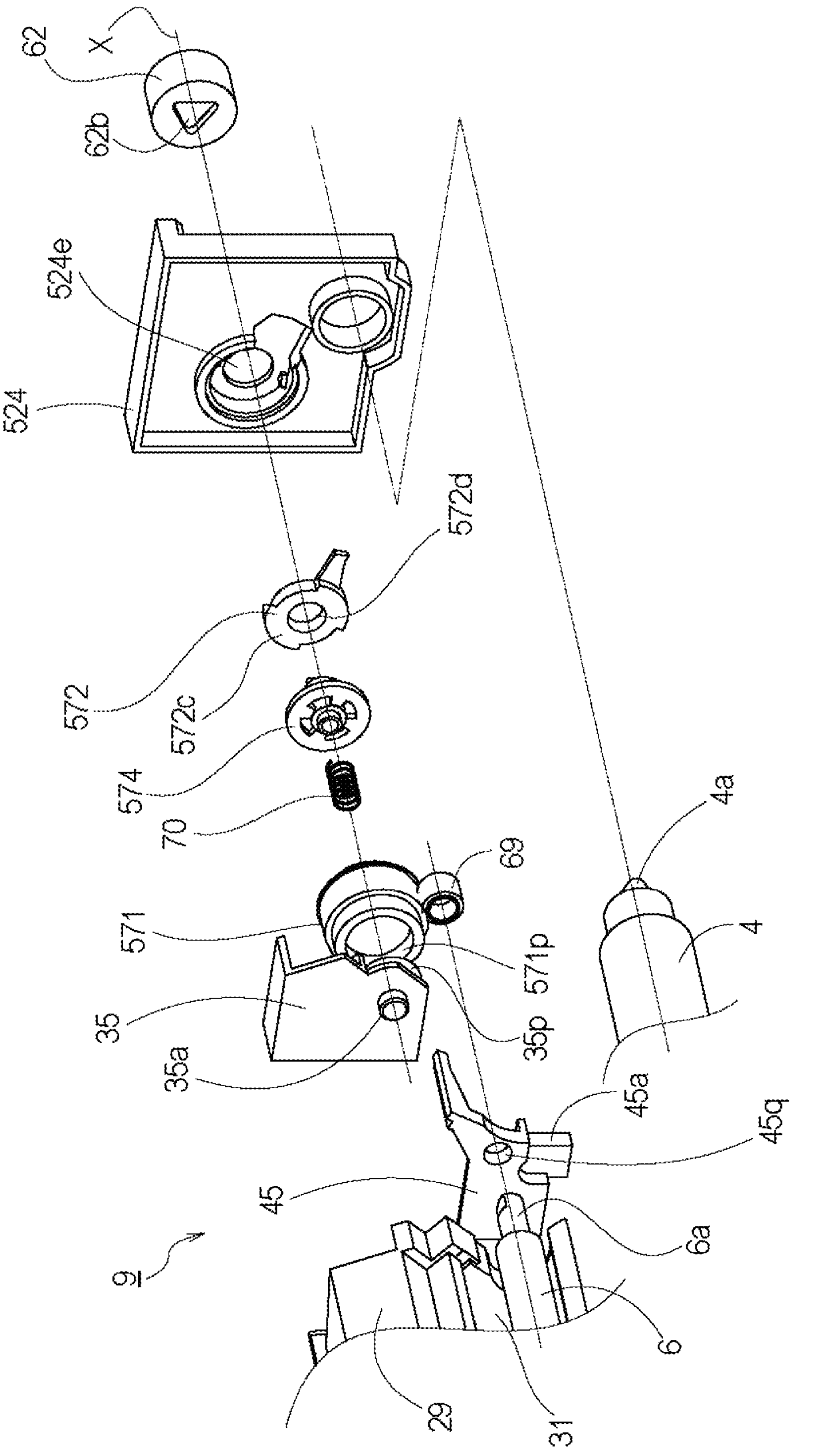
FIG. 41 is an exploded perspective view of a neighborhood of a drive connecting portion of a process cartridge according to a fifth embodiment.

Referring to FIGS. 40 and 41, the structure of the drive connecting portion will be described in detail. The drive connecting portion of this embodiment comprises the bearing member 45 fixed to one longitudinal end portion of the developing device frame 29, the idler gear 571 which is another cartridge side drive transmission member, a spring 70, the drive input member 574, a release cam 572 as a releasing member which is a part of a releasing mechanism, and the driving side cartridge cover member 524. Between the bearing member 35 and the driving side cartridge cover member 524, the elements of the drive connecting portion are coaxially provided in the order named from the bearing member 35 to the driving side cartridge cover member 524. The idler gear 371 and the cartridge side drive transmission member 374 are engaged directly and coaxially with each other.

The bearing member 35 rotatably supports the idler gear 571. More particularly, the first shaft receiving portion 35*p* of the bearing member 35 (outer surface of the cylindrical portion) rotatably supports the supported portion 571*p* of the idler gear 571 (inner surface of the cylindrical portion).

The cartridge side drive transmission member 574 is provided with a shaft portion 574*x* and has an end portion provided with the drive inputting portion 574*b* as a rotational force receiving portion. The shaft portion 574*x* penetrates an opening 572*d* of a release cam, the opening 524*e* of the driving side cartridge cover member 524, and the drive inputting portion 574*b* at the free end is exposed toward the outside of the cartridge. By portion-to-be-urged 574*c* provided at the base portion of the shaft portion 574*x* of the cartridge side drive transmission member 574 being urged by the urging portion 572*c* of the release cam 572, the drive input member 574 retracts toward the inside of the cartridge.

(Releasing Mechanism)

Figure 44:
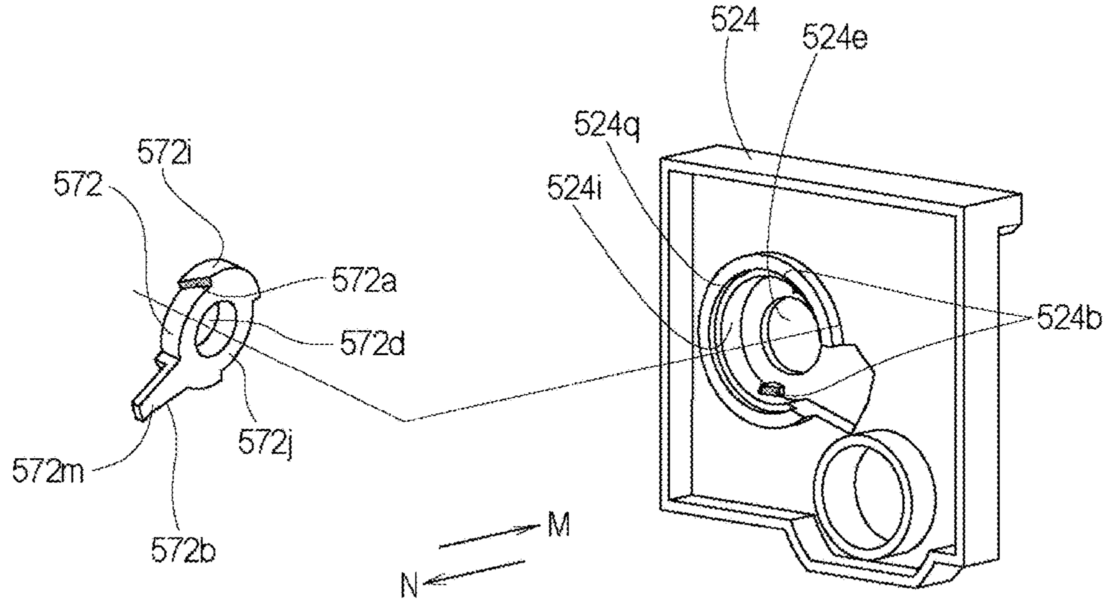
FIG. 44 is a perspective view of a release cam and a driving side cartridge cover member according to the fifth embodiment.

FIG. 44 shows a relationship between the release cam 572 as a coupling releasing member in the driving side cartridge cover member 524. The release cam 572 has a ring portion 572*j* which is substantially in the form of a ring. The ring portion 572*j* has an outer peripheral surface which functions as a second portion-to-be-guided. The outer periphery portion is provided with a projected portion 572*i* projecting from the ring portion. In this embodiment, the projected portion 572*i* projects radially outwardly of the ring portion. The driving side cartridge cover member 524 has an inner surface 524*i* as a part of a second guide portion. The inner surface 532*i* is engageable with the outer peripheral surface of the release cam 572.

The center of the outer peripheral surface of the release cam 572 and the center of the inner surface 524*i* of the driving side cartridge cover member 524 are coaxial with the rotation axis X. Thus, the release cam 572 it supported so as to be slidable along the axial direction relative to the driving side cartridge cover member 524 and the developing unit 9 and to be rotatable in the rotational moving direction about the rotation axis X.

An inner surface of the release cam 572 (the surface remote from the driving side cartridge cover member) is provided with an urging surface 572*c* as an urging portion. By the urging surface urging the urged surface 574*c* of the drive input member 574, the drive input member 574 is moved toward the inside of the cartridge.

In addition, the release cam 572 as the coupling releasing member is provided with a contact portion 572*a* having a slanted surface, as a force receiving portion. The driving side cartridge cover member 524 is provided with a contact portion 524*b* having a slanted surface contactable to the contact portion 572*a* of the release cam. The release cam 572 is provided with a lever portion 572*m* as a projected portion projecting in the direction substantially perpendicular to the rotational axis of the developing roller, that is, radially outwardly of the ring portion.

Figure 45:
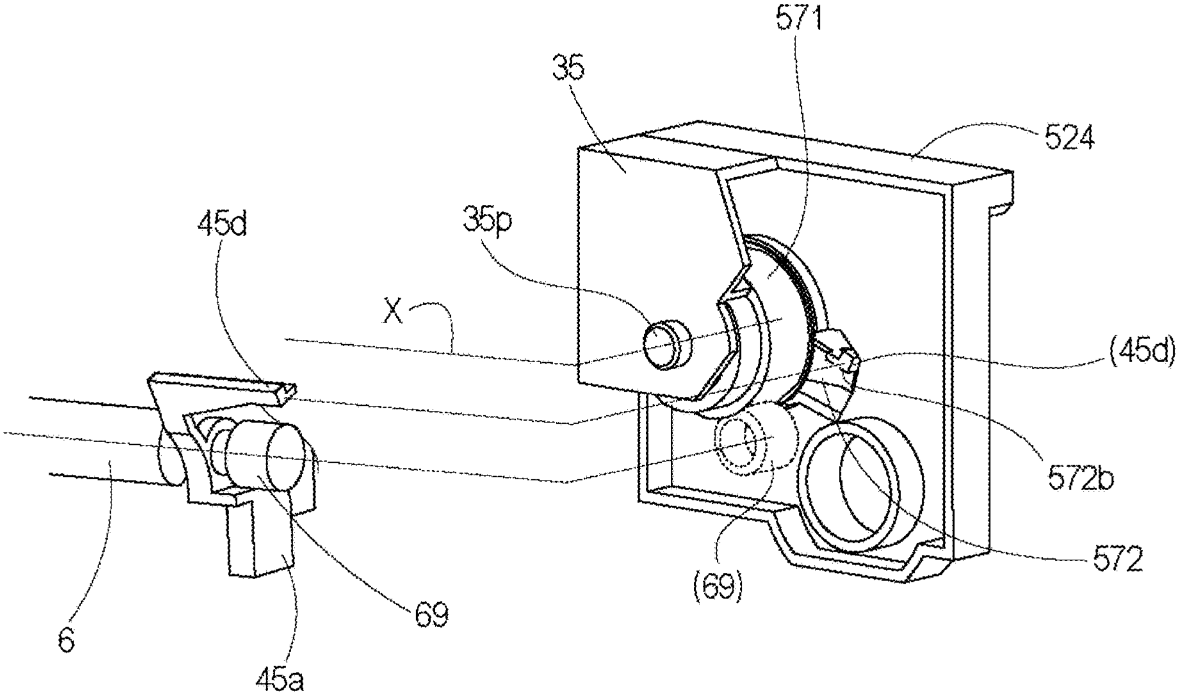
FIG. 45 is a schematic view of a drive connecting portion, a driving side cartridge cover member and a bearing member.

FIG. 45 illustrates the drive connecting portion, the driving side cartridge cover member 524 and the bearing member 45. Bearing member 45 is provided with an engaging portion 45*d* which is a regulating portion as a part of the second guide portion. The engaging portion 45*d* is engaged with a force receiving portion 572*b* as the second portion-to-be-guided of the release cam 572, the force receiving portion 572*b* is retained between the driving side cartridge cover member 524 and the bearing member 35. By the engagement between the engaging portion 45*d* and the force receiving portion 572*b*, the release cam 572 is in capable of moving about the rotation axis X relative to the bearing member 45 and the developing unit 9.

Figure 46:
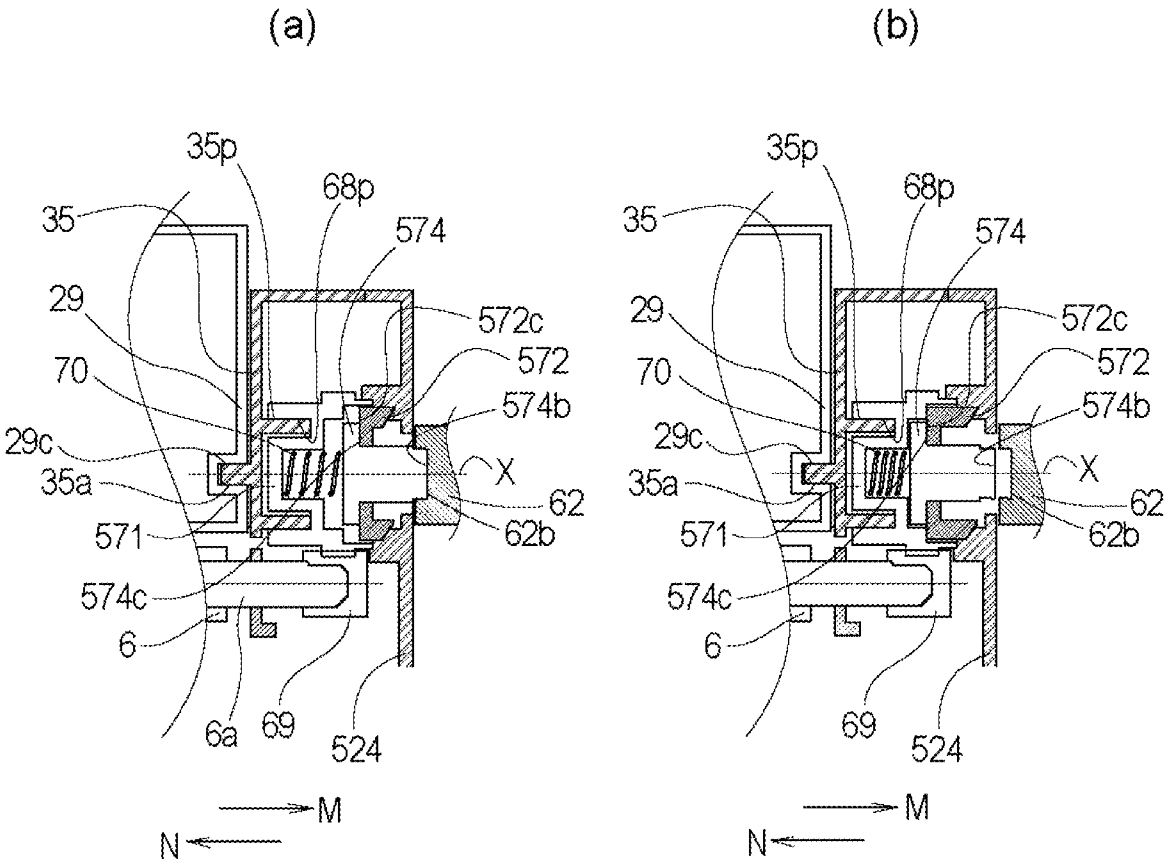
FIG. 46 is a schematic sectional view of a neighborhood of a cartridge side drive transmission member according to the fifth embodiment, in which (a) shows a drive transmission state, and (b) shows a drive disconnection state.

FIG. 46 is a sectional view of the drive connecting portion.

A cylindrical portion 571*p* of the idler gear 571 and the first shaft receiving portion 35*p* (outer surface of the cylindrical) of the bearing member 35 are engaged with each other. In addition, a cylindrical portion 571*q* of the idler gear 571 and an inside circumference 524*q* of the driving side cartridge cover member 524 are engaged with each other. Thus, the idler gear 571 is rotatably supported by the bearing member 35 and in the driving side cartridge cover member 524 at the opposite end portions thereof.

In addition, by the engagement between the shaft portion 574*x* of the drive input member 574 and the opening 524*e* of the driving side cartridge cover member 524, the drive input member 574 is supported so as to be rotatable relative to the driving side cartridge cover member 524.

Father more, the first shaft receiving portion 35*p* (outer surface of the cylindrical portion) of the bearing member 35, the center of the inside circumference 524*q* of the driving side cartridge cover member 524 and the center of the opening 524*e* are coaxial with the rotation axis X of the developing unit 9. That is, the drive input member 574 is supported rotatably about the rotation axis X of the developing unit 9.

In a sectional view of the drive connecting portion shown in part (a) of FIG. 46, the drive inputting portion 574*b* of the drive input member 574 and the developing device-drive output member 62 are engaged with each other. That is, the drive input member 574 is in a first position.

In a sectional view of the drive connecting portion shown in part (b) of FIG. 46, the drive inputting portion 574*b* of the drive input member 574 is spaced from the developing device-drive output member 62. That is, the drive input member 574 is in a second position.

[Drive Disconnecting Operation]

Referring to FIG. 7 and FIGS. 47-49, the description will be made as to an operation of the drive connecting portion when the developing roller 6 is separating from the drum 4.

For the simplicity of the restoration, a part of the elements are shown, and a part of the structure of the release cam is illustrated schematically. In the Figures, an arrow M is along the rotation axis X and is oriented toward a outside of the cartridge, and an arrow N is along the rotation axis X and is oriented toward an inside of the cartridge.

[State 1]

Figure 47:
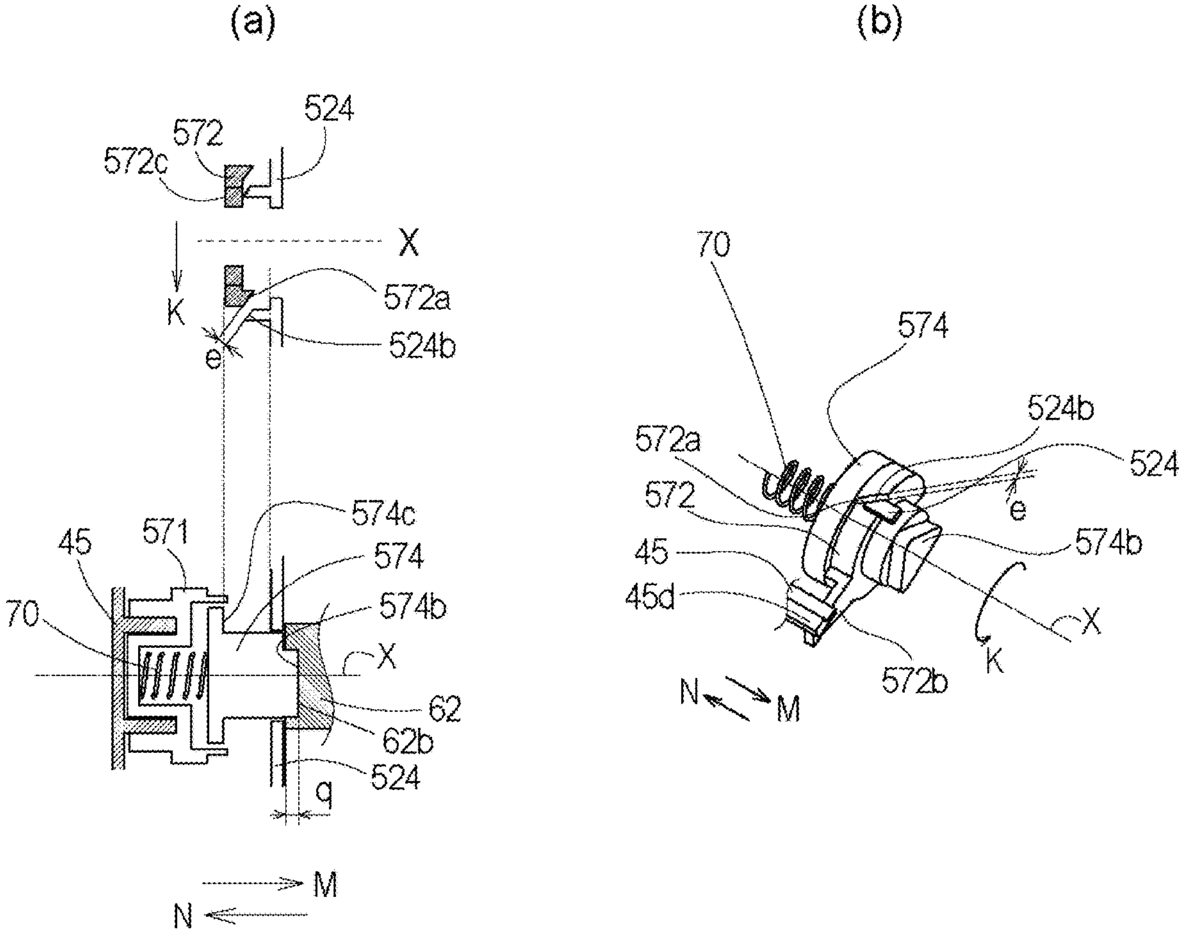
FIG. 47 is a schematic view of a neighborhood of the cartridge side drive transmission member according to the fifth embodiment in a drum-roller-contact-and-drive-transmission state, in which (a) is a schematic sectional view of the drive connecting portion, and (b) is a perspective view of the drive connecting portion.

As shown in part (a) of FIG. 7, between the spacing force urging member (main assembly side urging member) 80 and the urging force receiving portion (spacing force receiving portion) 45*a* of the bearing member 45, there is a gap d. Here, the drum 4 and the developing roller 6 are contacted with each other. This state is called "state 1" of the spacing force urging member (main assembly side urging member) 80. FIG. 47 shows the structures of the drive connecting portion at this time. In part (a) of FIG. 47, the pair of the drive input member 574 and the developing device-drive output member 62, and the pair of the release cam 572 with driving side cartridge cover member 524 are separately and schematically shown.

Part (b) of FIG. 47 is the perspective view of the drive connecting portion. In part (b) of FIG. 47, only a part of the driving side cartridge cover member 524 including the contact portion 524*b* is shown, and only a part of the bearing member 45 including the engaging portion 45*d* as the regulating portion. A gap e is provided between the contact portion 572*a* of the release cam 572 and the contact portion 524*b* of the driving side cartridge cover member 524. At this time, the drive inputting portion 574*b* of the drive input member 574 and the developing device-drive output member 62 are engaged with each other by an engagement amount q so that the drive transmission is enabled. As described hereinbefore, the drive input member 574 is engaged with the idler gear 571 (FIG. 26). The driving force supplied from the main assembly 2 to the drive input member 574 is transmitted to the developing roller gear 69 through the idler gear 571. By this, the developing roller 6 is driven. The position of various parts in the state is called a contacting position, and is also called a development contact drive transmission state. The position of the drive input member 574 at this time is called a first position.

[State 2]

Figure 48:
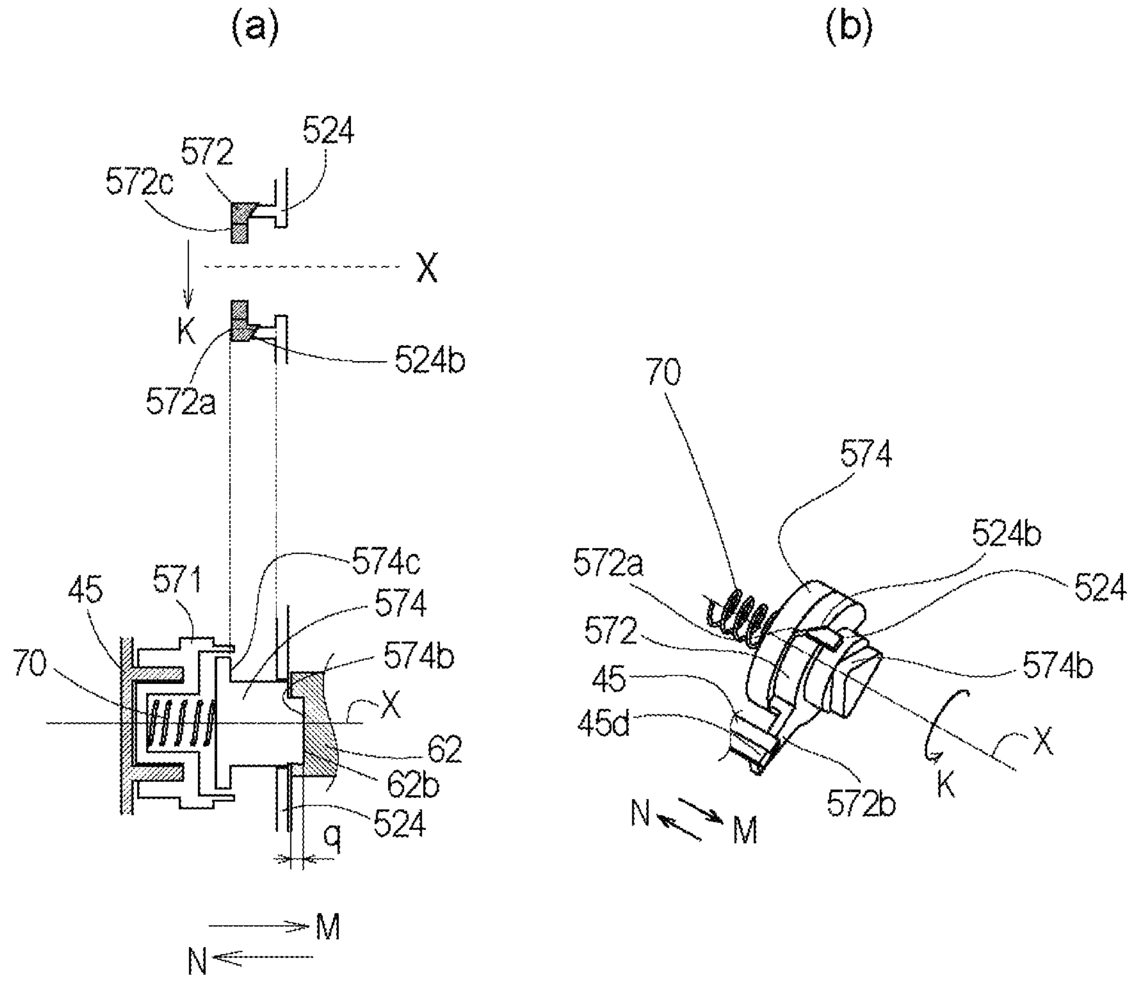
FIG. 48 is a schematic view of the neighborhood of the cartridge side drive transmission member according to the fifth embodiment in a drum-roller-spaced-and-drive-transmission state, image (a) is a schematic sectional view of the drive connecting portion, and (b) is a perspective view of the drive connecting portion.

When the spacing force urging member (main assembly side urging member) 80 move in the direction of the arrow F1 in the Figure by 61 from the drum-roller-contact-and-drive-transmission state, as shown in part (b) of FIG. 7, the developing unit 9 rotates in the direction indicated by the arrow K about the rotation axis X by the angle θ1. As a result, the developing roller 6 space is from the drum 4 by a distance F1. The bearing member 45 in the developing unit 9 rotates in the direction of the arrow K by the angle θ1 in interrelation with the rotation of the developing unit 9. On the other hand, the release cam 572 is provided in the drum unit 8, but the force receiving portion 572*b* is engaged with the engaging portion 45*d* of the bearing member 45, as shown in FIG. 45. Therefore, the release cam 572 rotates in the direction of the arrow K in the drum unit 8 in interrelation with the rotation of the developing unit 9. Part (a) and part (b) of FIG. 48 shows a state in which the contact portion 572*a* of the release cam 572 and the contact portion 524*b* of the driving side cartridge cover member 524 start to contact with each other. At this time, the drive inputting portion 574*b* of the drive input member 574 and the developing device-drive output member 62 keep engagement therebetween. Therefore, the driving force supplied to the drive input member 574 from the main assembly 2 is transmitted to the developing roller 6 through the drive input member 574, the idler gear 571 and the developing roller gear 69. This state of various parts is called a drum-roller-spaced-and-drive-transmission state. The position of the drive input member 574 is in the first position.

[State 3]

Figure 49:
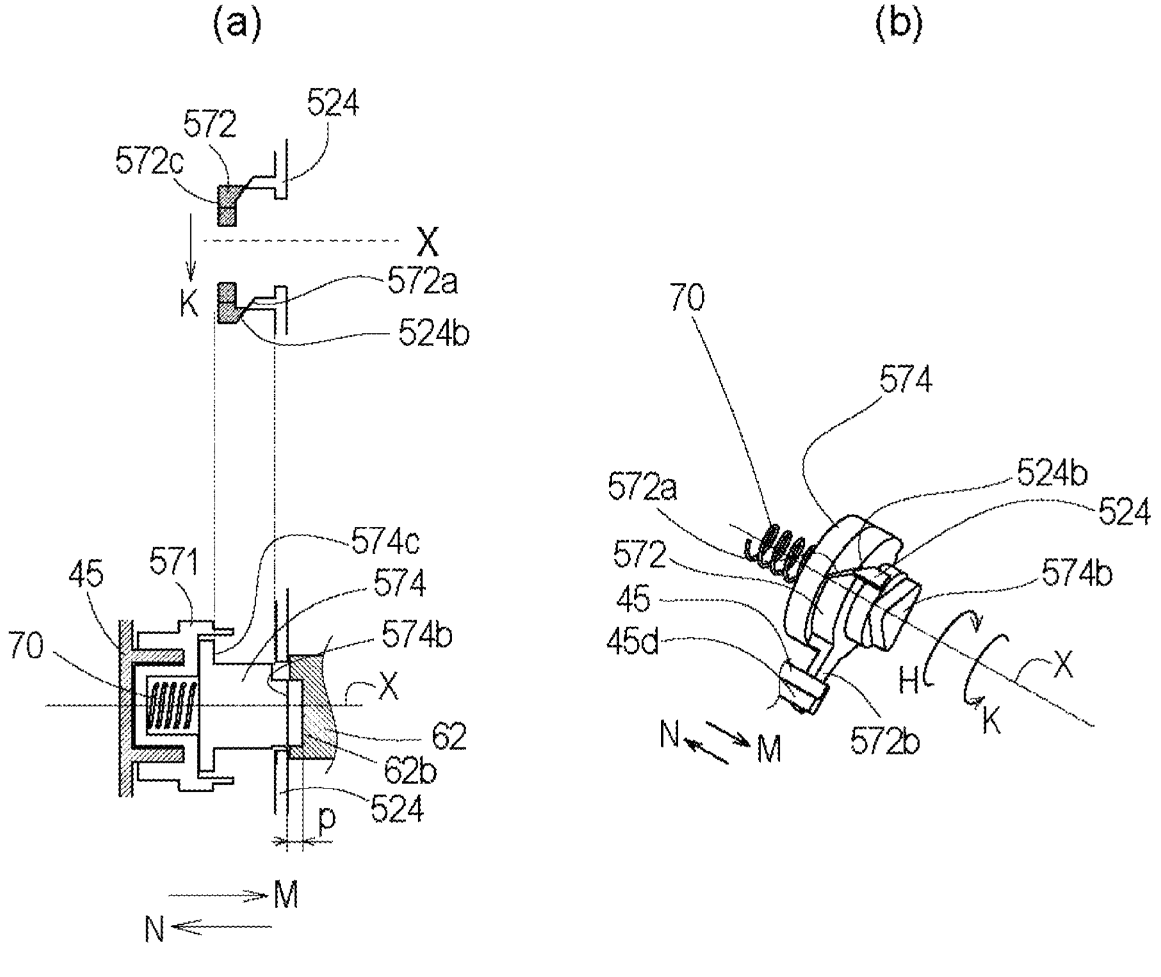
FIG. 49 is a schematic view of the neighborhood of the cartridge side drive transmission member according to the fifth embodiment in a drum-roller-spaced-and-drive-disconnection state, in which (a) is a schematic sectional view of the drive connecting portion, and (b) is a perspective view of the drive connecting portion.

Part (a) and part (b) of FIG. 49 show the structures of the drive connecting portion when the spacing force urging member (main assembly side urging member) 80 moves in the direction indicated by the arrow F1 in the Figure by the distance 62 from the drum-roller-spaced-and-drive-transmission state, as shown in part (c) of FIG. 7. The bearing member 45 rotates in interrelation with the rotation of the developing unit 9 by the angle θ2. At this time, the contact portion 572*a* of the release cam 572 receives a reaction force from the contact portion 524*b* of the driving side cartridge cover member 524. As described hereinbefore, the force receiving portion 572*b* of the release cam 572 is engaged with the engaging portion 45*d* of the bearing member 45 so that it is movable only in the axial direction (arrows M and N) relative to the developing unit 9 (FIG. 45). As a result, the release cam 572 slides on the direction of the arrow N through a movement distance p. In addition, in interrelation with the movement of the release cam 572 in the direction of the arrow N, the urging surface 572*c* which is an urging portion of the release cam 572 as the urging member urges the urged surface 574*c* of the drive input member 574. By this, the drive input member 574 slides in the direction of the arrow N against the urging force of the spring 70 by the movement distance p.

At this time, the movement distance p is larger than the engagement amount q between the drive inputting portion 574*b* of the drive input member 574 and the developing device-drive output member 62, and therefore, the engagement between the drive input member 574 and the developing device-drive output member 62 is released. With this operation, the developing device-drive output member 62 continues to rotate, and on the other hand, the drive input member 574 stops. As a result, the rotations of the idler gear 571, the developing roller gear 69 and the developing roller 6 stop. This state of various parts is called a spacing position and is also called a drum-roller-spaced-and-drive-disconnection state.

In the foregoing, the description has been made as to the drive disconnecting operation relative to the developing roller 6 in interrelation with the rotation of the developing unit 9 in the direction of the arrow K. With the foregoing structures, the developing roller 6 can be spaced from the drum 4 while rotating, and the drive can be disconnected depending on the spacing distance between the developing roller 6 and the drum 4. The position of the drive input member 574 at this time is called a second position. In this manner, by the drive input member 574 is urged by the urging portion 572*c* of the release cam 572, the drive input member 574 moves from the first position to the second position along the rotation axis X toward the inside of the cartridge. By doing so, the engagement between the drive input member 574 and the developing device-drive output member 62 are released, so that the rotational force from the developing device-drive output member 62 is no longer transmitted to the drive input member 74.

[Drive Connecting Operation]

The description will be made as to the operation of the drive connecting portion at the time when the developing roller 6 and the drum 4 change from the spaced state to the contacted state. The operation is reciprocal of the above-described operation from the contact state to the spaced state.

In the spaced-developing-device state (the developing unit 9 has rotated by the angle 62 as shown in part (c) of FIG. 7), the drive connecting portion it such that the engagement between the drive inputting portion 574*b* of the drive input member 574 and the developing device-drive output member 62 is released as shown in FIG. 49. That is, the drive input member 74 is in the second position.

In the state in which the developing unit 9 has been gradually rotated from the above state in the direction of the arrow H (opposite the direction of the arrow K) shown in FIG. 7 by the angle 61 (shown in part (b) of FIG. 7 and FIG. 48), drive inputting portion 574*b* of the drive input member 574 and the developing device-drive output member 62 are engaged with each other by the movement of the drive input member 574 in the direction of the arrow M by the urging force of the spring 70. By this, the driving force is transmitted from the main assembly 2 to the developing roller 6 so that the developing roller 6 is rotated. That is, the drive input member 74 is in the first position. At this time, the developing roller 6 and the drum 4 are kept separated from each other.

By further rotating the developing unit 9 gradually from this state in the direction of the arrow H (FIG. 7), the developing roller 6 and the drum 4 can be contacted to each other. Also in this state, the drive input member 574 is in the first position.

In the foregoing, the drive transmission operation to the developing roller 6 in interrelation with the rotation of the developing unit 9 in the direction of the arrow H has been described. With the foregoing structures, the developing roller 6 is brought into contact to the drum 4 while rotating, and the drive can be transmitted to the developing roller 6 depending on the spacing distance between the developing roller 6 and the drum 4.

In the foregoing, the force receiving portion 572*b* of the release cam 572 is engaged with the engaging portion 45*d* which is the regulating portion of the bearing member 45, but this is not inevitable, and it may be engaged with the developing device frame 29, for example. The drive input member 574 may be provided in the drum unit 8 as in this embodiment.

Embodiment 6

A cartridge according to a sixth embodiment of the present invention will be described. In the description of this embodiment, the same reference numerals as in the foregoing Embodiments are assigned to the elements having the corresponding functions in this embodiment, and the detailed description thereof is omitted for simplicity. In this embodiment, a release cam 672 and a release lever 73 are used in combination.

[Structure of Developing Unit]

Figure 50:
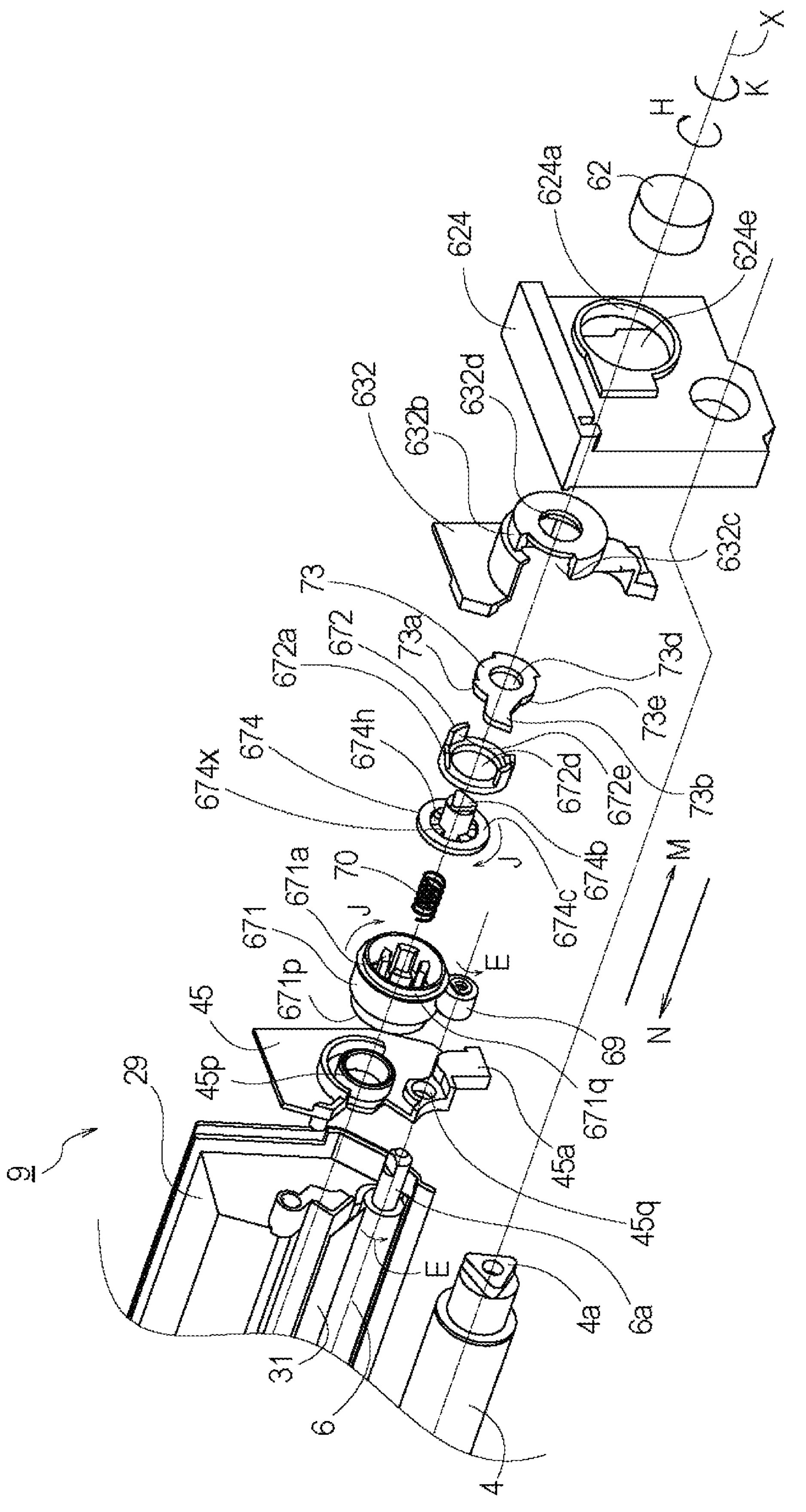
FIG. 50 is an exploded perspective view of a drive connecting portion of a process cartridge according to a sixth embodiment, as seen from a driving side.
Figure 51:
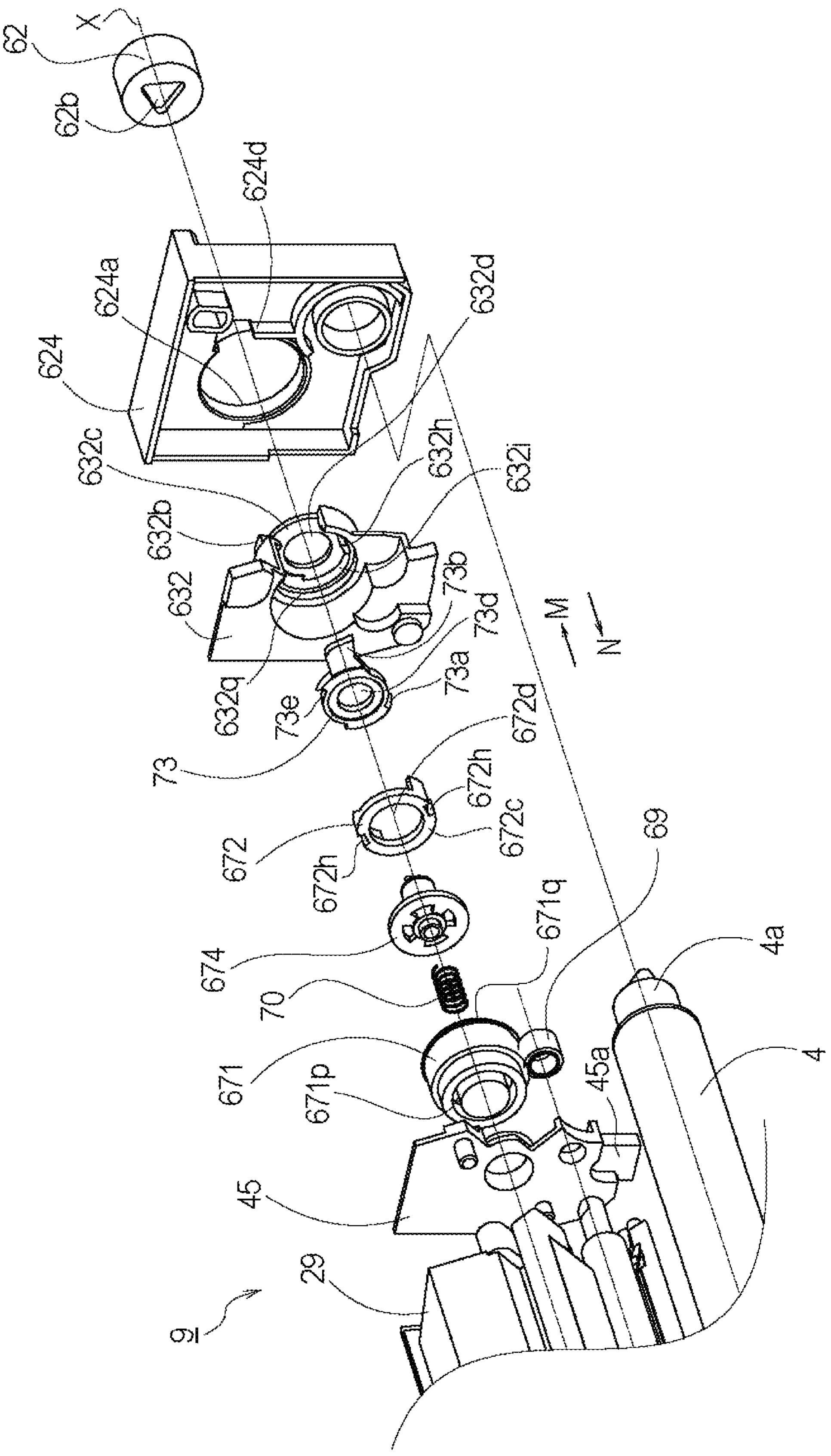
FIG. 51 is an exploded perspective view of a drive connecting portion of a process cartridge according to the sixth embodiment, as seen from a non-driving side.

As shown in FIGS. 50 and 51, the developing unit 9 comprises the developing roller 6, the developing blade 31, the developing device frame 29, the bearing member 45 and a developing device covering member 632.

As shown in FIG. 50, the bearing member 45 is fixed to one longitudinal end portion of the developing device frame 29. The bearing member 45 rotatably supports the developing roller 6. The developing roller 6 is provided with a developing roller gear 69 as a developing roller drive transmission member at the longitudinal end portion. The bearing member 45 rotatably supports an idler gear 671 for transmitting a driving force to the developing roller gear 69.

In addition, as a drive connecting portion, a drive input member 674 for transmitting the driving force to the idler gear 671 is provided.

The developing device covering member 632 is fixed to an outside of the bearing member 45 with respect to the longitudinal direction of the cartridge P. The developing device covering member 632 covers the developing roller gear 69, the idler gear 671 and a drive transmission member 674. As shown in FIGS. 50 and 51, the developing device covering member 632 is provided with a cylindrical portion 632*b*. Through an opening 632*d* of an inside of the cylindrical portion 632*b*, a drive inputting portion 674*b* of the drive transmission member 674 is exposed and projected to the outside of the cartridge. When the cartridge P (PY, PM, PC, PK) is mounted to the main assembly 2, the drive inputting portion (cartridge side drive transmission member) 674*b* is engaged with a developing device-drive output member 62 (62Y, 62M, 62C, 62K) which is a main assembly side drive transmission member shown in part (b) of FIG. 3, and the driving force is transmitted from a driving motor (unshown) provided in the main assembly 2. That is, the drive transmission member 674 functions as an input coupling for developing operation. Therefore, the driving force supplied from the main assembly 2 to the drive transmission member 674 is transmitted to the developing roller gear 69 and the developing roller 6 through the idler gear 671. The structure of the drive connecting portion will be described hereinafter.

[Assembling of Drum Unit and Developing Unit]

Figure 52:
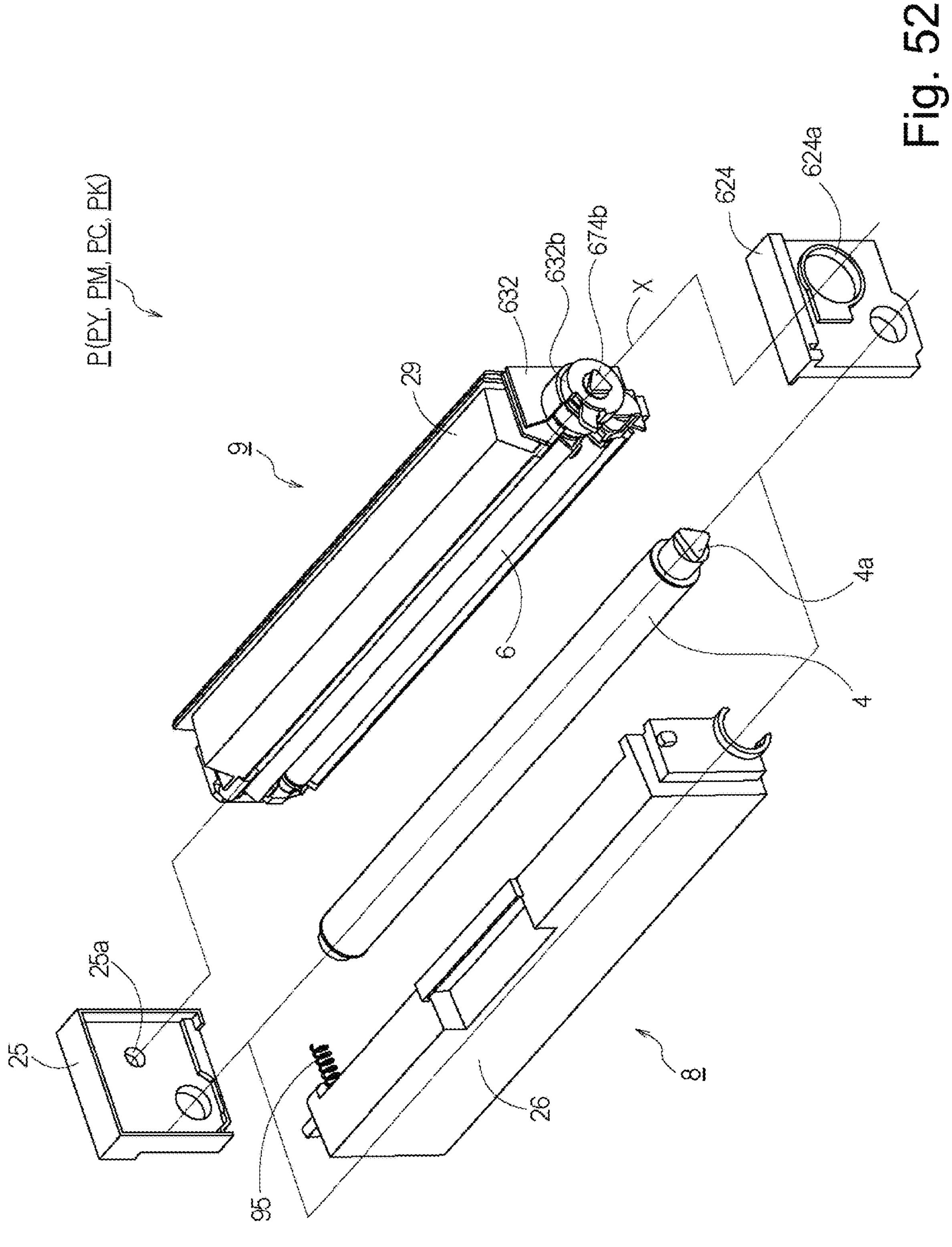
FIG. 52 is an exploded perspective view of the process cartridge according to the sixth embodiment as seen from a driving side.
Figure 53:
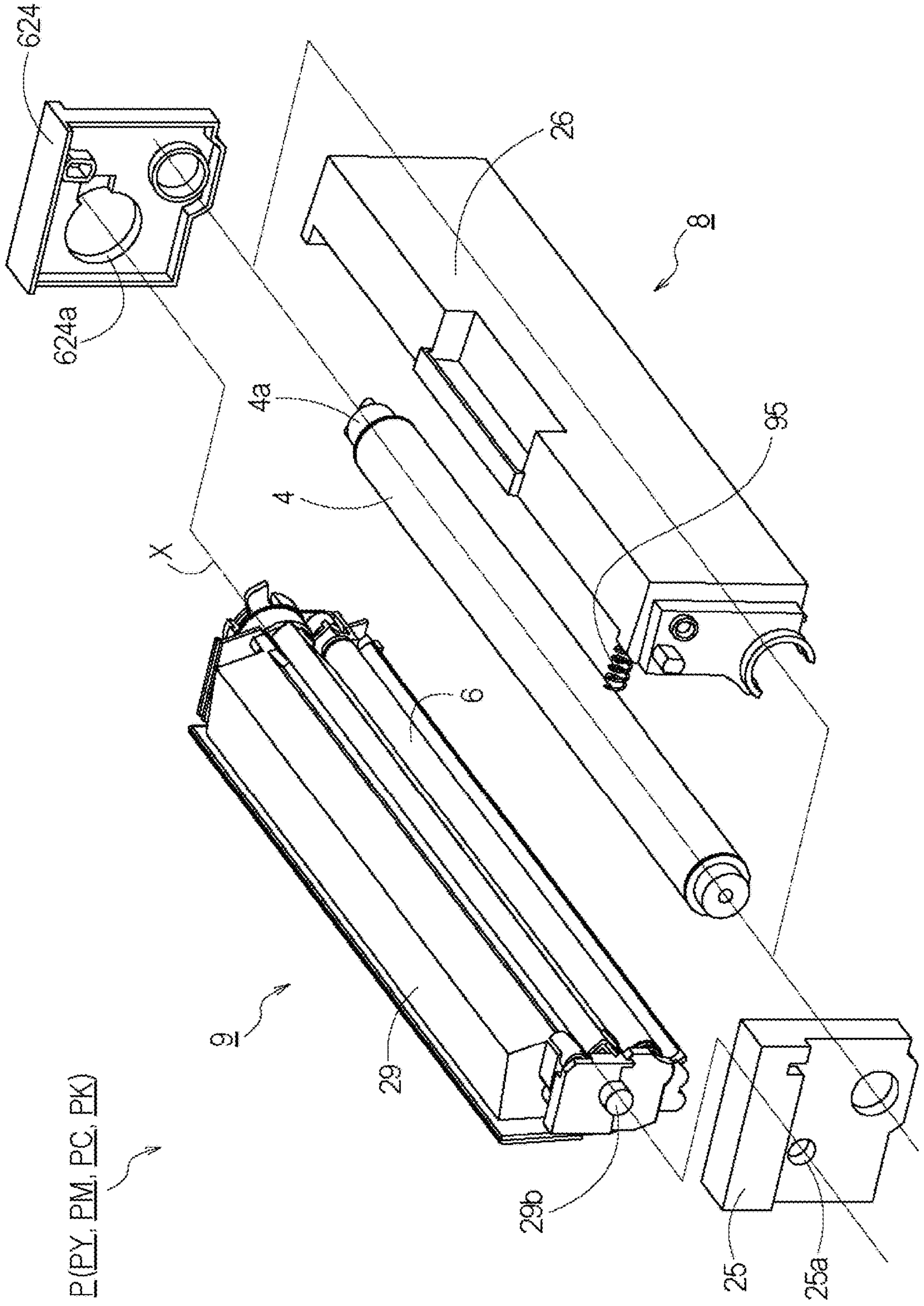
FIG. 53 is an exploded perspective view of the process cartridge according to the sixth embodiment as seen from a non-driving side.

As shown in FIGS. 52 and 53, when the developing unit 9 and the drum unit 8 are assembled, an outside circumference 632*a* of the cylindrical portion 632*b* of the developing device covering member 632 is engaged with a supporting portion 624*a* as a sliding portion of the driving side cartridge cover member 624 at one end portion side of the cartridge P. At the other end portion side of the cartridge P, a projection 29*b* projected from the developing device frame 29 is engaged with a supporting hole portion 25*a* of the non-driving side cartridge cover member. By this, the developing unit 9 is rotatably supported by the drum unit 8. A rotational center of the developing unit 9 relative to the drum unit is a rotation axis X. The rotation axis X is a line connecting the center of the supporting portion 624*a* and the center of the supporting portion 25*a*.

[Structure of Drive Connecting Portion]

In this embodiment, the engaging relation between the drive input member 674 and the developing device-drive output member 62 of the main assembly is equivalent to the engaging relation between the drive inputting portion 74*b* of the drive input member 74 and the developing device-drive output member 62 of the main assembly in Embodiment 1. In addition, the drive inputting portion 4*a* for the photosensitive member (photosensitive member drive transmitting portion) is similar to that in Embodiment 1. The configurations of the drive input member 374 and the idler gear 471 are equivalent to those of Embodiment 3 or Embodiment 4.

Referring to FIGS. 50 and 51, the structure of the drive connecting portion will be described in detail. The drive connecting portion of this embodiment comprises an idler gear 671 as another cartridge side drive transmission member, a spring 70 which is an elastic member (urging member), the drive input member 674, the release cam 672, the release lever 73, the developing device covering member 632 and the driving side cartridge cover member 624. Between the bearing member 45 and the driving side cartridge cover member 624, the above-described amendments of the drive connecting portion is provided coaxially from the bearing member 45 in the order named toward the driving side cartridge cover member 224. The idler gear 671 and the cartridge side drive transmission member 674 are engaged directly and coaxially with each other. The release lever 73 is a rotatable member rotatable relative to the bearing member 45 which is a part of a developing device frame.

The cartridge side drive transmission member 674 is provided with a shaft portion 674*x* and has an end portion provided with the drive inputting portion 674*b* as a rotational force receiving portion. It is penetrated through an opening 672*d* of a release cam, an opening 73*d* of the release lever 73, the opening 632*d* of the developing device covering member 632 and an opening 624*e* of the driving side cartridge cover member 624, and the drive inputting portion 674*b* at the free end thereof is exposed toward the outside of the cartridge. By portion-to-be-urged 674*c* provided at the base portion of the shaft portion 674*x* of the cartridge side drive transmission member 674 being urged by the urging portion 672*c* of the release cam 672, the drive input member 674 retracts toward the inside of the cartridge.

The bearing member 45 rotatably supports the idler gear 671. More particularly, the first shaft receiving portion 45*p* (outer surface of the cylindrical portion) of the bearing member 45 rotatably supports the supported portion 671*p* (inner surface of the cylindrical portion) of the idler gear 671 (FIGS. 50 and 51). In addition, the bearing member 45 rotatably supports the developing roller 6. More particularly, a second shaft receiving portion 45*q* (inner surface of the cylindrical portion) of the bearing member 45 rotatably supports the shaft portion 6*a* of the developing roller 6. And, the developing roller gear 69 is engaged with the shaft portion 6*a* of the developing roller 6. The outer periphery of the idler gear 671 is formed into a gear portion 671 *g* for meshing engagement with the developing roller gear 69. By this, the rotational force is transmitted from the idler gear 671 to the developing roller 6 through the developing roller gear 69.

[Releasing Mechanism]

A drive disconnecting mechanism we've be described

As shown in FIGS. 50 and 51, between the drive input member 674 and the developing device-drive output member 62, the release cam 672 as a coupling releasing member which is a part of the releasing mechanism. As described in the above, the release cam 672 is provided with a ring portion 672*j* having a substantially ring configuration. The ring portion 672*j* has an outer periphery, that is, an outer peripheral surface. The outer periphery portion is provided with a projected portion 672*i* projecting from the ring portion. In this embodiment, the projected portion 672*i* projects in the direction along the rotational axis of the developing roller. The developing device covering member 632 has an inner surface 632*i* (FIG. 51). The inner surface 632*i* is engaged with the outer peripheral surface of the release cam 672. By this, the release cam 672 is slidable relative to the developing device covering member 632 in the direction parallel with the axis of the developing roller 6.

In addition, the developing device covering member 632 is provided with a guide 632*h* as a second guide portion, and the release cam 672 is provided with a guide groove 672*h* as a second portion-to-be-guided. Here, the guide 632*h* and the guide groove 672*h* extend in the direction parallel with the axial direction (arrows M and N).

The guide 632*h* of the developing device covering member 632 is engaged with the guide groove 672*h* of the release cam 672. Because of disengagement between the guide 632*h* and the guide groove 672*h*, the release cam 672 is slidable only in the axial directions (arrows M and N) relative to the developing device covering member 632. The arrow M is the direction toward the outside of the cartridge, and the arrow N is the direction toward the inside of the cartridge.

Figure 54:
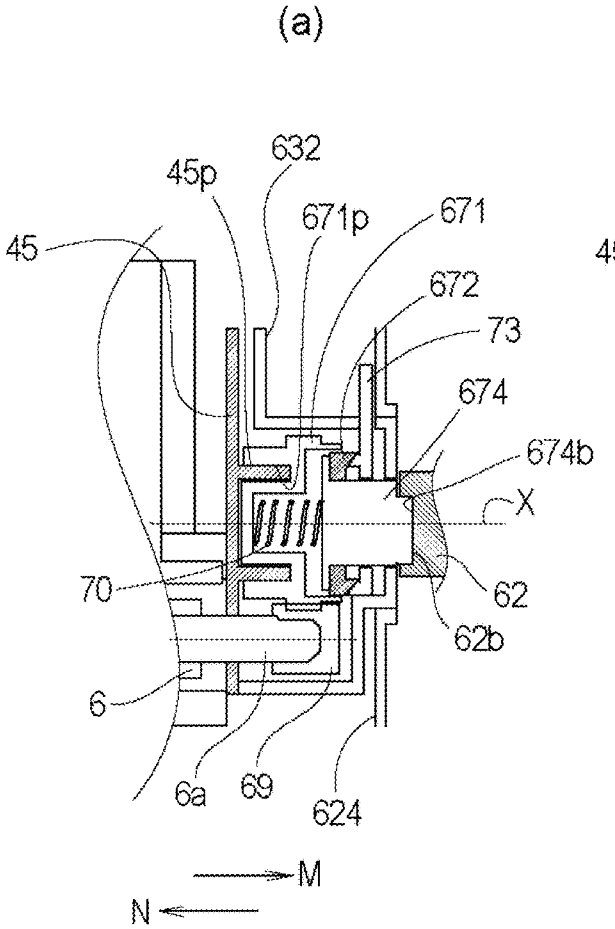
FIG. 54 is a schematic sectional view of a neighborhood of a cartridge side drive transmission member according to a sixth embodiment, in which (a) illustrates a drive transmission state, and (b) illustrates a drive disconnection state.

FIG. 54 is a schematic sectional view of the drive connecting portion.

The cylindrical portion 671*p* (outer surface of the cylindrical portion) of the idler gear 671 and the first shaft receiving portion 45*p* (outer surface of the cylindrical portion) of the bearing member 45 are engaged with each other. In addition, the cylindrical portion 371*q* of the idler gear 671 and the inside circumference 632*q* of the developing device covering member 632 are engaged with each other. That is, the idler gear 671 it is rotatably supported by the bearing member 45 and the developing device covering member 632 at each of the opposite end portions.

In addition, the center of the first shaft receiving portion 45*p* (outer surface of the cylindrical portion) of the bearing member 45, the center of the inside circumference 632*q* of the developing device covering member 632, and the center of the hole portion 632*p* are coaxial with the rotation axis X of the developing unit 9. This, the drive transmission member 674 it supported so as to be rotatable about the rotation axis X of the developing unit 9.

Part (a) of FIG. 54 is a schematic sectional view of the drive connecting portion in which the drive inputting portion 674*b* of the drive input member 674 and the developing device-drive output member 62 are engaged with each other. That is, the drive input member 674 is in the first position. Part (b) of FIG. 54 is a schematic sectional view of the drive connecting portion in which the drive inputting portion 674*b* of the drive input member 674 and the developing device-drive output member 62 are disengaged from each other. That is, the drive input member 674 is in the second position. Here, at least one of the release lever 73 is disposed between the drive input member 674 and the developing device-drive output member 62.

Figure 55:
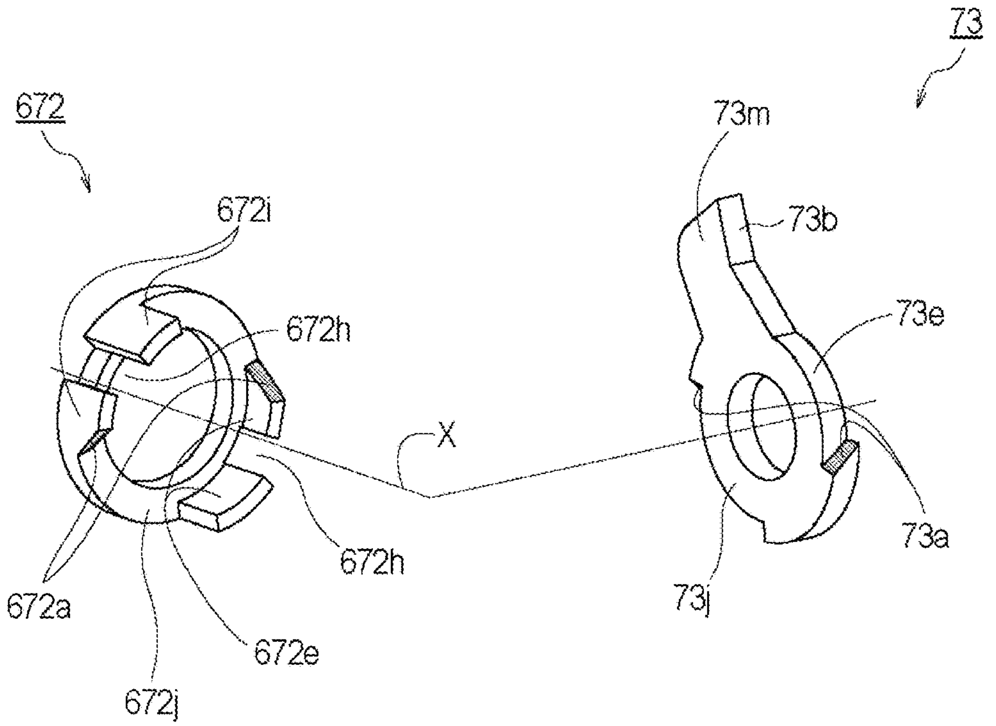
FIG. 55 is a perspective view of a release cam and the release lever according to the sixth embodiment.

FIG. 55 illustrating the structures of the release cam 672 and the release lever 73 as the rotatable member. The release cam 672 as the coupling releasing member includes a contact portion 672*a* as a force receiving portion (portion-to-be-urged) and a cylindrical inner surface 672*e*. The contact portion 672*a* is slanted relative to the rotation axis X (parallel with the rotational axis of the developing roller 6). The release lever 73 includes a contact portion 73*a* as another urging portion and an outer peripheral surface 73*e*. The contact portion 73*a* is slanted relative to the rotation axis X.

The contact portion 73*a* of the release lever 73 is contactable to the contact portion 672*a* of the release cam 672. The cylindrical inner surface 672*e* of the release cam 672 and the outer peripheral surface 73*e* of the release lever 73 are slidably engaged with each other. The rotational axes of the outer peripheral surfaces of the release cam 672, the cylindrical inner surface 672*e*, and the outer peripheral surface 73*e* of the release lever 73 are coaxial with each other. As described hereinbefore, the outer peripheral surface of the release cam 672 is engaged with the inner surface 632*i* of the developing device covering member 632. The center of the outer peripheral surface of the release cam 672, the center of the inner surface 632*i* of the developing device covering member 632 are coaxial with the rotation axis X. That is, the release lever 73 it supported through the release cam 672 and the developing device covering member 632 so as to be rotatable relative to the developing unit 9 (developing device frame 29) about the rotation axis X.

The release lever 73 as the rotatable member is provided with a ring portion 73*j* having a substantially ring-like configuration. The ring portion 73*j* has the contact portion 73*a* and the outer peripheral surface 73*e*. The release lever is provided with a lever portion 73*m* as a projected portion projected from the ring portion 73*j* radially outwardly of the ring portion 73*j* (in the direction substantially perpendicular to the rotational axis of the developing roller.

Figure 56:
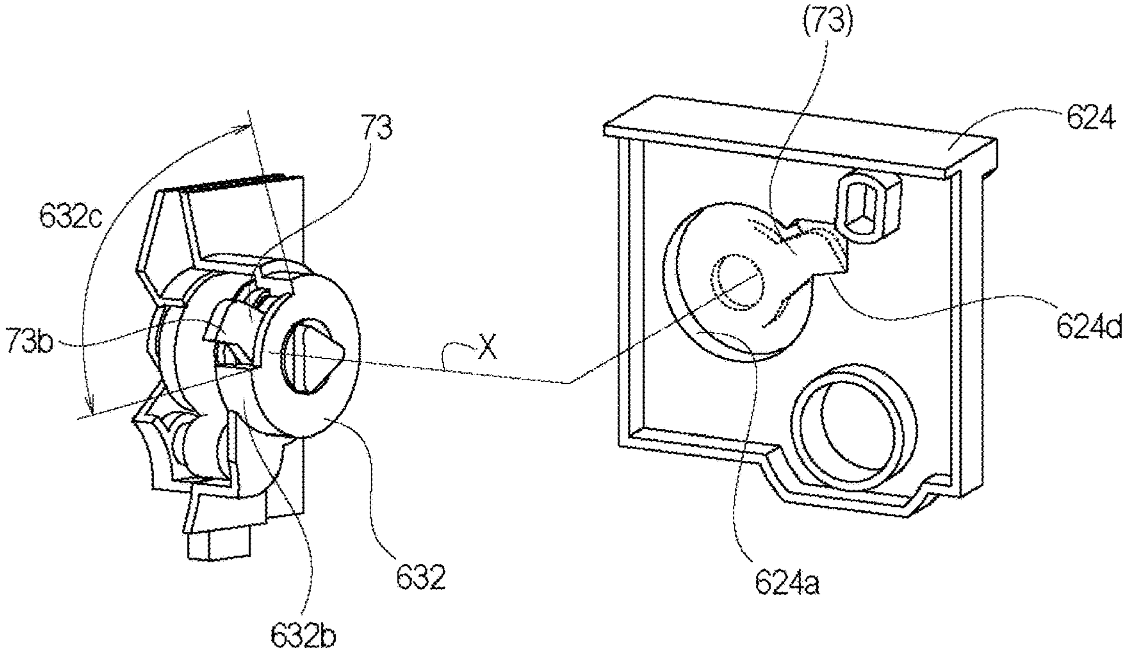
FIG. 56 is a perspective view of a cartridge side drive transmission member, a releasing member, peripheral parts and a driving side cartridge cover member.

FIG. 56 illustrates the structures of the drive connecting portion and the driving side cartridge cover member 624. The force receiving portion 73*b* of the release lever 73 engages with the engaging portion 624*d* which is a regulating portion of the driving side cartridge cover member 624 to receive the force from the driving side cartridge cover member 624 (a part of a photosensitive member frame). The force receiving portion 73*b* is projected through the opening 632*c* provided in a part of the cylindrical portion 632*b* of the developing device covering member 632 and is engaged with the engaging portion 624*d* which is the regulating portion of the driving side cartridge cover member 624. By the engagement between the engaging portion 624*d* and the force receiving portion 73*b*, the release lever 73 is prevented from a relative movement about the rotation axis X relative to the driving side cartridge cover member 624.

[Relationship Among the Forces Applied to the Parts of the Cartridge]

The relationship among the forces applied to parts of the cartridge will be described. Part (a) of FIG. 60 is a perspective view of the cartridge P in which the forces applied to the developing unit 9 *a* schematically shown, and part (b) of FIG. 60 is a side view of a part of the cartridge P as seen from the driving side along the rotation axis X.

To the developing unit 9, a reaction force Q1 from the urging spring 95, a reaction force Q2 applied from the drum 4 through the developing roller 6, a weight Q3 and so on are applied. In addition, in the drive disconnecting operation, the release lever 73 is engaged with the driving side cartridge cover member 624 and receives a reaction force Q4, as will be described hereinafter in detail. A resultant force Q0 of the reaction forces Q1, Q2, Q4 and the weight Q3 is supplied to the driving side cartridge cover member 624 rotatably supporting the developing unit 9 and the supporting portions 624*a*, 625*a* as the sliding portion of the non-driving side cartridge cover member 625.

Therefore, as the cartridge P is seen in the axial direction (part (b) of FIG. 16), the supporting portion 624*a* as the sliding portion of the driving side cartridge cover member 624 contacting the developing device covering member 632 it is necessary against the resultant force Q0. The supporting portion 624*a* is not inevitable for the cylindrical portion 632*b* of the developing device covering member 632 and the other driving side cartridge cover member 624, in the other direction other than the direction of the resultant force Q0. In view of this, in this embodiment, the opening 632*c* is provided in the cylindrical portion 632*b* slidable relative to the driving side cartridge cover member 624 of the developing device covering member 632 and is open in the direction different from the direction of the resultant force Q0. In addition, the release lever 73 engaging with the engaging portion 624*d* which is the regulating portion of the driving side cartridge cover member 624 is provided in the opening 632*c*.

Figure 60:
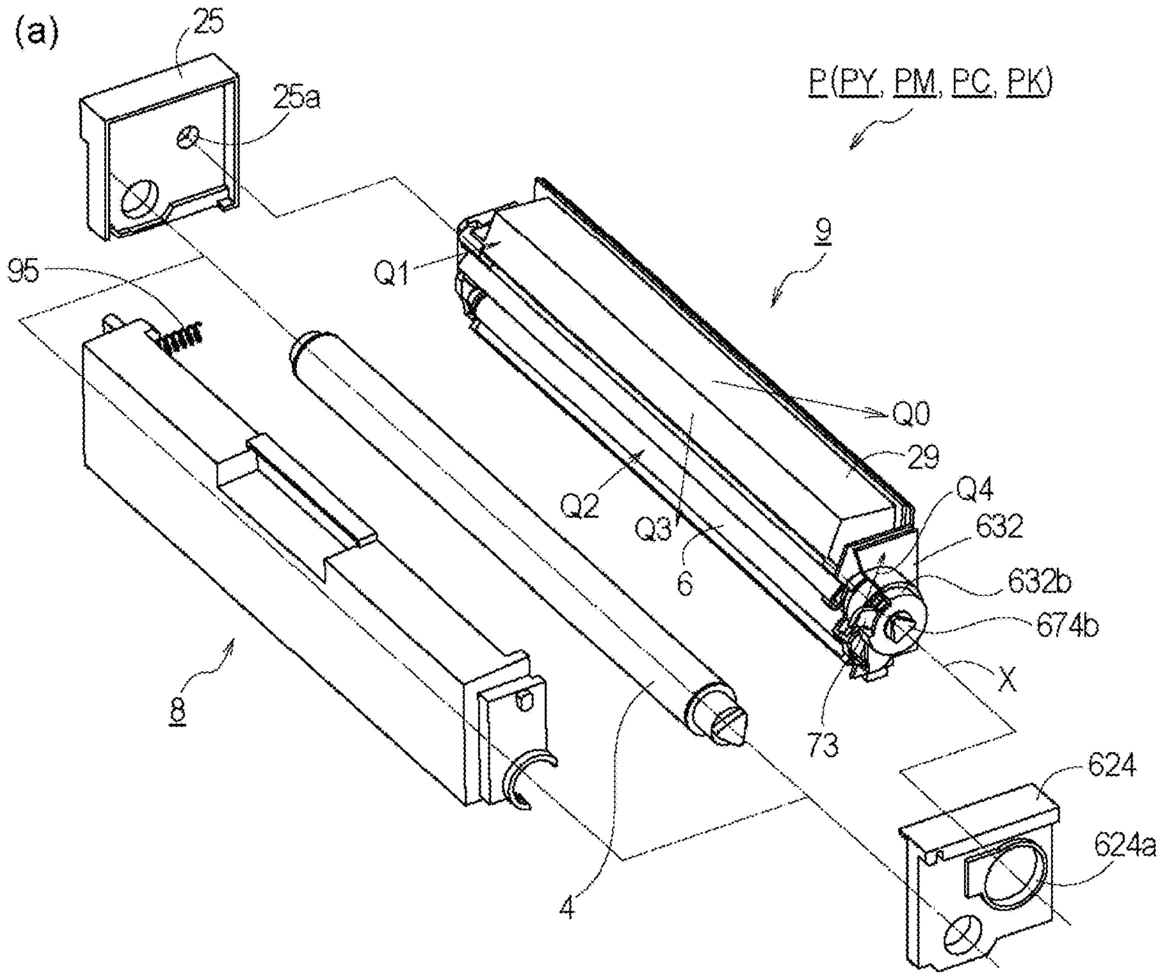
FIG. 60 illustrates the process cartridge according to the sixth embodiment, in which (a) is an exploded perspective view schematically illustrating a force functioned to developing unit 9, and (b) is a schematic side view as seen from a driving side along a rotation axis X.
Figure 60:
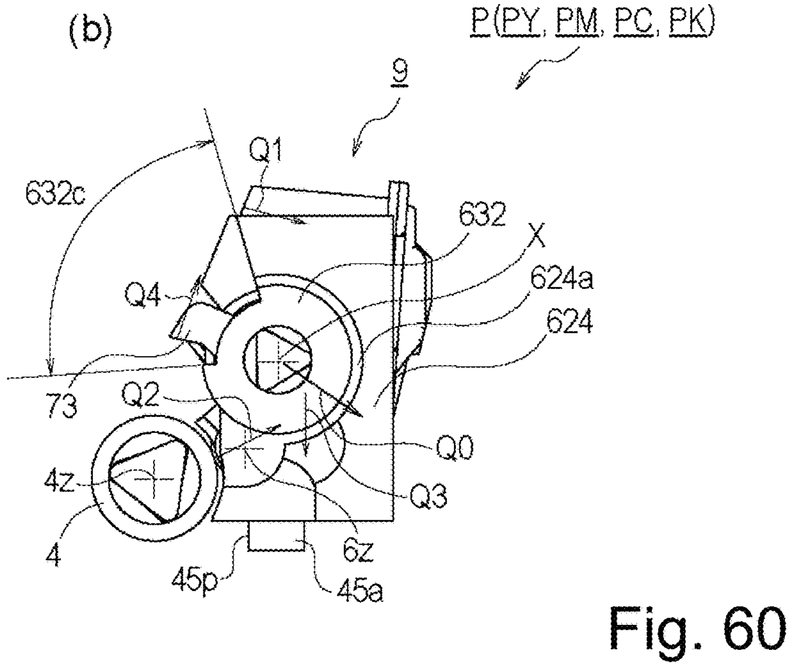

As shown in part (b) of FIG. 60, the positional relationship between the rotational axis 4*z* of the photosensitive member 4, the rotational axis of the cartridge side drive transmission member 674, the contact portion 45*p* of the urging force receiving portion 45*a* receiving the force from the main assembly side urging member 80, and the rotational axis 6*z* of the developing roller 6 is the same as the relationship described in conjunction with part (b) of FIG. 37.

[Drive Disconnecting Operation]

Referring to FIG. 7 and FIGS. 55-59, the description will be made as to an operation of the drive connecting portion when the developing roller 6 is separating from the drum 4.

For the simplicity of the restoration, a part of the elements are shown, and a part of the structure of the release cam is illustrated schematically. In the Figures, an arrow M is along the rotation axis X and is oriented toward a outside of the cartridge, and an arrow N is along the rotation axis X and is oriented toward an inside of the cartridge.

[State 1]

As shown in part (a) of FIG. 7, there is provided a gap d between the spacing force urging member (main assembly side urging member) 80 and the urging force receiving portion 45*a* of the bearing member 45. Here, the drum 4 and the developing roller 6 are contacted with each other. This state is called "state 1" of the spacing force urging member (main assembly side urging member) 80. The structure of the drive connecting portion at this time is schematically shown in part (a) of FIG. 57. In part (a) of FIG. 57, the pair of the drive transmission member 674 and the developing device-drive output member 62, and the pair of the release cam 672 and the release lever 73 are separately shown.

Figure 57:
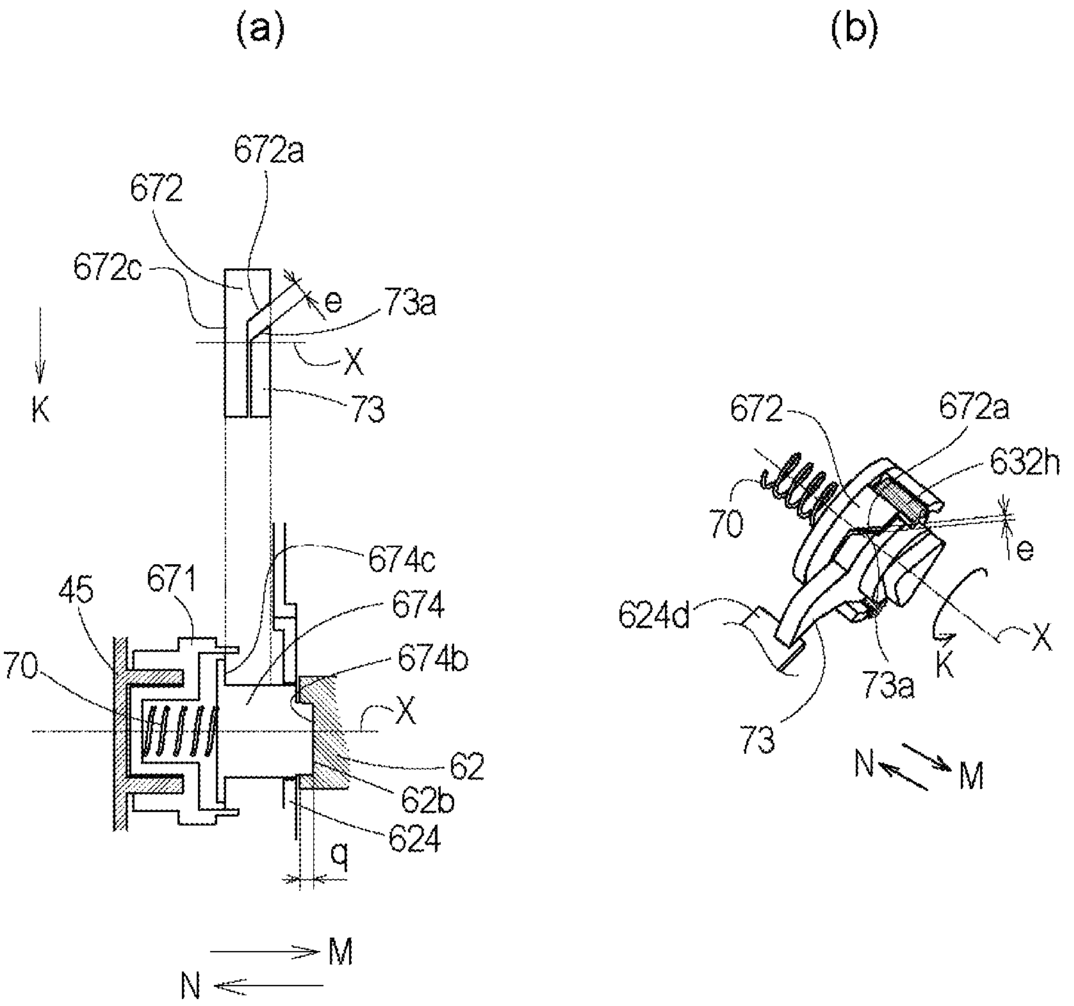
FIG. 57 is a schematic view of a neighborhood of the cartridge side drive transmission member according to the sixth embodiment in a drum-roller-contact-and-drive-transmission state, in which (a) is a schematic sectional view of the drive connecting portion, and (b) is a perspective view of the drive connecting portion.

Part (b) of FIG. 57 is the perspective view of the drive connecting portion. In part (b) of FIG. 57, only a part, including the guide 632*h*, of the developing device covering member 632 is shown. There is provided a gap e between the contact portion 672*a* of the release cam 672 and the contact portion 73*a* of the release lever 73. In the state, the drive inputting portion 74*b* of the drive input member 674 and the developing device-drive output member 62 are engaged with each other by an engagement amount q so that the drive transmission is enabled. As described hereinbefore, the drive input member 674 is engaged with the idler gear 671 (FIG. 26). Therefore, the driving force supplied from the main assembly 2 to the drive transmission member 674 is transmitted to the developing roller 6 through the idler gear 671 and the developing roller gear 69. The position of various parts in the state is called a contacting position, and is also called a drum-roller-spaced-and-drive-transmission state. The position of the drive input member 674 at this time is called a first position

[State 2]

Figure 58:
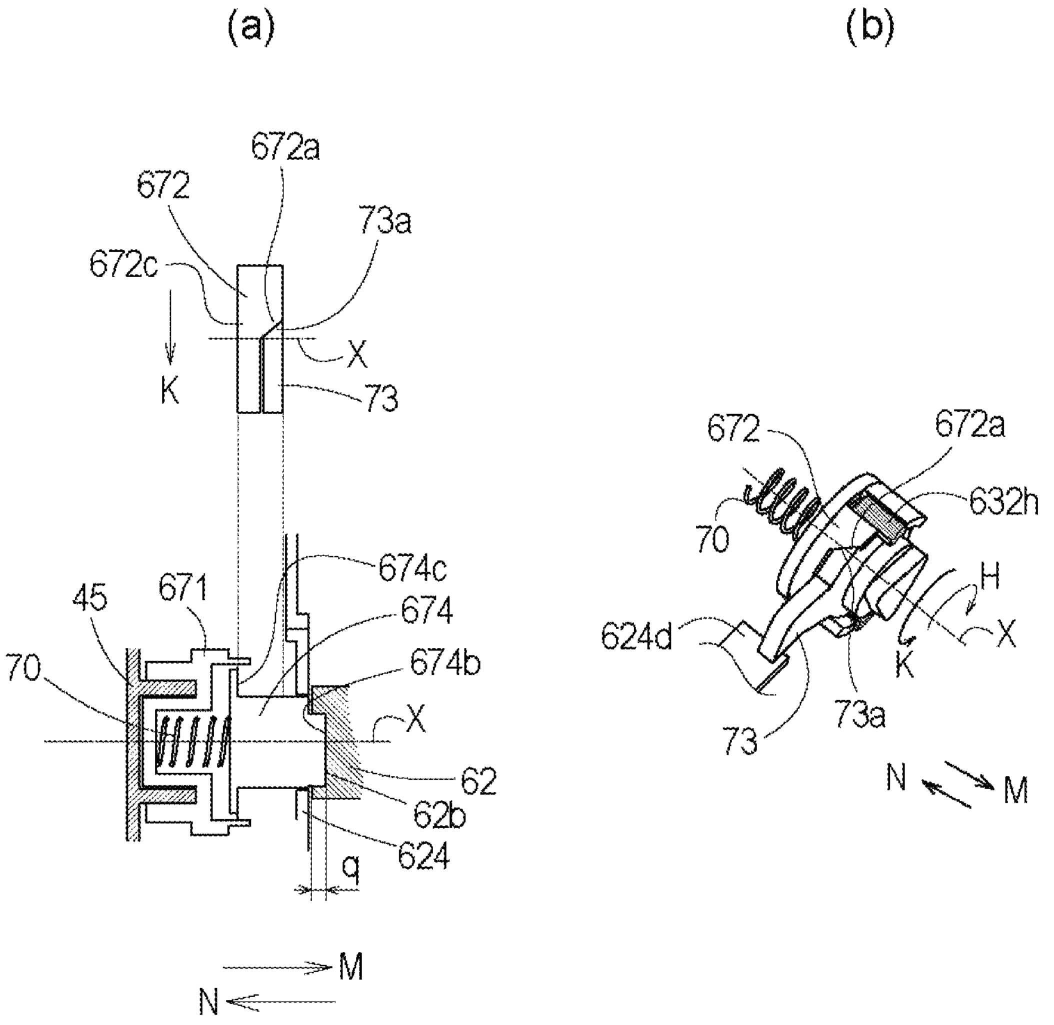
FIG. 58 is a schematic view of the neighborhood of the cartridge side drive transmission member according to the sixth embodiment in a drum-roller-spaced-and-drive-transmission state, image (a) is a schematic sectional view of the drive connecting portion, and (b) is a perspective view of the drive connecting portion.

When (main assembly side urging member of) the spacing force urging member 80 move in the direction of an arrow F1 by 61 (part (b) of FIG. 7) from the position of the drum-roller-contact-and-drive-transmission state, the developing unit 9 rotates in the direction of an arrow K about the rotation axis X by an angle θ1. As a result, the developing roller 6 space is from the drum 4 by a distance F1. The release cam 672 and the developing device covering member 632 in the developing unit 9 rotates in the direction indicated by the arrow K by the angle θ1 in interrelation with the rotation of the developing unit 9. On the hand, the release lever 73 is provided in the developing unit 9, but the force receiving portion 73*b* is engaged with the engaging portion 624*d* of the driving side cartridge cover member 624, as shown in FIG. 56. Therefore, the force receiving portion 73*b* does not move in the reaction with the rotation developing unit 9. That is, the release lever 73 receives a reaction force from the engaging portion 624*d* of the driving side cartridge cover member 624 than that of rotate relative to the developing unit 9. The structure of the drive connecting portion at this time is schematically shown in part (a) of FIG. 58. Part (b) of FIG. 58 is the perspective view of the drive connecting portion. In the state shown in this Figure, the release cam 672 has rotated in the direction indicated by the arrow K in the Figure in interrelation with the rotation of the developing unit 9 so that the contact portion 672*a* of the release cam 672 and the contact portion 73*a* of the release lever 73 start contact to each other. At this time, the drive inputting portion 674*b* of the drive input member 674 and the developing device-drive output member 62 keep engagement therebetween. Therefore, the driving force supplied from the main assembly 2 to the drive transmission member 674 is transmitted to the developing roller 6 through the idler gear 671 and the developing roller gear 69. This state of various parts is called a drum-roller-spaced-and-drive-transmission state. In the above-described state 1, the force receiving portion 73*b* is not always in contact with the engaging portion 624*d* of the driving side cartridge cover member 624. In other words, in the state 1, the force receiving portion 73*b* may be disposed so as to be spaced from the engaging portion 624*d* of the driving side cartridge cover member 624. In such a case, during the operation changing from the state 1 to the state 2, the gap between the force receiving portion 672*b* and the engaging portion 624*d* of the driving side cartridge cover member 624 disappears so that the force receiving portion 73*b* is brought into contact with the engaging portion 624*d* of the driving side cartridge cover member 624. The position of the drive input member 674 is in the first position.

[State 3]

Figure 59:
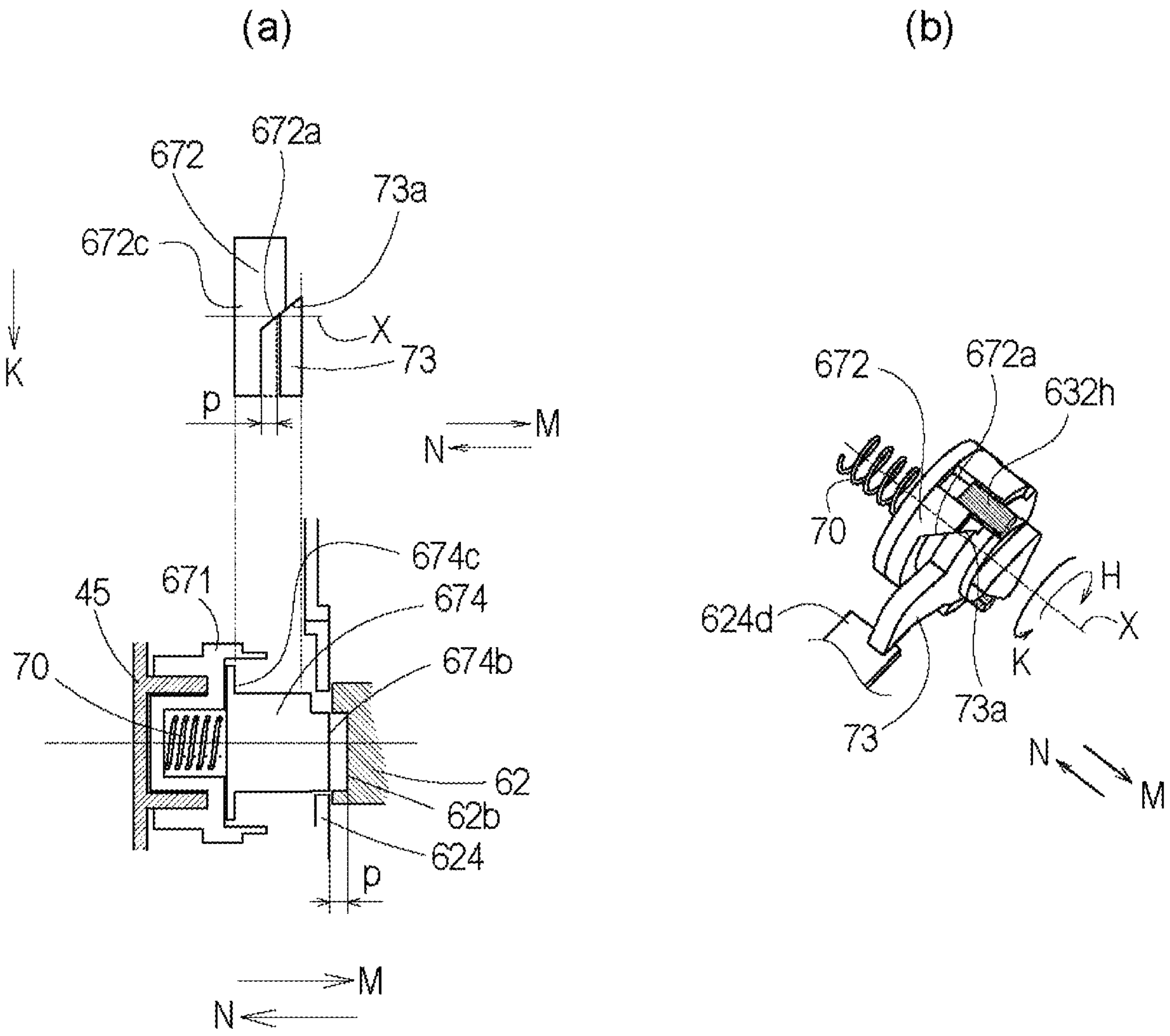
FIG. 59 is a schematic view of the neighborhood of the cartridge side drive transmission member according to the sixth embodiment in a drum-roller-spaced-and-drive-disconnection state, in which (a) is a schematic sectional view of the drive connecting portion, and (b) is a perspective view of the drive connecting portion.

FIG. 59 shows the structure of the drive connecting portion at the time when the spacing force urging member 80 (main assembly side urging member) moves from the position of the drum-roller-spaced-and-drive-transmission state in the direction indicated by the arrow F1 in the Figure by 62 (part (c) of FIG. 7). In interrelation with the rotation of the developing unit 9 by the angle θ2 (>θ1), the release cam 672 and the developing device covering member 632 rotate. On the other hand, the position of the release lever 73 remains in the same as in the case described above, and the release cam 672 rotates in the direction indicated by the arrow K in the Figure. At this time, the contact portion 672*a* of the release cam 672 receives a reaction force from the contact portion 73*a* of the release lever 73. In addition, as described hereinbefore, the guide groove 72*h* of the release cam 672 is engaged with the guide 632*h* of the developing device covering member 632, and therefore, is movable only in the axial direction (arrow M and N directions) (FIG. 10). As a result, the release cam 672 slides on the direction of the arrow N through a movement distance p. In interrelation with the movement of the release cam 672 in the direction of the arrow N, an urging surface 672*c* as the urging portion of the urges an urged surface 674*c* as the portion-to-be-urged of the drive input member 674. By this, the drive input member 674 slides in the direction of the arrow N against the urging force of the spring 70 by the movement distance p. At this time, the movement distance p is larger than the engagement amount q between the drive inputting portion 6574*b* of the drive input member 674 and the developing device-drive output member 62, and therefore, the engagement between the drive input member 674 and the developing device-drive output member 62 is released. With this operation, the developing device-drive output member 62 continues to rotate, and on the other hand, the drive input member 6474 stops. As a result, the rotations of the idler gear 671, the developing roller gear 69 and the developing roller 6 stop. This state of various parts is called a spacing position and is also called a drum-roller-spaced-and-drive-disconnection state. The position of the drive input member 674 at this time is called a second position.

By the drive input member 674 being urged by the urging portion 672*c* of the release cam 672 in this manner, the drive input member 674 is moved from the first position to the second position toward the inside of the cartridge. By doing so, the engagement between the drive input member 674 and the developing device-drive output member 62 are released, so that the rotational force from the developing device-drive output member 62 is no longer transmitted to the drive input member 674.

In the foregoing, the description has been made as to the drive disconnecting operation relative to the developing roller 6 in interrelation with the rotation of the developing unit 9 in the direction of the arrow K. With the foregoing structures, the developing roller 6 can be spaced from the drum 4 while rotating, and the drive can be disconnected depending on the spacing distance between the developing roller 6 and the drum 4.

[Drive Connecting Operation]

The description will be made as to the operation of the drive connecting portion at the time when the developing roller 6 and the drum 4 change from the spaced state to the contacted state. The operation is reciprocal of the above-described operation from the contact state to the spaced state.

In the spaced-developing-device state (the developing unit 9 has rotated by the angle θ2 as shown in part (c) of FIG. 7), the drive connecting portion it such that the engagement between the drive inputting portion 674*b* of the drive input member 674 and the developing device-drive output member 62 is released as shown in FIG. 59. That is, the drive input member 674 is in the second position.

In the state (part (b) of FIG. 7 and FIG. 58) that the developing unit 9 is gradually rotated from the above-described the state in the direction indicated by an arrow H (opposite to the direction of arrow K), by which the developing unit 9 rotates by the end 01, the drive input member 674 move in the direction indicated by the arrow M by the urging force of the spring 70. By this, the drive inputting portion 74*b* of the drive input member 674 and the developing device-drive output member 62 contact to each other. By this, the driving force is transmitted from the main assembly 2 to the developing roller 6 so that the developing roller 6 is rotated. That is, the drive input member 674 is in the first position. At this time, the developing roller 6 and the drum 4 are kept separated from each other.

By further rotating the developing unit 9 gradually from this state in the direction of the arrow H (FIG. 7), the drive input member 674 moves from the second position to the first position, and the developing roller 6 and the drum 4 can be contacted to each other.

In the foregoing, the drive transmission operation to the developing roller 6 in interrelation with the rotation of the developing unit 9 in the direction of the arrow H has been described. With the foregoing structures, the developing roller 6 is brought into contact to the drum 4 while rotating, and the drive can be transmitted to the developing roller 6 depending on the spacing distance between the developing roller 6 and the drum 4.

As described in the foregoing, wherein such structures, the switching between the connection and disconnection relative to the developing roller 6 can be effected unique depending on the angle of rotation of the developing unit 9.

In the foregoing description, the contact portion 672*a* of the release cam and the contact portion 73*a* of the release lever 73 are in surface contact each other, but this is not inevitable. For example, the contact may be between a surface and a ridge, between a surface and a point, between a ridge and a ridge, or between a ridge and a point. In this example, the force receiving portion 73*b* of the release lever 73 is engaged with the engaging portion 624*d* which is the regulating portion of the driving side cartridge cover member 624, but this is not inevitable, and it may be engaged with a cleaner container 26.

According to this embodiment, the developing unit 9 comprises the release lever 73 and the release cam 672. The release lever 73 is rotatable about the rotation axis X relative to the developing unit 9 and is not slidable in the direction of axial direction M or N. On the other hand, the release cam 672 is slidable in the axial direction M and N relative to the developing unit 9, but is not rotatable about the rotation axis X. That is, there is no part which makes three-dimensional relative movement (rotation about the rotation axis X and sliding in the axial direction M and N) relative to the developing unit 9. That is, the moving directions of the parts are assigned to the release lever 73 and the release cam 672 (function division). By this, the movements of the parts are two-dimensional, and therefore, the operations are standardized. As a result, the drive transmission operation to the developing roller 6 interrelated with the rotation of the developing unit 9 can be effected smoothly.

In this embodiment, the release lever 73 is also an urging mechanism in addition to the release cam 672 in this slidably supported by the shaft portion 674*x* of the drive input member 674. In this embodiment, in the drive disconnecting operation, the contact portion 672*a* at the force receiving portion of the release cam 672 first contacts the contact portion 73*a* of the release lever 73. Subsequently, the drive input member 674 retracts into the cartridge with the movement of the release cam 672 in the direction of the arrow N, by which it is disconnected from the main assembly side drive transmission member 62.

In addition, in FIG. 50, by the engagement between the outer peripheral surface 73*e* of the release lever 73 and the cylindrical inner surface 672*e* of the release cam 672 as the coupling releasing member, the release lever 73 and the release cam 672 are positioned in place.

Figure 61:
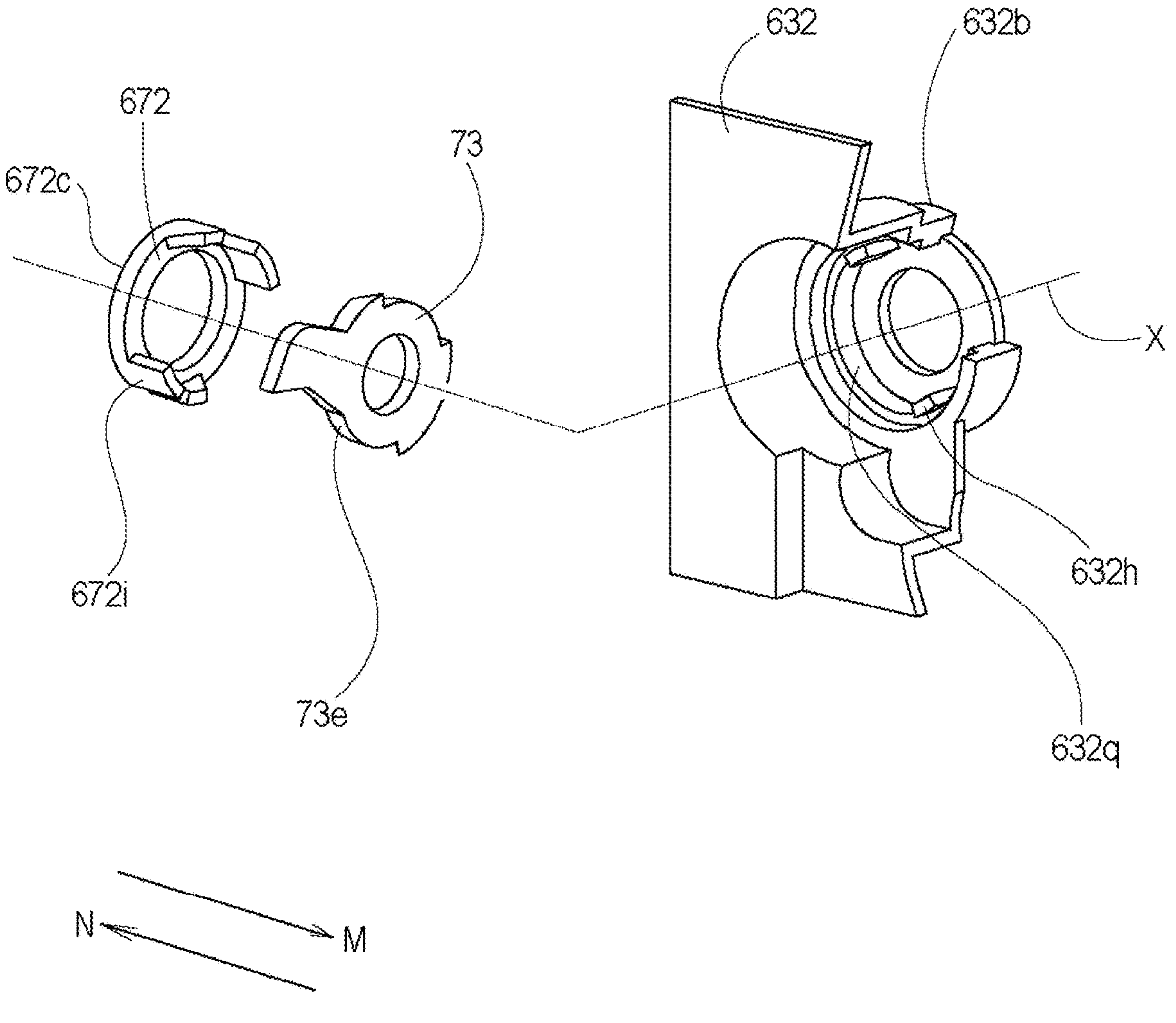
FIG. 61 is a perspective view of a release lever release cam and a developing device covering member according to the sixth embodiment.

However, this is not inevitable, and the structure shown in FIG. 61 maybe employed, for example. In other words, the outer peripheral surface 73*e* of the release lever 73 is supported so as to be slidable on an inner surface 632*q* of the developing device covering member 632, and a cylindrical inner surface 672*i* of the release cam 672 it supported so as to be slidable on the inner surface 632*q* of the developing device covering member 632.

Embodiment 7

A cartridge according to a seventh embodiment of the present invention will be described. In the description of this embodiment, the same reference numerals as in the foregoing Embodiments are assigned to the elements having the corresponding functions in this embodiment, and the detailed description thereof is omitted for simplicity. In this embodiment is similar to the sixth embodiment. The difference that their from is in that, as shown in a schematic sectional view (FIG. 62), the lever portion of the release lever 73 is projected through an opening formed by a developing device covering member 732 and a driving side cartridge cover member 724.

Figure 62:
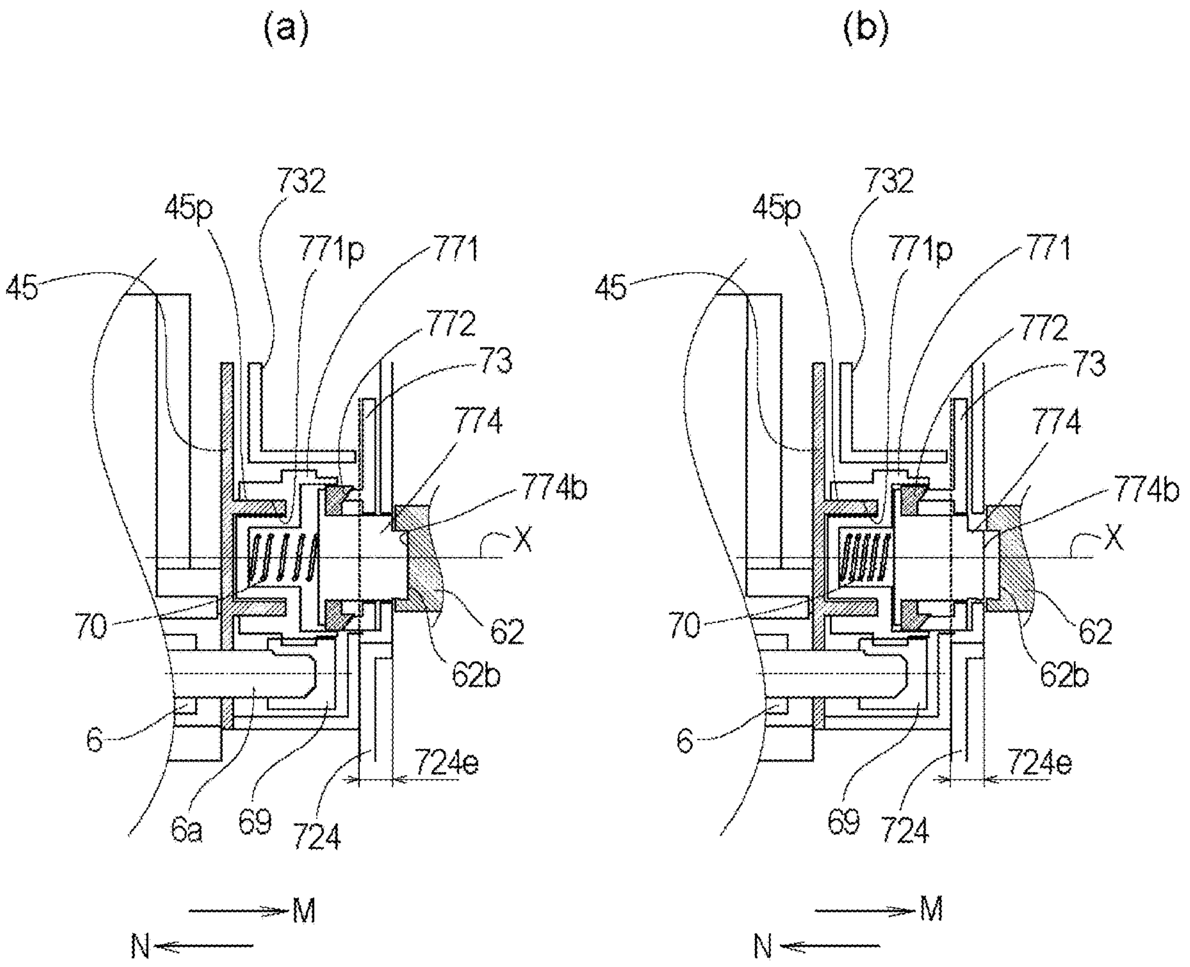
FIG. 62 is a schematic sectional view of a neighborhood of a cartridge side drive transmission member according to a seventh embodiment, in which (a) illustrates a drive transmission state, and (b) illustrates a drive disconnection state.

FIG. 62 is a sectional view of a drive connecting portion as seen in the direction perpendicular to a rotation axis X.

In a sectional view of the drive connecting portion shown in part (a) of FIG. 62, the drive inputting portion 774*b* of the drive input member 774 and the developing device-drive output member 62 are engaged with each other. That is, the drive input member 774 is in the first position. In a sectional view of the drive connecting portion shown in part (b) of FIG. 62, the drive inputting portion 774*b* of the drive input member 774 is spaced from the developing device-drive output member 62. That is, the drive input member 774 is in the second position.

The release lever 73 is within the range of the thickness (measured in the direction along the rotation axis X) of a cylindrical portion 732*b* which is a sliding portion of the developing device covering member 732, as seen in the direction perpendicular to the rotation axis X. The cylindrical portion 732*b* is a sliding portion of the developing device covering member 732 when the developing device covering member slides relative to the driving side cartridge cover member 724. That is, the release lever 73 is within a sliding range 724*e* in which the developing device covering member 732 slides on the driving side cartridge cover member 724, with respect to the direction of the rotation axis X.

Follow more, the release lever 73 is projected through an opening 732*c* provided in a part of the cylindrical portion 732*b* of the developing device covering member 732.

The positional relationship between the release lever 73, the opening through which the release lever projects, the developing cartridge, the drive inputting portion, the photosensitive member is the same as that in Embodiment 6 (FIG. 60).

Here, in the drive disconnecting operation, the release lever 73 receives a reaction force Q4, as described hereinbefore (FIG. 60). A force receiving portion 73*b* of the release lever 73 for receiving the reaction force is provided within the sliding range 724*e* of the supporting portion 724*a* as the sliding portion where the developing unit 9 slides on the driving side cartridge cover member 724. The release lever 73 it supported within the sliding range 724*e* of the supporting portion 724*a* as the sliding portion where the developing unit 9 slides on the driving side cartridge cover member 724. That is, the reaction force Q4 is received by the release lever 73 without deviation in the rotation axis X direction by the driving side cartridge cover member 724. Therefore, according to this embodiment, the deformation of the developing device covering member 732 can be suppressed. Because the deformation of the developing device covering member 732 is suppressed, the rotation of the developing unit 9 about the rotation axis X relative to the driving side cartridge cover member 724 can be stabilized. In addition, the release lever 73 is provided within the range 724*e* of the supporting portion 724*a* as the sliding portion when the developing unit 9 slides on the driving side cartridge cover member 724, with respect to the direction of the rotation axis X, and therefore, the drive connecting portion and the process cartridge can be downsized.

In the cartridge according to the foregoing embodiments, the clutch for effecting transmission and disconnection of the rotational force from the main assembly of the image forming apparatus to the cartridge is established at the interface portion. The interface portion is the portion where the cartridge contacts the main assembly when the cartridge is mounted to the main assembly of the image forming apparatus. In the foregoing embodiments, the cartridge side drive transmission member 74 which is an interface portion of the cartridge side is capable of advancing and retracting in a direction toward the inside of the cartridge. With such a structure, the cartridge side drive transmission member 74 provided at the longitudinal end portion of the cartridge functions as a clutch.

The coupling releasing member 72 in the foregoing embodiments is an urging mechanism for urging the cartridge side drive transmission member 74, and the cartridge side drive transmission member 74 is moved in the direction toward the inside of the cartridge by the coupling releasing member 72. By this operation, the coupling between the drive input member 74 and the developing device-drive output member 62 is disconnected. Four the force urging the cartridge side drive transmission member 74, a external force received by the urging force receiving portion 45*a* provided in the cartridge may be used.

In the case of a process cartridge comprising the photosensitive member and the developing roller, the above-described clutch operation may be interrelated with the space operation between the photosensitive member and the developing roller. More particularly, when the developing unit 9 is rotated relative to the drum unit 8 so that the developing roller spaces from the photosensitive member, the rotation causes cartridge side drive transmission member 74 to retract inwardly. When the developing unit 9 rotates back relative to the drum unit 8 to contact the developing roller to the photosensitive member, the rotation causes the cartridge side drive transmission member 74 to projected outwardly.

In the foregoing embodiments, the drive input member 74 includes the portion-to-be-urged having the urged surface 74*c* in the shaft portion 74*x* having a free end functioning as the drive inputting portion 74*b*. The release cam 72 and the release lever 73 are provided between the portion-to-be-urged 74*c* of the drive input member 74 and the drive inputting portion 74*b* at the free end of the drive input member 74. More particularly, the shaft portion 74*x* of the drive input member 74 is slidable so as to penetrate the opening of the release cam 72 or the release lever.

In the drive disconnecting operation, the urging surface 72*c* as the urging portion of the release cam 72 urges the urged surface 74*c* as the portion-to-be-urged of the drive input member 74, by which the drive input member 74 retracts inwardly of the cartridge.

In addition, the urging surface 72*c* as the urging portion of the release cam 72 and the urged surface 74*c* as the portion-to-be-urged of the drive input member 74 has the surfaces substantially perpendicular to the rotational axis of the developing roller. However, the urging portion 72*c* of the release cam 72 and the urged surface 74*c* as of the portion-to-be-urged of the drive input member 74 need not be both surfaces. As long as the release cam 72 is capable of urging the drive input member 74, a surface, a ridge and a point can be used in combination.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

INDUSTRIAL APPLICABILITY

According to the present invention, a cartridge, a process cartridge and an electrophotographic image forming apparatus in which the drive switching for the developing roller can be effected assuredly.

The invention claimed is:

1. A cartridge comprising:

a developing roller rotatable about a rotational axis thereof;

a movable lever; and a coupling member operatively connected to the developing roller, the coupling member being movable, in response to a movement of the lever, between (a) a first position in which the coupling member is exposed to outside of the cartridge, and (b) a second position, wherein the coupling member is provided at a first end portion on a first side of the cartridge, and wherein, in a direction of the rotational axis of the developing roller, the first position is farther from a second end portion provided on a second side of the cartridge that is opposite to the first end portion on the first side of the cartridge than the second position is from the second end portion on the second side of the cartridge.

2. A cartridge according to claim 1, wherein the lever is movable in a state wherein the developing roller contacts a photosensitive drum.

3. A cartridge according to claim 1, wherein an end of the lever includes an urging force receiving portion for receiving an urging force from outside of the cartridge for moving the lever.

4. A cartridge according to claim 1, further comprising an elastic portion for applying an elastic force to the coupling member.

5. A cartridge according to claim 4, wherein the elastic portion urges the coupling member toward the first position.

6. A cartridge according to claim 1, wherein the second position is a retracted position toward an inside of the cartridge.

7. A cartridge according to claim 1, wherein the lever includes a cam portion.

8. A cartridge according to claim 1, further comprising a photosensitive drum, and wherein the movable lever is rotatable with respect to the photosensitive drum and the developing roller.

9. A cartridge according to claim 8, further comprising a second coupling member that is operatively connected to the photosensitive drum.

10. A cartridge according to claim 9, further comprising:

a first frame rotatably supporting the developing roller; and a second frame rotatably supporting the photosensitive drum.

11. A cartridge according to claim 9, wherein the first frame is rotatable about an axis of the first frame, wherein the coupling member is rotatable about an axis of the coupling member, and wherein the axis of the coupling member is coaxial with the axis of the first frame.

12. A cartridge according to claim 1, wherein the cartridge is configured such that, when the cartridge is oriented with the developing roller positioned at a downward side of the cartridge, an end of the movable lever is positioned lower than the rotational axis of the developing roller.

* * * * *